US012134725B2

(12) United States Patent
Schoenefeld et al.

(10) Patent No.: US 12,134,725 B2
(45) Date of Patent: Nov. 5, 2024

(54) LIQUID CRYSTAL-BASED LIGHT VALVE

(71) Applicant: Merck Patent GmbH, Darmstadt (DE)

(72) Inventors: Christian Schoenefeld, Babenhausen (DE); Michael Junge, Pfungstadt (DE); Mark Goebel, Darmstadt (DE); Raphael Lisicki, Mainz (DE); Kevin Kaiser, Gross-Gerau (DE)

(73) Assignee: Merck Patent GmbH (DE)

( * ) Notice: Subject to any disclaimer, the term of this patent is extended or adjusted under 35 U.S.C. 154(b) by 28 days.

(21) Appl. No.: 17/619,971

(22) PCT Filed: Jun. 15, 2020

(86) PCT No.: PCT/EP2020/066420
§ 371 (c)(1),
(2) Date: Dec. 16, 2021

(87) PCT Pub. No.: WO2020/254219
PCT Pub. Date: Dec. 24, 2020

(65) Prior Publication Data
US 2022/0306939 A1    Sep. 29, 2022

(30) Foreign Application Priority Data

Jun. 17, 2019 (EP) ..................... 19180639

(51) Int. Cl.
*C09K 19/58* (2006.01)
*C09K 19/04* (2006.01)
*C09K 19/12* (2006.01)
*C09K 19/30* (2006.01)
*C09K 19/60* (2006.01)
*G02F 1/137* (2006.01)

(52) U.S. Cl.
CPC .......... *C09K 19/586* (2013.01); *C09K 19/603* (2013.01); *C09K 2019/0444* (2013.01); *C09K 2019/0448* (2013.01); *C09K 2019/122* (2013.01); *C09K 2019/123* (2013.01); *C09K 2019/3004* (2013.01); *C09K 2019/3009* (2013.01); *C09K 2019/3016* (2013.01); *C09K 2019/3019* (2013.01); *C09K 2019/3021* (2013.01); *G02F 1/13718* (2013.01)

(58) Field of Classification Search
CPC ................................... C09K 19/586
See application file for complete search history.

(56) References Cited

U.S. PATENT DOCUMENTS

| | | |
|---|---|---|
| 4,276,047 A | 6/1981 | Imahori et al. |
| 4,308,161 A | 12/1981 | Aftergut et al. |
| 4,308,162 A | 12/1981 | Cole et al. |
| 4,340,973 A | 7/1982 | Umetsu |
| 4,395,350 A | 7/1983 | Boller et al. |
| 4,402,854 A | 9/1983 | Gunther et al. |
| 4,429,029 A | 1/1984 | Hoffmann et al. |
| 4,434,072 A | 2/1984 | Imahori et al. |
| 4,456,545 A | 6/1984 | Weber et al. |
| 4,466,899 A | 8/1984 | Ditter et al. |
| 4,472,292 A | 9/1984 | Haas et al. |
| 4,473,486 A | 9/1984 | Morinaka et al. |
| 4,499,004 A | 2/1985 | Haas et al. |
| 4,519,935 A | 5/1985 | Claussen |
| 4,555,355 A | 11/1985 | Yamada et al. |
| 4,585,574 A | 4/1986 | Blunck et al. |
| 4,632,781 A | 12/1986 | Shimidzu et al. |
| 4,826,620 A | 5/1989 | Heppke et al. |
| 4,988,458 A | 1/1991 | Heppke et al. |
| 5,236,618 A | 8/1993 | Heppke et al. |
| 5,736,596 A | 4/1998 | Heitz et al. |
| 5,788,880 A | 8/1998 | Schierlinger et al. |
| 5,886,242 A | 3/1999 | Etzbach et al. |
| 6,468,444 B1 | 10/2002 | Meyer et al. |
| 10,202,508 B2 | 2/2019 | Tong et al. |
| 10,344,217 B2 | 7/2019 | Kirsch et al. |
| 10,585,316 B2 | 3/2020 | Junge et al. |
| 2011/0042651 A1 | 2/2011 | Koenemann et al. |
| 2018/0157088 A1* | 6/2018 | Junge .................. C09K 19/60 |

(Continued)

FOREIGN PATENT DOCUMENTS

| | | |
|---|---|---|
| CN | 109207161 A | 1/2019 |
| CN | 109689840 A | 4/2019 |
| DE | 3017877 A1 | 11/1980 |

(Continued)

OTHER PUBLICATIONS

Bahadur, B., "Liquid Crystals—Applications and Uses", vol. 3, 1992, World Scientific Publishing, Section 11.2.1, 19 pages.

(Continued)

*Primary Examiner* — Chanceity N Robinson
(74) *Attorney, Agent, or Firm* — Buchanan Ingersoll & Rooney PC

(57) ABSTRACT

A light valve that is operable in and electrically switchable between an optically clear and transparent state and an opaque state, wherein one or more polymerisable mesogenic compounds provided in a layer containing a liquid-crystalline medium that comprises one or more mesogenic compounds, one or more chiral compounds, one or more dichroic dyes and the one or more polymerisable mesogenic compounds are subjected to photopolymerisation. Further, a liquid-crystalline medium used in the method, a light valve obtained or respectively obtainable by carrying out the method, and the use of the light valve in mobile devices.

14 Claims, No Drawings

(56) References Cited

U.S. PATENT DOCUMENTS

| | | |
|---|---|---|
| 2019/0002430 A1 | 1/2019 | Manabe et al. |
| 2019/0185746 A1 | 6/2019 | Song et al. |

FOREIGN PATENT DOCUMENTS

| | | | |
|---|---|---|---|
| DE | 3040102 A1 | 6/1982 | |
| DE | 3110960 A1 | 9/1982 | |
| DE | 3150803 A1 | 9/1982 | |
| DE | 3201120 A1 | 10/1982 | |
| DE | 3115147 A1 | 11/1982 | |
| DE | 3115762 A1 | 11/1982 | |
| DE | 3123519 A1 | 12/1982 | |
| DE | 3126108 A1 | 1/1983 | |
| DE | 3202761 A1 | 8/1983 | |
| DE | 3523185 A1 | 1/1986 | |
| DE | 3534777 A1 | 4/1987 | |
| DE | 3534780 A1 | 4/1987 | |
| DE | 3617826 A1 | 4/1987 | |
| DE | 4342280 A1 | 6/1995 | |
| DE | 19541820 A1 | 5/1997 | |
| EP | 0034832 A1 | 9/1981 | |
| EP | 0043904 A2 | 1/1982 | |
| EP | 0044893 A1 | 2/1982 | |
| EP | 0048583 A1 | 3/1982 | |
| EP | 0054217 A1 | 6/1982 | |
| EP | 0056492 A1 | 7/1982 | |
| EP | 0059036 A1 | 9/1982 | |
| EP | 0060895 A1 | 9/1982 | |
| EP | 0068427 A1 | 1/1983 | |
| EP | 0698649 A1 | 2/1996 | |
| EP | 1038941 A1 | 9/2000 | |
| EP | 2166040 A1 | 3/2010 | |
| GB | 2065158 A | 6/1981 | |
| GB | 2065695 A | 7/1981 | |
| GB | 2079770 A | 1/1982 | |
| GB | 2081736 A | 2/1982 | |
| GB | 2082196 A | 3/1982 | |
| GB | 2094822 A | 9/1982 | |
| GB | 2094825 A | 9/1982 | |
| GB | 2328207 A | 2/1999 | |
| JP | 55123673 A | 9/1980 | |
| JP | 5657850 A | 5/1981 | |
| JP | 56104984 A | 8/1981 | |
| WO | 8201191 A1 | 4/1982 | |
| WO | 8202054 A1 | 6/1982 | |
| WO | 9800428 A1 | 1/1998 | |
| WO | 0060407 A1 | 10/2000 | |
| WO | 0206195 A1 | 1/2002 | |
| WO | 0206196 A1 | 1/2002 | |
| WO | 0206265 A1 | 1/2002 | |
| WO | 0234739 A1 | 5/2002 | |
| WO | 02094805 A1 | 11/2002 | |
| WO | 2014090373 A1 | 6/2014 | |
| WO | 2014187529 A1 | 11/2014 | |
| WO | 2015090497 A1 | 6/2015 | |
| WO | WO-2016173693 A1 * | 11/2016 | ......... C09K 19/3497 |
| WO | WO-2017041872 A1 * | 3/2017 | ......... C09K 19/0208 |
| WO | WO-2019110459 A1 * | 6/2019 | ............ C09K 19/04 |

OTHER PUBLICATIONS

Heo et al., "Fast-switching initially-transparent liquid crystal light shutter with crossed patterned", AIP Advances 5, 047118 (2015), 8 pages.

International Search Report and Written Opinion for International Application No. PCT/EP2020/066420, dated Sep. 23, 2020, 9 pages.

Yang et al., "Cholesteric liquid crystal/polymer dispersion for haze-free light shutters", Appl. Phys. Lett. 60 (25), Jun. 22, 1992, pp. 3102-3104.

Yu et al., "Light shutter using dye-doped cholesteric liquid crystals with polymer network structure", Journal of Information Display, 18:1, 2017, pp. 13-17.

Yu et al., "Simultaneous control of haze and transmittance using a dye-doped cholesteric liquid crystal cell", Liquid Crystals, 42:10, 2015, pp. 1460-1464.

English translation of the Office Action (Notification of the First Office Action) issued Dec. 26, 2023, by the China National Intellectual Property Administration in corresponding Chinese Patent Application No. 202080044188.3. (11 pages).

* cited by examiner

LIQUID CRYSTAL-BASED LIGHT VALVE

CROSS-REFERENCE TO RELATED APPLICATIONS

This application is a U.S. national stage application filed and claiming priority under 35 U.S.C. §§ 120 and 365(a) of International Application No. PCT/EP2020/066420, filed Jun. 15, 2020, which claims priority under 35 U.S.C. § 119 of European Patent Application No. 19180639.7, filed Jun. 17, 2019, each of which applications is incorporated herein by reference in its entirety and for all purposes.

BACKGROUND

The present invention relates to a method for preparing a light valve which is operable in and electrically switchable between an optically clear and transparent state and an opaque state, wherein one or more polymerisable mesogenic compounds provided in a layer containing a liquid-crystalline medium which comprises one or more mesogenic compounds, one or more chiral compounds, one or more dichroic dyes and the one or more polymerisable mesogenic compounds are subjected to photopolymerisation. The present invention further relates to a liquid-crystalline medium used in the method, to a light valve obtained or respectively obtainable by carrying out the method, and to the use of the light valve in mobile devices.

Devices for controlling or modulating the transmission of light are commonly used in display applications and they may also be used in various mobile devices such as eyewear, spectacles, goggles and visors and may be applied in the context of augmented and virtual reality environments. Optical intensity modulators such as light valves or light shutters can be based on liquid crystals (LCs). In principle, such light valves or light shutters may rely on the absorption of light or the scattering of light.

In some devices the transmission of light can be reversibly changed, typically through electrical switching, wherein the intensity of incident light can be attenuated, dimmed or tinted, while however exhibiting little or no scattering or haze in the different states of operation. Such devices may thus be operated in and switched between a bright state and a dark state, i.e. a state of relatively higher light transmission and a state of relatively lower light transmission, wherein both states are substantially non-hazy.

Several modes or configurations may be employed to provide such reversible transmission change. For twisted nematic (TN), super-twisted nematic (STN) and vertical alignment (VA) liquid crystal cells polarizers are used to control the light transmission. It is also possible to use guest-host liquid crystal cells which are based on a liquid crystal host which is doped with dichroic dye molecules. These guest-host systems can be used without any polarizers to alter the light transmission. However, in some embodiments and applications guest-host liquid crystal cells are used in combination with at least one polarizer.

LC-based light modulators using light scattering include so-called polymer dispersed liquid crystal (PDLC) or encapsulated or nematic curvilinear aligned phase liquid crystal (NCAP), polymer network liquid crystal (PNLC), cholesteric liquid crystal (CLC), polymer stabilized cholesteric texture liquid crystal (PSCT) and dynamic scattering liquid crystal devices. These scattering-type devices can be switched between a transparent state, i.e. an optically clear or non-hazy state, and a light scattering state, i.e. a translucent or hazy state.

When such a scattering-type device is switched from a non-scattering state, i.e. an optically clear state, to a scattering state, the transmission of light is changed such that a translucent appearance is produced, which may also be perceived as cloudy, turbid, diffuse or hazy. A device based on the scattering mode can in particular be used to temporarily provide privacy or the cloaking of features or information when desired by switching, typically electrically switching, the device from the optically clear state into the scattering state.

D.-K. Yang et al. in "Cholesteric liquid crystal/polymer dispersion for haze-free light shutters", Applied Physics Letters, 60 (1992) on pages 3102-3104 describe a dispersion of a polymer in low concentration with a cholesteric liquid crystal and the use of this material in light modulators which can be switched between an opaque light scattering state and a transparent state.

It is also possible to combine in a device light modulation by absorption and by scattering. This way an opaque state may be obtained which in addition to giving haze also exhibits a reduced overall light intensity. In a particular implementation dichroic dyes may be used for the attenuation of light, and in some instances these dyes can furthermore provide colouring.

In WO 00/60407 A1 electro-optical glazing structures are described which have opaque and transparent modes of operation.

B.-H. Yu et al. in "Simultaneous control of haze and transmittance using a dye-doped cholesteric liquid crystal cell", Liquid Crystals, 42 (2015) on pages 1460-1464 propose a light shutter device using dye-doped cholesteric liquid crystals for use in a see-through display.

J. Heo et al. in "Fast-switching initially-transparent liquid crystal light shutter with crossed patterned electrodes", AIP Advances, 5, 047118 (2015) describe a light shutter using polymer-networked liquid crystals and dichroic dyes with crossed patterned electrodes which is switchable between a transparent state and an opaque state. In the opaque state the device can block a background image and provide black colour. The proposed light shutter may have potential applications in see-through displays and smart windows.

B.-H. Yu et al. in "Light shutter using dye-doped cholesteric liquid crystals with polymer network structure", Journal of Information Display, 18 (2017) on pages 13-17 propose a light shutter using dye-doped cholesteric liquid crystals with a polymer network structure for use in see-through displays.

There is a need in the art for further light modulators, in particular light valves such as light shutters, with improved optical and electro-optical performance. There is also a need in the art for a suitable process to produce such switchable devices.

SUMMARY

An object of the present invention is therefore to provide a facile, efficient and robust method to prepare light valves which are operable in and electrically switchable between an optically transparent state and an opaque state and which have an improved optical and electro-optical performance. It is a further object of the present invention to provide light valves which have a favourable performance and which are particularly suitable for use in mobile and portable devices as well as in the context of augmented reality or respectively virtual reality. Another object is to provide liquid-crystalline media with advantageous chemical, physical and electro-optical properties which are particularly suitable for use in the method according to the invention and which result in favourable modulation materials in the light valves. Further objects of the present invention are immediately evident to the person skilled in the art from the following detailed description.

The objects are solved by the subject-matter defined in the independent claims, while preferred embodiments are set forth in the respective dependent claims and are further described below.

The present invention in particular provides the following items including main aspects, preferred embodiments and particular features, which respectively alone and in combination contribute to solving the above objects and eventually provide additional advantages.

A first aspect of the present invention provides a method for the preparation of a light valve which is operable in and electrically switchable between an optically transparent state and an opaque state, comprising
(i) providing a liquid-crystalline medium which comprises one or more mesogenic compounds, one or more chiral compounds, one or more dichroic dyes and one or more polymerisable mesogenic compounds as a layer interposed between two opposing transparent substrates which are each provided with an electrode, wherein the liquid-crystalline medium has a clearing point of 70° C. or more, and
wherein the one or more polymerisable mesogenic compounds are contained in the medium in an amount, based on the overall contents of the medium, of 4% by weight or less, and
(ii) polymerising the one or more polymerisable mesogenic compounds in the layer using photopolymerisation.

A light valve herein means an element for the modulation of light which is configured as a cell formed of two walls, in particular two transparent substrates, which are spaced apart and which are provided with electrodes, and wherein the cell contains a light modulation material.

The optically transparent state refers to a low-haze high transmittance state. Preferably, in the optically transparent state the light valve as prepared has a haze, preferably determined according to ASTM D 1003, of less than 15% and a degree of light transmission, preferably determined in accordance with DIN EN410, of more than 45%. The opaque state refers to a high-haze low transmittance state. Preferably, in the opaque state the light valve as prepared has a haze, preferably determined according to ASTM D 1003, of more than 65% and a degree of light transmission, preferably determined in accordance with DIN EN410, of less than 35%.

In the present invention it was recognized that for certain circumstances and applications it is desirable to provide light valves which are particularly advantageous for use in mobile or portable devices. Besides lightweight construction, it is desired in this case to obtain fast switching as well as low operating voltages and low power consumption. It has surprisingly been found that by using the method and the combination of materials according to the invention light valves can be obtained which exhibit fast switching and which can be operated at suitably low voltages and with low energy consumption. In addition, the method provides light valves with advantageous performance even at low temperatures, in particular with respect to the switching speed. These combined properties give significant benefits in view of the use of the device in mobile applications. In addition, despite exposing the medium to photopolymerisation in the method, it has surprisingly been found that light valves can be prepared which exhibit good reliability, durability and stability, e.g. with respect to electrical breakdown and light stability.

Surprisingly, the method according to the invention provides a facile and efficient process to prepare the light valve which exhibits the advantageous properties as described herein.

Another aspect of the invention relates to a light valve which is operable in and electrically switchable between an optically transparent state and an opaque state, wherein the light valve is obtained by or respectively obtainable from carrying out the method according to invention described herein above and below.

In the present invention it was recognized that favourable performance and appearance is not only desirable in the opaque state but also in the optically transparent state, where in the latter state unwanted haze should be avoided or minimized and the transmittance should be relatively high. The light valve as provided according to the invention can favourably give such a low-haze transparent state, while furthermore giving adequately efficient and sufficiently uniform scattering together with the possibility to adjust and in particular minimize overall light transmission in the opaque state. In addition, the device can provide further benefits such as a favourably low switching voltage and low energy consumption, fast switching between the states as well as good reliability, durability and stability, e.g. with respect to electrical breakdown and light stability.

Moreover, the materials and the method used according to the invention also give the possibility to use active matrix addressing in the switchable cell. By segmenting the light valve into a multitude of pixels the display of information and the use in the context of augmented or virtual realities can thus be realized.

In an aspect of the invention there is provided a light valve which is operable in and electrically switchable between an optically transparent state and an opaque state and which comprises a switching layer containing a material which comprises
a liquid-crystalline medium comprising one or more mesogenic compounds, one or more chiral compounds and one or more dichroic dyes, wherein the liquid-crystalline medium has a clearing point of 70° C. or more, and
a polymeric component comprising one or more polymeric structures obtained by or respectively obtainable from polymerisation of one or more polymerisable mesogenic compounds, wherein the polymeric component is contained in the material in an amount, based on the overall contents of the material, of 4% by weight or less,
wherein the light valve in the optically transparent state has a haze, preferably determined according to ASTM D 1003, of less than 15% and a degree of light transmission, preferably determined in accordance with DIN EN410, of more than 45% and in the opaque state has a haze, preferably determined according to ASTM D 1003, of more than 65% and a degree of light transmission, preferably determined in accordance with DIN EN410, of less than 35%.

According to the invention a device for light management is provided which can perform both absorption and scattering of light. The device can thus transition between two different optical states, namely a low-haze high-transmittance state and a high-haze low-transmittance state. The light valve is useful for regulating or modulating the passage of light, in particular the passage of sunlight but also of light from artificial light sources like lamps, light-emitting diodes, in particular organic light-emitting diodes, and light fixtures. In the opaque state the light valve can produce a visual barrier.

According to a preferred embodiment the liquid-crystalline medium which is comprised in the material contained in the switching layer of the light valve exhibits a pitch of 0.55 μm or more in the opaque state.

It has surprisingly been found that an improved light valve can be obtained by providing a switching layer which contains a material which comprises the liquid-crystalline medium and the polymeric component as set forth above and below. In particular, providing the cholesteric or chiral nematic medium having a high clearing point and preferably a long pitch as presently defined in combination with a relatively small amount of a polymeric component which includes polymeric structures obtainable from polymerisation of at least one polymerisable mesogenic compound can surprisingly give a device which has a favourable clear state, i.e. a favourably homogeneous low haze and optically transparent state, as well as a scattering state having an enhanced scattering efficiency, wherein the device can be conveniently switched between the states by applying an electrical voltage.

In particular, the preferred combination of the long pitch cholesteric medium with the presence of the polymeric component as herein described can give unexpectedly strong scattering with a suitably broad angular scattering distribution. This is beneficial in that already the provision of only a single switching layer in the element can result in a suitable haze. In addition, the thickness of the switching layer may be comparatively low, in particular substantially below 50 μm, which thus reduces the operating voltage and power consumption but also the use of material.

Furthermore, by suitably providing one or more dichroic dyes in the liquid-crystalline medium, preferably in solution, the light transmittance especially in the opaque state can be favourably adjusted and minimized as desired, while also giving the possibility to provide a coloured opaque state.

By setting and adjusting the combination of materials as presently defined a light valve with a favourable performance can be obtained.

Therefore, another aspect of the invention relates to a liquid-crystalline medium, in particular for use in the method according to the invention, which comprises one or more polymerisable mesogenic compounds in an amount, based on the overall contents of the medium, of 4% by weight or less, one or more mesogenic compounds, one or more chiral compounds, and one or more dichroic compounds.

It has surprisingly been found that by providing the liquid-crystalline medium according to the invention a medium with improved properties, in particular a suitably high clearing point and preferably a suitably long pitch, can be obtained which is particularly useful for preparing modulation materials for switching layers and light valves according to the invention. In addition, the media can provide further benefits such as a broad liquid-crystalline phase, a suitably high optical anisotropy, a favourably high voltage holding ratio (VHR), good low-temperature stability and good light stability.

In a further aspect of the present invention there is provided a light modulation material, in particular for use in the light valve according to the invention, which comprises
a liquid-crystalline medium comprising one or more mesogenic compounds, one or more chiral compounds and one or more dichroic dyes, wherein the liquid-crystalline medium has a clearing point of 70° C. or more, and
a polymeric component comprising one or more polymeric structures obtained by or respectively obtainable from polymerisation of one or more polymerisable mesogenic compounds, wherein the polymeric component is contained in the material in an amount, based on the overall contents of the material, of 4% by weight or less.

The modulation material according to the invention can be beneficially used in switching elements, preferably in light variable devices to adjust light and in particular in light valves based on the scattering and dimming of light. The modulation material according to the invention is useful in devices for regulating the passage of electromagnetic radiation, preferably light, and in particular sunlight but also light from artificial light sources.

It is particularly preferred that the modulation material according to the invention is used in CLC scattering-type devices. It has presently been recognized that particular benefits, e.g. in terms of scattering efficiency or uniformity and appearance of the scattering effect, can be obtained when the material contains the chiral nematic or cholesteric liquid-crystalline medium which has a favourably high clearing point and preferably a relatively long pitch in combination with the polymeric component as presently defined, and in particular when a so-called polymer stabilized cholesteric texture (PSCT) is provided.

Surprisingly, the modulation material obtained from carrying out the process described herein can exhibit good reliability and stability, in particular light stability. By favourably adjusting and matching the provided material combination and the process conditions as described herein, a stable and efficient modulation material containing one or more dichroic dyes is obtainable despite subjecting the initial medium to photopolymerisation.

According to the invention the liquid-crystalline medium and the modulation material as described herein can be beneficially arranged and used in a switching layer. In a further aspect there is thus provided a switching layer which comprises, preferably consists of, the medium or respectively the material according to the invention.

The switching layer can be arranged between two substrates such as to give a switching element which is electrically switchable and operable in an optically transparent state and an opaque state.

Polymerisation stabilization can provide benefits for the scattering performance and efficiency in the scattering state, while still allowing to achieve favourable clarity in the transparent state.

Another aspect of the present invention relates to the use of the light valve in a mobile device or respectively a portable device.

In addition to the low operating voltage and the low power consumption, the light valve can favourably give fast switching times, a reduced temperature dependence and reliable switching also at low temperatures, for example at 0° C. and even below. The combined properties are especially useful in mobile applications. The light valve can temporarily, i.e. for given periods of time but not for others, contribute to achieving enhanced contrast or readability of information as desired in mobile applications, e.g. in transparent or normally see-through displays and under different lighting conditions, in particular different ambient light conditions.

Without limiting the present invention thereby, in the following the invention is illustrated by the detailed description of the aspects, embodiments and particular features, and particular embodiments are described in more detail.

DETAILED DESCRIPTION

The term "liquid crystal" (LC) herein preferably relates to materials or media having liquid-crystalline mesophases in some temperature ranges (thermotropic LCs). They contain mesogenic compounds.

The terms "mesogenic compound" and "liquid crystal compound" mean a compound comprising one or more calamitic (rod- or board/lath-shaped) or discotic (disc-shaped) mesogenic groups, i.e. groups with the ability to induce liquid-crystalline phase or mesophase behaviour.

The LC compounds or materials and the mesogenic compounds or materials comprising mesogenic groups do not necessarily have to exhibit a liquid-crystalline phase themselves. It is also possible that they show liquid-crystalline phase behaviour only in mixtures with other compounds. This includes low-molecular-weight non-reactive liquid-crystalline compounds, reactive or polymerisable liquid-crystalline compounds, and liquid-crystalline polymers.

A calamitic mesogenic compound is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

For the sake of simplicity, the term "liquid crystal" or "liquid-crystalline" material or medium is used for both liquid crystal materials or media and mesogenic materials or media, and vice versa, and the term "mesogen" is used for the mesogenic groups of the material.

The term "non-mesogenic compound or material" means a compound or material that does not contain a mesogenic group as defined above.

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post-polymerisation purification processes, are typically mixed or co-mingled with the polymer such that they generally remain with the polymer when it is transferred between vessels or between solvents or dispersion media.

The term "polymerisation" means the chemical process to form a polymer by bonding together multiple polymerisable groups or polymer precursors (polymerisable compounds) containing such polymerisable groups.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" or "non-polymerisable" compounds.

The terms "film" and "layer" include rigid or flexible, self-supporting or freestanding films or layers with more or less pronounced mechanical stability, as well as coatings or layers on a supporting substrate or between two substrates.

The term "chiral" in general is used to describe an object that is non-superimposable on its mirror image. By contrast, "achiral" (non-chiral) objects are objects that are identical to their mirror image. The medium according to the invention exhibits chirality. This can be achieved by providing cholesteric liquid crystals, which are also known as chiral nematic liquid crystals. The terms chiral nematic and cholesteric are used synonymously herein, unless explicitly stated otherwise.

Herein

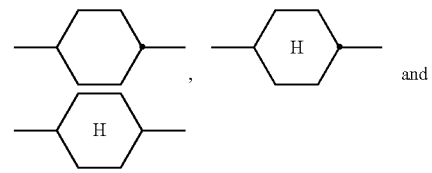

denote trans-1,4-cyclohexylene.

Herein, unless explicitly stated otherwise, all concentrations are given in weight percent and relate to the respective complete mixture.

All temperatures are given in degrees centigrade (Celsius, ° C.) and all differences of temperatures in degrees centigrade. All physical properties and physicochemical or electro-optical parameters are determined and given for a temperature of 20° C., unless explicitly stated otherwise.

Transmission and scattering of light preferably refers to the transmission and scattering of electromagnetic radiation in the spectral range from 380 nm to 780 nm.

Switching preferably refers to the switching between binary states, wherein preferably one state is non-scattering and appears substantially transparent or clear to the human eye and another state is scattering or has diffusive transmission and appears translucent or opaque to the human eye. The opaque state can at the same time give a black colour or alternatively another colour which does not cover the entire visible spectrum.

However, it is also possible for the switching layer according to the invention to have further switching states, in particular intermediate states.

Therefore, according to the invention preferably and favourably switching between a completely opaque state and a state with visibility through the device is obtainable.

In the optically transparent state according to the invention the light valve preferably has a haze, preferably determined according to ASTM D 1003, of less than 15%, more preferably less than 10%, even more preferably less than 5% and in particular less than 2.5% and a degree of light transmission, preferably determined in accordance with DIN EN410, of more than 45%, more preferably more than 50%, even more preferably more than 55% and in particular more than 65%.

In the opaque state according to the invention the light valve preferably has a haze, preferably determined according to ASTM D 1003, of more than 65%, more preferably more than 80%, even more preferably more than 90% and a degree of light transmission, preferably determined in accordance with DIN EN410, of less than 35%, more preferably less than 25%, even more preferably less than 10% and in particular less than 5%. It is particularly preferred that in the opaque state the light valve according to the invention has a haze, preferably determined according to ASTM D 1003, of 75% or more.

For the measurement of haze hazemeters made by BYK-Gardner may be used. It is also possible to use spectrophotometers, in particular a spectrophotometer and an Ulbricht's sphere.

Switching according to the invention preferably means electrical switching. Electrical switching can typically be achieved by providing substrates, e.g. glass or plastic substrates, with electrodes. In an embodiment electrically conductive layers are provided on the substrates, wherein the conductive layers comprise or are formed of a transparent conductive material, e.g. a transparent conductive oxide, preferably indium tin oxide (ITO) or $SnO_2$:F, in particular ITO, or a conductive polymer, or a thin transparent metal and/or metal oxide layer, for example silver. The electrically conductive layers are preferably provided with electrical connections. The voltage is preferably supplied by a battery, a rechargeable battery, a supercapacitor or an external current source, more preferably by an external current source.

In an embodiment there are provided orientation layers, e.g. made of polyimide (PI), on the substrates. It is particularly preferred that electrically conductive layers and orientation layers are provided together on the substrates. In this case the orientation layer or alignment layer is provided on top of the conductive layer such that the orientation layer is contacting the LC medium. The orientation layers, preferably polyimide layers, may be arranged such that they provide, in particular at the interface, homogeneous or planar orientation or alternatively homeotropic orientation of the molecules of the liquid-crystalline medium. In a particular embodiment rubbed polyimide is used on both substrates having a difference in direction of 90° as used in the so-called twisted nematic (TN) geometry.

In a particular embodiment alignment layers with pre-tilt angles are used, e.g. having pre-tilt angles ranging from 0° to 20° for the TN geometry or from 80° to 90° for the vertically aligned (VA) geometry.

Alternatively and according to another embodiment, substrates without orientation layers are used. It has surprisingly been found that the provision of orientation layers, e.g. polyimide layers, as additional layers may beneficially be avoided, while effective and efficient switching behaviour may still be realized.

It is also possible to provide passivation or barrier layers on the substrates, alternatively but also in addition to orientation layers, e.g. passivation layers comprising silicon oxide or silicon nitride, preferably consisting of silicon oxide or silicon nitride. In case both a passivation layer and an orientation layer are provided on a substrate they are arranged such that the orientation layer is topmost, i.e. is contacting the LC medium.

The method according to the invention provides a switching element and in particular a light valve, which is operable in and electrically switchable between an optically transparent state and an opaque state and which comprises a switching layer. The switching layer obtainable by carrying out the method contains a material which comprises a liquid-crystalline medium comprising one or more mesogenic compounds, one or more dichroic dyes and one or more chiral compounds, and a polymeric component comprising one or more polymeric structures obtained by or respectively obtainable from the polymerisation of the one or more polymerisable mesogenic compounds.

According to the invention the polymeric component is contained in the material in an amount, based on the overall contents of the material, of 4% by weight or less, preferably 3% by weight or less, more preferably 2% by weight or less, and in particular 1% by weight or less. In a preferred embodiment the polymeric component is contained in the material in an amount, based on the overall contents of the material, in the range from 0.5% by weight to 1.5% by weight.

The polymeric component comprises one or more polymeric structures obtained by or respectively obtainable from polymerisation of one or more polymerisable mesogenic compounds. It is preferred that the polymeric component is obtained from polymerising exclusively one or more polymerisable mesogenic compounds, i.e. that the polymeric component consists of one or more polymeric structures which are only based on or respectively only derived from one or more polymerisable mesogenic compounds as the precursors.

In accordance with the present method the polymeric component is preferably prepared in situ, in particular in the switching layer, by polymerising one, two or three polymerisable mesogenic compounds, even more preferably one or two polymerisable mesogenic compounds.

Polymerisable mesogenic compounds according to the invention contain a mesogenic group and one or more polymerisable groups, i.e. functional groups which are suitable for polymerisation. These compounds are also known as reactive mesogens (RMs) or mesogenic monomers. The RMs can be monoreactive and/or di- or multireactive.

It is preferred that the liquid-crystalline medium for use in the method comprises at least one di- or multireactive polymerisable mesogenic compound.

While it is preferred that the polymerisable compound(s) as used according to the invention include(s) only reactive mesogen(s), i.e. all the reactive monomers are mesogens, in an alternative embodiment it is also possible to use one or more RMs in combination with one or more non-mesogenic polymerisable compounds.

The polymerisable compounds and the mesogenic compounds may be chosen in view of matching the refractive indices of the obtained polymeric component and the LC medium in the modulation material, which can favourably contribute to improving the clear state.

According to the invention the liquid-crystalline medium, in particular as used in the method and as provided in the light valve, has a clearing point of 70° C. or more, more preferably 80° C. or more, even more preferably 90° C. or more, yet even more preferably 98° C. or more, still even more preferably 102° C. or more, and in particular 115° C. or more. It is preferred that the medium has a clearing point in the range from 90° C. to 160° C. and more preferably from 100° C. to 150° C.

All physical properties and physicochemical or electro-optical parameters are determined by generally known methods, in particular according to "Merck Liquid Crystals, Physical Properties of Liquid Crystals", Status November 1997, Merck KGaA, Germany.

The clearing point, in particular the phase transition temperature between the chiral nematic or cholesteric phase and the isotropic phase, can be measured and determined by commonly known methods, e.g. using a Mettler oven, a hot-stage under a polarizing microscope, or differential scanning calorimetry (DSC) analysis. According to the invention the clearing point is preferably determined using a Mettler oven.

Furthermore, according to the invention the liquid-crystalline medium, preferably as used in the switching layer of the light valve, exhibits a pitch of 0.55 μm or more in the scattering state.

The cholesteric or chiral nematic medium as presently provided preferably has a relatively long pitch, and in particular a pitch which preferably gives Bragg-type reflection of greater than 780 nm. In this case also the planar texture may give favourable transmission over the visible light spectrum.

The pitch herein means the pitch p of the cholesteric helix, wherein the pitch p is the distance for the orientational axis (director) of the CLC to undergo a 2π rotation. In a preferred embodiment the medium exhibits a pitch of 0.75 μm or more, even more preferably of 1.00 μm or more and in particular of 1.50 μm or more.

Preferably the concentration of the one or more chiral dopants is set such that the resulting chiral pitch is in the range of 0.55 μm to 10 μm.

According to the invention the pitch is determined from NIR spectroscopic measurement, in particular at 20° C., of the wavelength of the selective reflection maximum $\lambda_{max}$. The pitch p is determined from the measured value of $\lambda_{max}$ using the equation $\lambda_{max}=n(\lambda_{max})*p$, wherein $n(\lambda_{max})$ is the refractive index at $\lambda_{max}$.

It is also possible to use the wedge cell method which is known in the art to measure, in particular at 20° C., the helical twisting power HTP and to confirm the determined the pitch.

Surprisingly the light valve according to the invention can be switched to and operated in an opaque state which gives efficient and sufficiently strong scattering, in particular diffuse transmittance, with a homogeneous appearance to the eye, in particular also over larger areas. This uniform appearance advantageously includes a colour-neutral appearance, which means that unwanted colour artefacts such as a rainbow-like appearance can be minimized or even avoided.

It is believed that the material as provided in the switching layer according to the invention can give sufficient scattering with the desired haze, e.g. by scattering from the material domains, in particular from boundaries, defects or random structures, whereas diffraction of incident light as caused by periodic structures may be substantially suppressed or avoided by sufficiently perturbing or disrupting the periodicity on the relevant length scales, in particular by the introduction of the polymeric component, which surprisingly may be effective in this regard even when contained in only small amounts.

In addition, by using the method according to the invention it is possible to obtain light valves which advantageously have an optically clear state with little or no discernible residual haze and relatively large light transmittance.

The light valve itself preferably does not comprise any light sources. The light valve may suitably be integrated into electro-optical devices such as displays, screens or spectacles, for example by lamination, gluing or mounting.

Preferably the light valve contains no polarizer.

The light valve may be realized in a range of different sizes, e.g. from a small size of about 1 mm² up to a size of 1 m² and beyond, and it may have different shapes, e.g. square, rectangular, round, elliptic, triangular or polygonal.

According to the invention the state of the switching layer and the light valve is controlled using an electric field which is applied by means of electrodes. The electrodes are preferably transparent electrodes which are arranged on the substrates in the form of a coating. The coating is commonly applied to the substrate side or surface which is facing the switching layer.

In an embodiment the electrodes are not patterned and/or structured so that they are contiguous. Thus, the entire switchable area is addressed and switched at the same time by applying an electric field. In alternative embodiments the electrodes may be patterned to form individually addressable areas or pixels which may be switched independently from other areas by applying an electric field. In this case, commonly used TFT technology may be used to actively and independently address the segmented areas.

As described herein the liquid-crystalline medium is used in the method and provided in the obtained switching layers and light valves.

In a preferred embodiment the LC medium as used according to the invention has a positive dielectric anisotropy. In this case preference is given to liquid-crystalline mixtures having a dielectric anisotropy Δε in the range from 3 to 45, more preferably in the range from 5 to 30.

Δε denotes the dielectric anisotropy, wherein $\Delta\varepsilon=\varepsilon_{\parallel}-\varepsilon_{\perp}$. The dielectric anisotropy Δε is determined at 20° C. and 1 kHz.

In an alternative embodiment it is however also possible to provide an LC medium having a negative dielectric anisotropy. In this case preference is given to liquid-crystalline mixtures having a dielectric anisotropy Δε in the range from −6 to −3.

Favourably the medium according to the invention can have a suitably high optical anisotropy Δn, which is also known as the birefringence. The medium as described herein and as used in the switching layer and the light valve according to the invention preferably exhibits an optical anisotropy Δn, determined at 20° C. and 589 nm, of 0.13 or more, more preferably of 0.16 or more and even more preferably of 0.20 or more.

Above and below, Δn denotes the optical anisotropy, wherein $\Delta n=n_e-n_o$, and the optical anisotropy Δn is determined at 20° C. and a wavelength of 589.3 nm.

It is preferred that the medium as used according to the invention comprises one or more mesogenic compounds selected from the compounds of formulae I and II

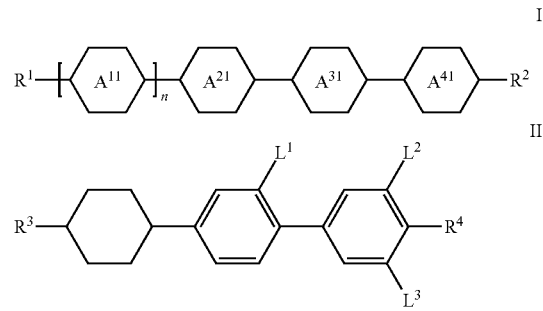

wherein

R¹ and R² denote, independently of one another, a group selected from F, Cl, CF₃, OCF₃, and straight-chain or branched alkyl or alkoxy having 1 to 15 carbon atoms or straight-chain or branched alkenyl having 2 to 15 carbon atoms which is unsubstituted, monosubstituted by CN or CF₃ or mono- or polysubstituted by halogen and wherein one or more CH₂ groups may be, in each case independently of one another, replaced by —O—, —S—, —CO—, —COO—, —OCO—, —OCOO— or —C≡C— in such a manner that oxygen atoms are not linked directly to one another, $A^{11}$ denotes

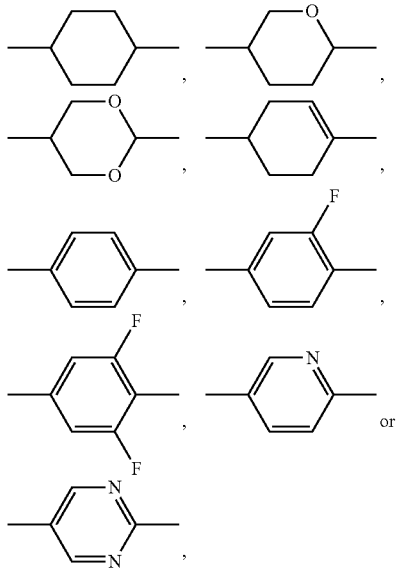

n denotes 0 or 1, and $A^{21}$, $A^{31}$ and $A^{41}$ denote, independently of one another,

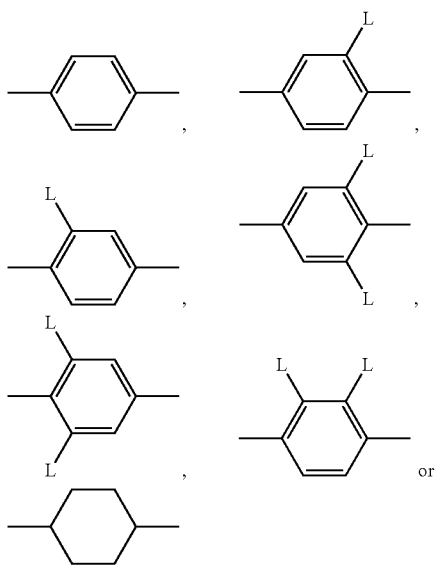

wherein L is on each occurrence, identically or differently, halogen selected from F, Cl and Br, and $R^3$ and $R^4$ denote, independently of one another, a group selected from F, $CF_3$, $OCF_3$, CN, and straight-chain or branched alkyl or alkoxy having 1 to 15 carbon atoms or straight-chain or branched alkenyl having 2 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, and $L^1$, $L^2$ and $L^3$ denote, independently of one another, H or F.

It is particularly preferred that the medium as used according to the invention contains, based on the overall contents of the medium, at least 5% by weight, more preferably at least 10% by weight and even more preferably 15% by weight of the one or more mesogenic compounds selected from the compounds of formulae I and II.

In addition to a suitably high optical anisotropy, the medium according to the invention can advantageously exhibit a favourably high voltage holding ratio (VHR) in combination with good light stability and a suitably high clearing point.

Using reactive mesogens, in particular at the low amounts as specified, and preferably using chiral dopant having a high HTP, which can allow the use in low concentrations, can advantageously contribute to maintaining a favourably high clearing point.

The medium is a cholesteric or chiral nematic medium. Cholesteric liquid crystals (CLCs) usually contain a medium which has, for example, in the initial state a planar structure which reflects light having a certain wavelength, and which can be switched into a focal conic, light-scattering structure by application of an electrical alternating-voltage pulse, or vice versa. On application of a stronger voltage, in particular a stronger voltage pulse, the CLC medium can be switched into a homeotropic, transparent state, from which it relaxes into the planar state after rapid switching-off of the voltage or into the focal conic state after slow switching-off.

In the planar texture Bragg reflection occurs, where the reflected light has the same handedness as the cholesteric helix.

In the focal conic state, the helical axes are randomly arranged and the texture shows light scattering because of the discontinuous spatial variations of the refractive indices at the domain boundaries.

Both planar and focal conic configurations are typically stable in the absence of an external electric field. The effect of electric-field-driven textural transitions between planar and focal conic states forms the basis of operation of CLC displays, wherein when the texture of the CLC is switched from the planar to the focal conic texture, the Bragg reflection disappears and the CLC scatters the incident light due to the helical axes being randomly distributed However, the switching between the states is typically achieved only through the homeotropic state, where the cholesteric helix is completely unwound by a dielectric coupling between LC molecules with positive dielectric anisotropy ($\Delta\varepsilon>0$) and a vertical electric field.

In an embodiment according to the invention the hazy opaque state of the switching layer can be the focal conic state described above.

Alternatively, and according to a preferred embodiment, in the present invention the high haze state is formed by a polydomain structure. Preferably this polydomain structure can produce sufficiently strong scattering, while at the same time Bragg-type reflection behaviour still remains observable, at least to some extent. In this phase which comprises, preferably consists of, polydomains the orientation of the helical axis typically varies from domain to domain, and domain boundaries typically occur. Macroscopically however the phase can appear homogeneous, in particular homogeneously opaque or hazy to the human eye, and be free from visible defects over the entire layer area.

The polydomain structure is obtainable, for example, using conventional orientation layers oriented in a planar or homeotropic manner and advantageously switching to the polydomain state may be achievable at a comparatively low voltage. The polydomain structure is however also obtainable when orientation layers are not present.

In addition, the presence of the polymeric component in the modulation material and the switching layer can favourably influence and stabilize the scattering performance.

In a preferred embodiment the non-scattering or clear state can be formed by the homeotropic state described above. In this respect the advantageously high VHR that is presently obtainable can be useful in stabilizing the element in this state against self-discharging behaviour and thus allowing to sustain the state even with significantly lower refresh rates and/or lower power consumption.

Alternatively, the non-scattering or clear state can be formed by the planar texture described above.

Using the chiral nematic or cholesteric medium can be beneficial in that relatively stable states, and even bistability, can be provided such that devices comprising the medium may consume less energy. In particular, a respective state may be retained, at least for a considerable time, after the electric field has been switched off, and less frequent addressing or refreshing of voltage may be possible.

In a preferred embodiment the light valve is switchable into an optically transparent state by applying an AC voltage V1 and is switchable into an opaque state by applying an AC voltage V2, wherein V1>V2.

In an embodiment the switched clear state, in particular a state having a homeotropic alignment, is maintained by applying a voltage in the range of 15 V to 100 V, more preferably 20 V to 80 V, and in particular 25 V to 50 V, while the switched opaque state may be stable, at least for some time, even at 0 V.

Preferably the light valve according to the invention does not use dual frequency addressing, which can simplify the required electronics.

As described above, the medium preferably exhibits a selective reflection with a wavelength of greater than 780 nm. Accordingly the medium preferably reflects in the near infrared (NIR) spectral region.

Chiral dopants and their concentrations can be provided such that the cholesteric pitch of the medium is suitably set or adjusted. A CLC medium can be prepared, for example, by doping a nematic LC medium with a chiral dopant having a high twisting power. The pitch p of the induced cholesteric helix is then given by the concentration c and the helical twisting power HTP of the chiral dopant in accordance with equation (1):

$$p = (HTP\ c)^{-1} \quad (1)$$

It is also possible to use two or more dopants, for example in order to compensate for the temperature dependence of the HTP of the individual dopants and thus to achieve small temperature dependence of the helix pitch and the reflection wavelength of the CLC medium. For the total HTP ($HTP_{total}$) then approximately equation (2) holds:

$$HTP_{total} = \Sigma_i c_i\ HTP_i \quad (2)$$

wherein $c_i$ is the concentration of each individual dopant and $HTP_i$ is the helical twisting power of each individual dopant.

The liquid-crystalline medium contains one or more chiral compounds, in particular one or more chiral dopants. The chiral dopants preferably have a high absolute value of the HTP and can generally be added in relatively low concentrations to mesogenic base mixtures and have good solubility in the achiral component. If two or more chiral compounds are employed, they may have the same or opposite direction of rotation and the same or opposite temperature dependence of the twist.

Preferably, the one or more chiral compounds according to the invention have an absolute value of the helical twisting power of 5 $\mu m^{-1}$ or more, more preferably of 10 $\mu m^{-1}$ or more and even more preferably of 15 $\mu m^{-1}$ or more, preferably in the commercial liquid-crystal mixture MLC-6828 from Merck KGaA. Particular preference is given to chiral compounds having an absolute value of the helical twisting power (HTP) of 20 $\mu m^{-1}$ or more, more preferably of 40 $\mu m^{-1}$ or more, even more preferably of 60 $\mu m^{-1}$ or more, and most preferably in the range of 80 $\mu m^{-1}$ or more to 260 $\mu m^{-1}$ or less, preferably in the commercial liquid-crystal mixture MLC-6828 from Merck KGaA.

Preferably the one or more chiral compounds are contained in the liquid-crystalline medium in an amount, based on the overall contents of the medium, of 2% by weight or less, more preferably 1% by weight or less and even more preferably 0.5% by weight or less.

In a preferred embodiment of the present invention, the chiral component consists of two or more chiral compounds which all have the same sign of the HTP. The temperature dependence of the HTP of the individual compounds may be high or low. The temperature dependence of the pitch of the medium can be compensated by mixing compounds having different temperature dependence of the HTP in corresponding ratios.

Suitable chiral dopants are known in the art, some of which are commercially available, such as, for example, cholesteryl nonanoate, R/S-811, R/S-1011, R/S-2011, R/S-3011, R/S-4011, R/S-5011, in particular R-5011, B(OC) 2C*H—C-3 or CB15 (all Merck KGaA, Darmstadt, Germany).

Particularly suitable chiral dopants are compounds which contain one or more chiral radicals and one or more mesogenic groups, or one or more aromatic or alicyclic groups which form a mesogenic group with the chiral radical.

Suitable chiral radicals are, for example, chiral branched hydrocarbon radicals, chiral ethanediols, binaphthols or dioxolanes, furthermore mono- or polyvalent chiral radicals selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral radicals are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4:3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, wherein one or more $CH_2$ groups are substituted by alkyl or alkoxy; amino acids, such as, for example, alanine, valine, phenylglycine or phenylalanine, or sequences of from 2 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral radicals and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820.

Preferable chiral compounds used according to the present invention are selected from the following groups of compounds.

In an embodiment preference is given to dopants selected from the group consisting of compounds of the following formulae A-I to A-III:

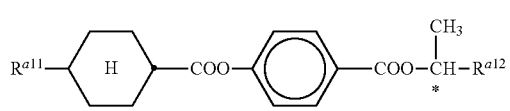

A-I

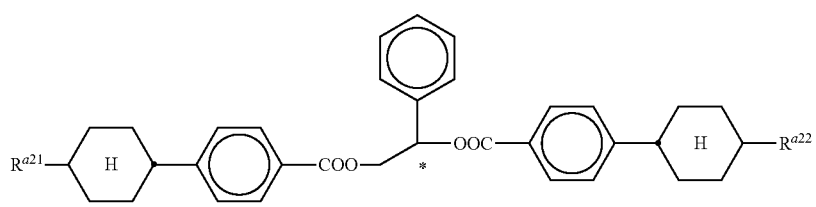

A-II

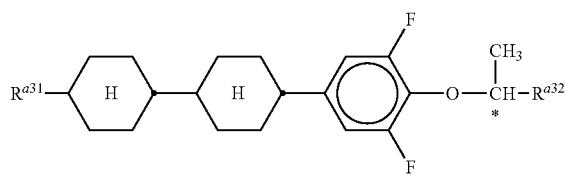

A-III in which $R^{a11}$ and $R^{a12}$, independently of one another, are alkyl, oxaalkyl or alkenyl having from 2 to 9, preferably up to 7, carbon atoms, and $R^{a11}$ is alternatively methyl or alkoxy having from 1 to 9 carbon atoms, preferably both are alkyl, preferably n-alkyl, $R^{a21}$ and $R^{a22}$, independently of one another, are alkyl or alkoxy having from 1 to 9, preferably up to 7, carbon atoms, oxaalkyl, alkenyl or alkenyloxy having from 2 to 9, preferably up to 7, carbon atoms, preferably both are alkyl, preferably n-alkyl, $R^{a31}$ and $R^{a32}$, independently of one another, are alkyl, oxaalkyl or alkenyl having from 2 to 9, preferably up to 7, carbon atoms, and $R^{a11}$ is alternatively methyl or alkoxy having from 1 to 9 carbon atoms, preferably both are alkyl, preferably n-alkyl.

Particular preference is given to chiral dopants selected from the group consisting of the compounds of the following formulae:

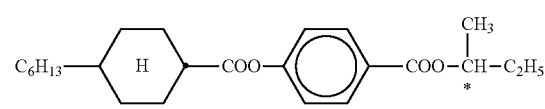

A-I-1

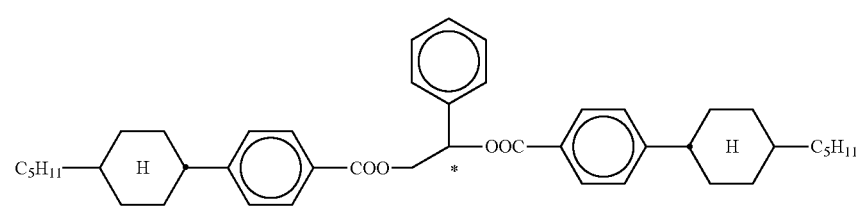

A-II-1

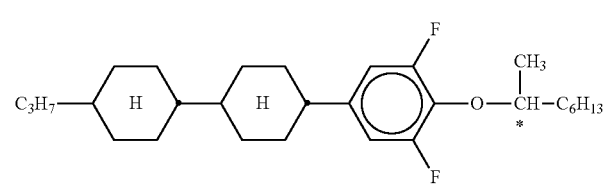

A-III-1

Further preferred dopants are derivatives of isosorbide, isomannitol or isoiditol of the following formula A-IV

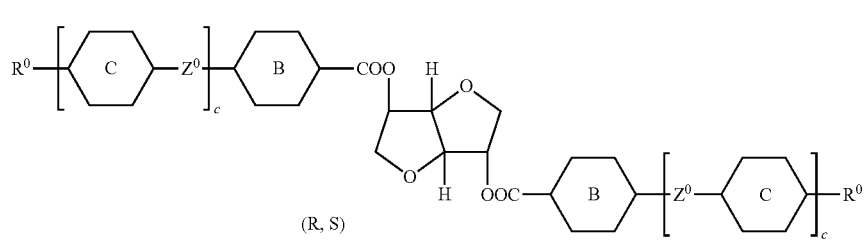
(R, S)

in which the group

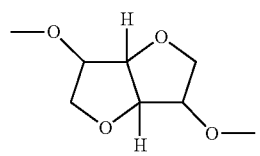

is

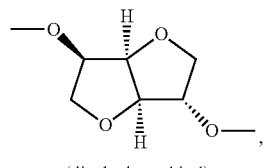
(dianhydrosorbitol)

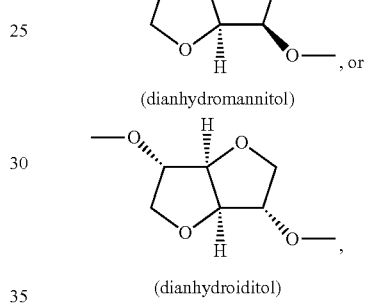
(dianhydromannitol)
(dianhydroiditol)

preferably dianhydrosorbitol, and chiral ethanediols, such as, for example, diphenylethanediol (hydrobenzoin), in particular mesogenic hydrobenzoin derivatives of the following formula A-V

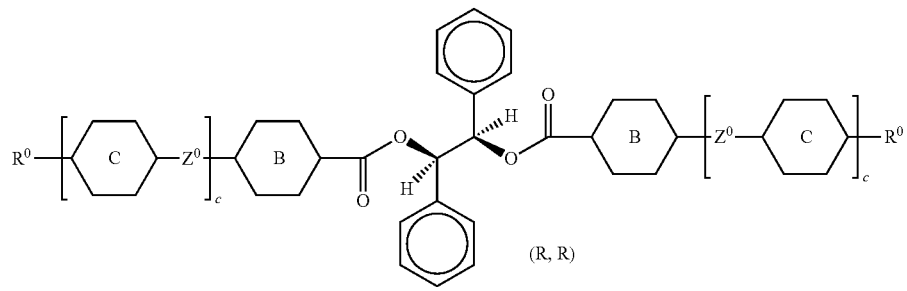
(R, R)

including the (R,S), (S,R), (R,R) and (S,S) enantiomers, which are not shown,
in which

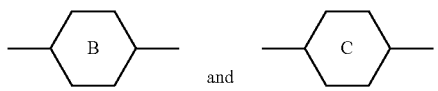

are each, independently of one another, 1,4-phenylene, which may also be mono-, di- or trisubstituted by L, or 1,4-cyclohexylene, L is H, F, Cl, CN or optionally halogenated alkyl, alkoxy, alkylcarbonyl, alkoxycarbonyl or alkoxycarbonyloxy having 1-7 carbon atoms, c is 0 or 1, $Z^0$ is —COO—, —OCO—, —CH$_2$CH$_2$— or a single bond, and $R^0$ is alkyl, alkoxy, alkylcarbonyl, alkoxycarbonyl or alkylcarbonyloxy having 1-12 carbon atoms.

Compounds of formula A-IV are described in WO 98/00428. Compounds of the formula A-V are described in GB-A-2,328,207.

In another embodiment particularly preferred chiral dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one fluorinated bridging group and a terminal or central chiral group, as described in WO 02/06196 and WO 02/06195.

Particular preference is given to chiral compounds of formula A-VI

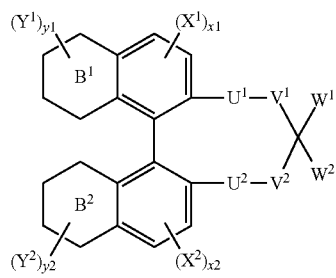

A-VI in which $X^1$, $X^2$, $Y^1$ and $Y^2$ are each, independently of one another, F, Cl, Br, I, CN, SCN, SF$_5$, straight-chain or branched alkyl having from 1 to 25 carbon atoms, which may be monosubstituted or polysubstituted by F, Cl, Br, I or CN and in which, in addition, one or more non-adjacent CH$_2$ groups may each, independently of one another, be replaced by —O—, —S—, —NH—, NR$^0$—, —CO—, —COO—, —OCO—, —OCOO—, —S—CO—, —CO—S—, —CH=CH— or —C≡C— in such a way that O and/or S atoms are not bonded directly to one another, a polymerisable group or cycloalkyl or aryl having up to 20 carbon atoms, which may optionally be monosubstituted or polysubstituted by halogen, preferably F, or by a polymerisable group, $x^1$ and $x^2$ are each, independently of one another, 0, 1 or 2, $y^1$ and $y^2$ are each, independently of one another, 0, 1, 2, 3 or 4, $B^1$ and $B^2$ are each, independently of one another, an aromatic or partially or fully saturated aliphatic six-membered ring in which one or more CH groups may be replaced by N atoms and one or more non-adjacent CH$_2$ groups may be replaced by O and/or S, $W^1$ and $W^2$ are each, independently of one another, —Z$^1$-A$^1$-(Z$^2$-A$^2$)$_m$-R, and one of the two is alternatively R$^1$ or A$^3$, but both are not simultaneously H, or

is

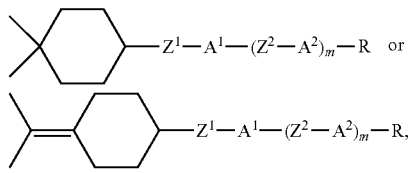

$U^1$ and $U^2$ are each, independently of one another, CH$_2$, O, S, CO or CS, $V^1$ and $V^2$ are each, independently of one another, (CH$_2$)$_n$, in which from one to four non-adjacent CH$_2$ groups may be replaced by O and/or S, and one of $V^1$ and $V^2$ and, in the case where

is

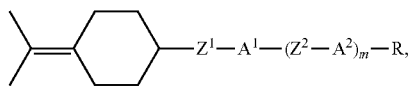

both are a single bond, $Z^1$ and $Z^2$ are each, independently of one another, —O—, —S—, —CO—, —COO—, —OCO—, —O—COO—, —CO—NR$^0$—, —NR$^0$—CO—, —O—CH$_2$—, —CH$_2$—O—, —S—CH$_2$—, —CH$_2$—S—, —CF$_2$—O—CF$_2$—, —CF$_2$—S—, —S—CF$_2$—, —CH$_2$—CH$_2$—, —CF$_2$—CH$_2$—, —CH$_2$—CF$_2$—, —CF$_2$—CF$_2$—, —CH=N—, —N=CH—, —N=N—, —CH=CH—, —CF=CH—, —CH=CF—, —CF=CF—, —C≡C—, a combination of two of these groups, where no two O and/or S and/or N atoms are bonded directly to one another, preferably —CH=CH—COO—, or —COO—CH=CH—, or a single bond, $A^1$, $A^2$ and $A^3$ are each, independently of one another, 1,4-phenylene, in which one or two non-adjacent CH groups may be replaced by N, 1,4-cyclohexylene, in which one or two non-adjacent CH$_2$ groups may be replaced by O and/or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where each of these groups may be monosubstituted or polysubstituted by L, and in addition $A^1$ is a single bond, L is a halogen atom, preferably F, CN, $NO_2$, alkyl, alkoxy, alkylcarbonyl, alkoxycarbonyl or alkoxycarbonyloxy having 1-7 carbon atoms, in which one or more H atoms may be replaced by F or Cl, m is in each case, independently, 0, 1, 2 or 3, and R and $R^1$ are each, independently of one another, H, F, Cl, Br, I, CN, SCN, $SF_5$, straight-chain or branched alkyl having from 1 or 3 to 25 carbon atoms respectively, which may optionally be monosubstituted or polysubstituted by F, Cl, Br, I or CN, and in which one or more non-adjacent $CH_2$ groups may be replaced by —O—, —S—, —NH—, —$NR^0$—, —CO—, —COO—, —OCO—, —O—COO—, —S—CO—, —CO—S—, —CH=CH— or where no two O and/or S atoms are bonded directly to one another, or a polymerisable group.

Particular preference is given to chiral binaphthyl derivatives of the formula A-VI-1

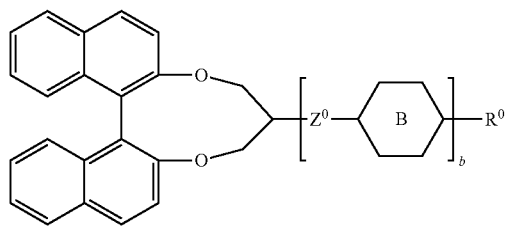

A-VI-1 in particular those selected from the following formulae A-VI-1a to A-VI-1c:

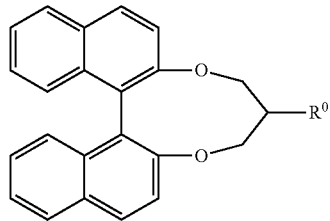

A-VI-1a

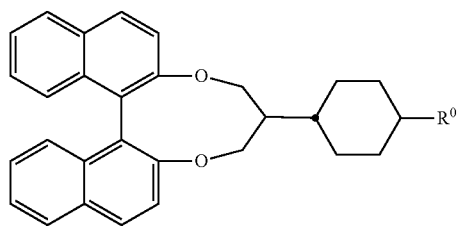

A-VI-1b

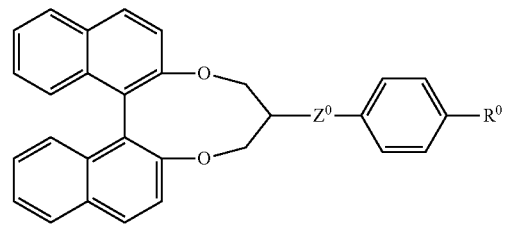

A-VI-1c in which B and $Z^0$ are as defined for formula A-IV, and $Z^0$ more preferably is —OCO— or a single bond, $R^0$ is as defined for formula A-IV or H or alkyl having from 1 to 4 carbon atoms, and b is 0, 1 or 2.

Particular preference is furthermore given to chiral binaphthyl derivatives of the formula A-VI-2

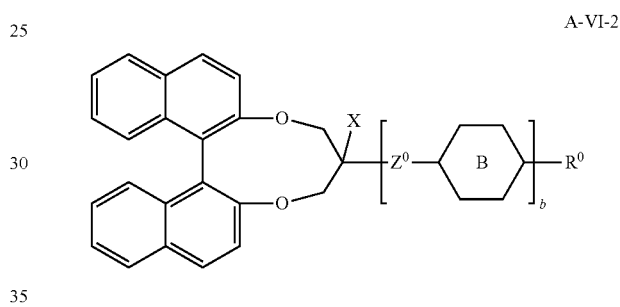

A-VI-2 in particular to those selected from the following formulae A-VI-2a to A-VI-2f:

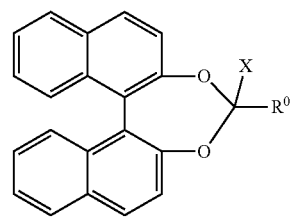

A-VI-2a

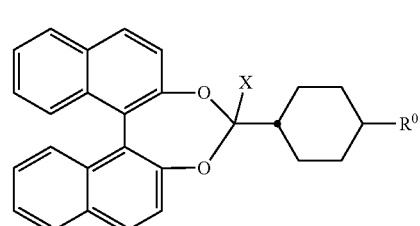

A-VI-2b

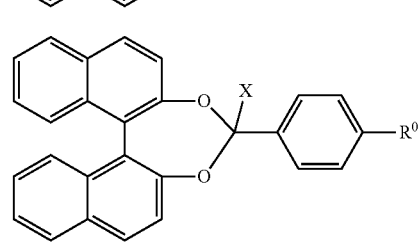

A-VI-2c

-continued

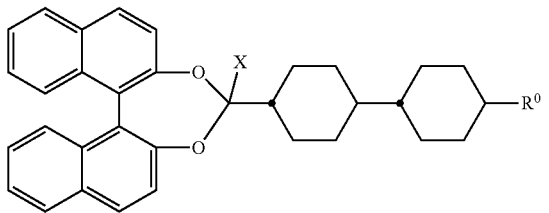

A-VI-2d

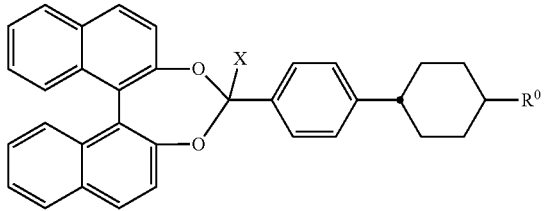

A-VI-2e

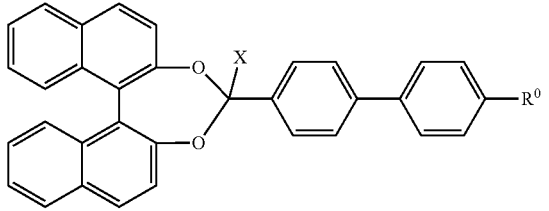

A-VI-2f in which R⁰ is as defined for formula A-VI, and X is H, F, Cl, CN or R⁰, preferably F.

In a particularly preferred embodiment, the chiral medium according to the invention comprises one or more compounds of formula R-5011 and S-5011 which are shown in Table F below. In an embodiment the medium contains R-5011. In another embodiment the medium contains S-5011.

The LC medium according to the present invention preferably and favourably exhibits a high reliability and a high electric resistivity. The LC medium according to the present invention also preferably and favourably exhibits a high voltage holding ratio (VHR), see S. Matsumoto et al., Liquid Crystals 5, 1320 (1989); K. Niwa et al., Proc. SID Conference, San Francisco, June 1984, p. 304 (1984); T. Jacob and U. Finkenzeller in "Merck Liquid Crystals—Physical Properties of Liquid Crystals", 1997. The VHR of an LC medium according to the invention is preferably ≥75%, more preferably ≥85%, even more preferably ≥95% and particularly preferably ≥98%. Unless described otherwise, the measurement of the VHR is carried out as described in T. Jacob, U. Finkenzeller in "Merck Liquid Crystals—Physical Properties of Liquid Crystals", 1997.

According to the invention in the method a liquid-crystalline medium is provided which comprises one or more polymerisable mesogenic compounds in an amount, based on the overall contents of the medium, of 4% by weight or less.

Preferably, the one or more polymerisable mesogenic compounds are contained in the medium in an amount, based on the overall contents of the medium, in an amount of 3% by weight or less, even more preferably in an amount of 2% by weight or less and particularly preferably in an amount of 1.25% by weight or less.

Preferably, the one or more polymerisable mesogenic compounds comprise one, two or more acrylate and/or methacrylate groups.

In the medium according to the invention preferably one or more polymerisable, curable or hardenable compounds are provided, preferably one or more photocurable monomers, which can favourably serve as the precursors for the polymeric component in the modulation material and the switching layer.

The reactive mesogens (RMs) or mesogenic monomers used contain a mesogenic group and one or more polymerisable groups, i.e. functional groups which are suitable for polymerisation.

In a particularly preferred embodiment the polymerisable compound(s) used include(s) only reactive mesogen(s), i.e. all the reactive monomers are mesogens. Alternatively, RMs can be provided in combination with one or more non-mesogenic polymerisable compounds.

The RMs can be monoreactive and/or di- or multireactive. Preferably, the RMs used are di- or multireactive, in particular direactive. In an embodiment one or more direactive RMs are used in combination with at least one monoreactive RM.

In a preferred embodiment of the invention the one or more polymerisable mesogenic compounds are selected from the compounds of the formula M $$R^{Ma}-A^{M1}-(Z^{M1}-A^{M2})_{m1}-R^{Mb}$$ M in which the individual radicals are defined as follows:

$R^{Ma}$ and $R^{Mb}$ are each independently P, P-Sp-, H, F, Cl, Br, I, —CN, —NO₂, —NCO, —NCS, —OCN, —SCN, SF₅ or straight-chain or branched alkyl having 1 to 25 carbon atoms, in which one or more non-adjacent CH₂ groups may each independently also be replaced by —C(R⁰)=C(R⁰⁰)—, —C≡C—, —N(R⁰⁰)—, —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, Br, I, CN, P or P-Sp-, where preferably at least one of the $R^{Ma}$ and $R^{Mb}$ radicals is or contains a P or P-Sp- group, preferably $R^{Ma}$ and $R^{Mb}$ are each independently P, P-Sp-, H, halogen, SF₅, NO₂, an alkyl, alkenyl or alkynyl group, where preferably at least one of the $R^{Ma}$ and $R^{Mb}$ radicals is or contains a P or P-Sp- group, P is a polymerisable group, Sp is a spacer group or a single bond, $A^{M1}$ and $A^{M2}$ are each independently an aromatic, heteroaromatic, alicyclic or heterocyclic group, preferably having 4 to 25 ring atoms, preferably carbon atoms, which also comprises or may contain fused rings, and which may optionally be mono- or polysubstituted by L, L is P, P-Sp-, OH, CH₂OH, F, Cl, Br, I, —CN, —NO₂, —NCO, —NCS, —OCN, —SCN, —C(=O)N(R$^x$)₂, —C(=O)Y¹, —C(=O)R$^x$, —N(R$^x$)₂, optionally substituted silyl, optionally substituted aryl having 6 to 20 carbon atoms, or straight-chain or branched alkyl, alkoxy, alkylcarbonyl, alkoxycarbonyl, alkylcarbonyloxy or alkoxycarbonyloxy having 1 to 25 carbon atoms or alkenyl or alkynyl having 2 to 25 carbon atoms, in which one or more hydrogen atoms may also be replaced by F, Cl, P or P-Sp-, preferably P, P-Sp-, H, OH, CH₂OH, halogen, SF₅, NO₂, an alkyl, alkenyl or alkynyl group, Y¹ is halogen, preferably F, $Z^{M1}$ is —O—, —S—, —CO—, —CO—O—, —OCO—, —O—CO—O—, —OCH₂—, —CH₂O—, —SCH₂—, —CH₂S—, —CF₂O—, —OCF₂—, —CF₂S—, —SCF₂—, —(CH₂)$_{n1}$—, —CF₂CH₂—, —CH₂CF₂—, —(CF₂)$_{n1}$—, —CH=CH—, —CF=CF—, —C≡C—, —CH=CH—, —COO—, —OCO—CH=CH—, CR⁰R⁰⁰ or a single bond, R⁰ and R⁰⁰ are each independently H or alkyl having 1 to 12 carbon atoms, R$^x$ is P, P-Sp-, H, halogen, straight-chain, branched or cyclic alkyl having 1 to 25 carbon atoms, in which one or more non-adjacent CH₂ groups may also be replaced by —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, P or P-Sp-, an optionally substituted aryl or aryloxy group having 6 to 40 carbon atoms, or an optionally substituted heteroaryl or heteroaryloxy group having 2 to 40 carbon atoms, m1 is 0, 1, 2, 3 or 4, and n1 is 1, 2, 3 or 4, where at least one substituent, preferably one, two or three substituents and more preferably one or two substituents from the group of R$^{Ma}$, R$^{Mb}$ and the substituent L present is a P or P-Sp- group or contains at least one P or P-Sp- group.

Particular preference is given to compounds of the formula M in which one of R$^{ma}$ and R$^{mb}$ or both are P or P-Sp-.

Suitable and preferred RMs for use in the liquid crystalline media according to the invention are, for example, selected from the following formulae:

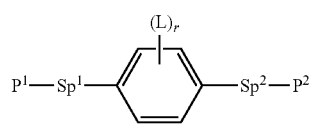

M1

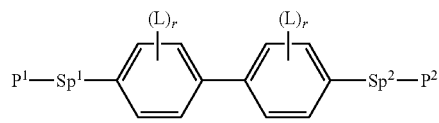

M2

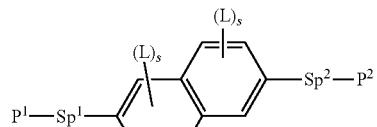

M3

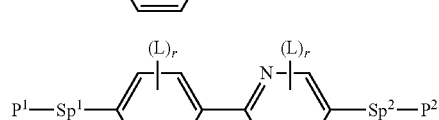

M4

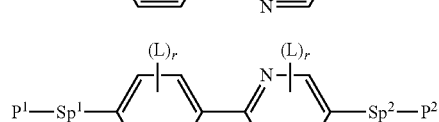

M5

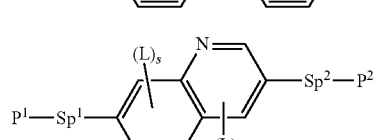

M6

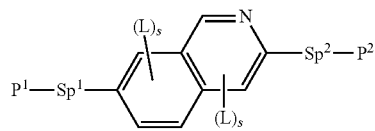

M7

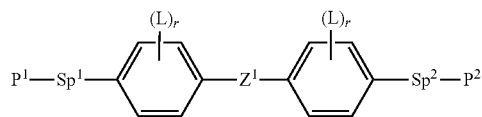

M8

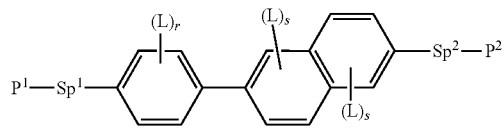

M9

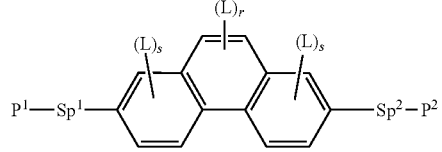

M10

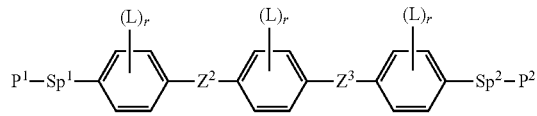

M11

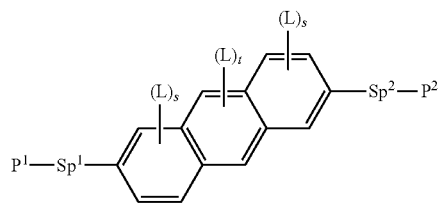

M12

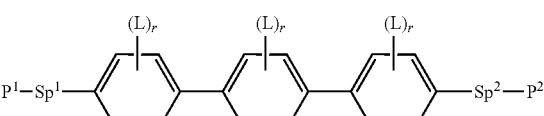

M13

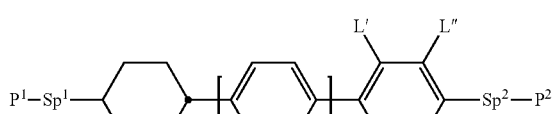

M14

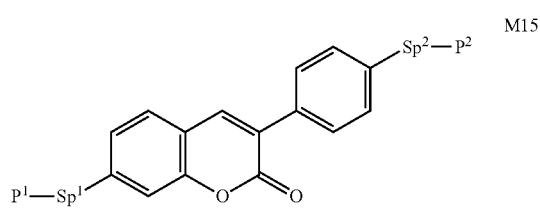

M15

M16
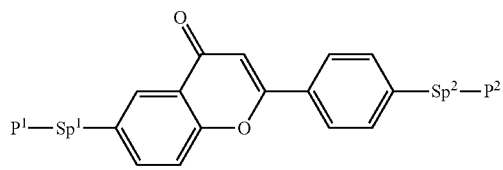
M17
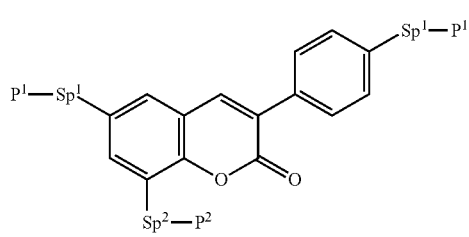
M18
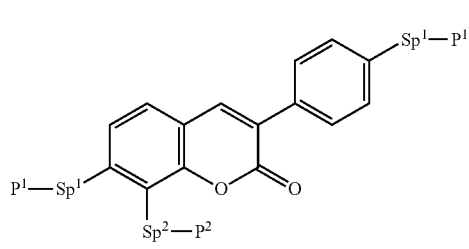
M19
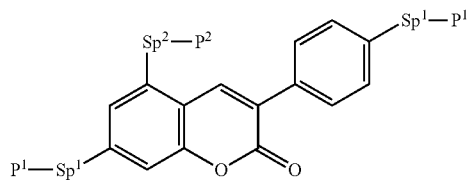
M20
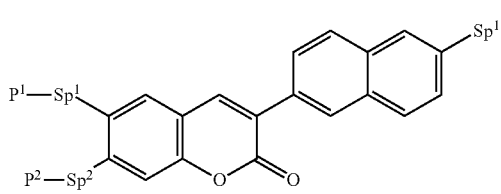
M21
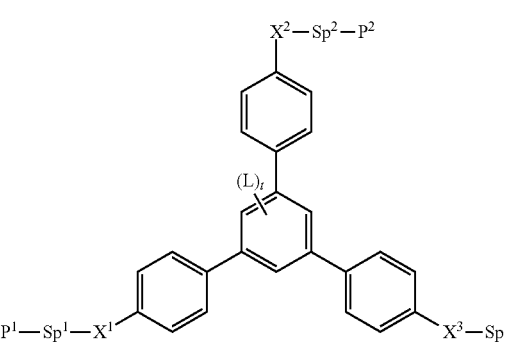
M22
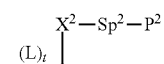
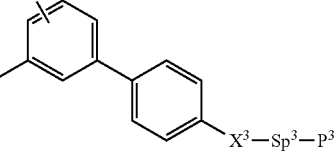
M23
M24
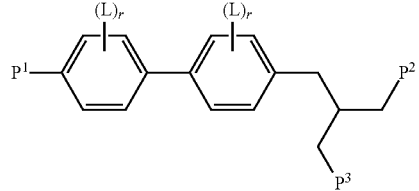
M25
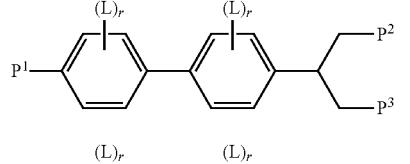
M26
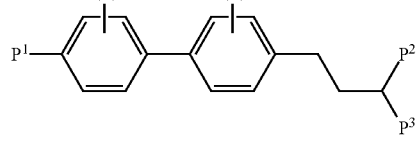
M27
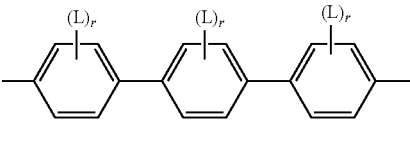
M28
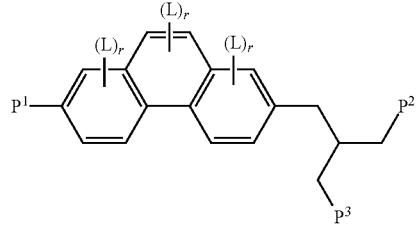
M29

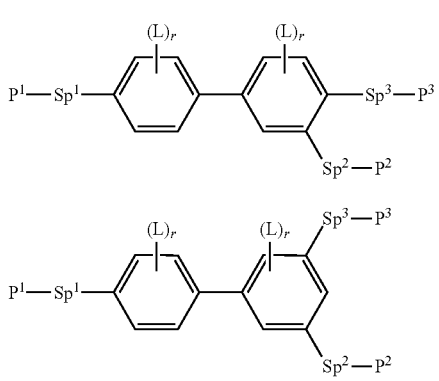

M30

M31 in which the individual radicals are defined as follows:
$P^1$ to $P^3$ are each independently a polymerisable group, preferably having one of the definitions specified above and below for P, more preferably an acrylate, methacrylate, fluoroacrylate, oxetane, vinyloxy or epoxy group,
$Sp^1$ to $Sp^3$ are each independently a single bond or a spacer group, preferably having one of the definitions of Sp given above and below, and more preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the bond to the adjacent ring in the latter groups is via the oxygen atom, where one of the $P^1$-$Sp^1$-, $P^2$-$Sp^2$- and $P^3$—$Sp^3$- radicals may also be $R^{aa}$,
$R^{aa}$ is H, F, Cl, CN or straight-chain or branched alkyl having 1 to 25 carbon atoms, in which one or more non-adjacent $CH_2$ groups may each independently also be replaced by $C(R^0)$=$C(R^{00})$—, —C≡C—, —$N(R^0)$—, —O—, —S—, —CO—, —CO—O—, —O—CO—, —O—CO—O—, in such a way that no oxygen and/or sulphur atoms are joined directly to one another, and in which one or more hydrogen atoms may also be replaced by F, Cl, CN or $P^1$-$Sp^1$-, more preferably straight-chain or branched, optionally mono- or polyfluorinated alkyl, alkoxy, alkenyl, alkynyl, alkylcarbonyl, alkoxycarbonyl, or alkylcarbonyloxy having 1 to 12 carbon atoms (where the alkenyl and alkynyl radicals have at least two and the branched radicals at least three carbon atoms),
$R^0$ and $R^{00}$ are the same or different at each instance and are each independently H or alkyl having 1 to 12 carbon atoms,
$R^y$ and $R^z$ are each independently H, F, $CH_3$ or $CF_3$,
$Z^1$ is —O—, —CO—, —$C(R^y R^z)$— or —$CF_2 CF_2$—,
$Z^2$ and $Z^3$ are each independently —CO—O—, —O—CO—, —$CH_2 O$—, —$OCH_2$—, —$CF_2 O$—, —$OCF_2$— or —$(CH_2)_n$—, where n is 2, 3 or 4,
L is the same or different at each instance and has the meaning given under formula M above, preferably is F, Cl, CN, or straight-chain or branched, optionally mono- or polyfluorinated alkyl, alkoxy, alkenyl, alkynyl, alkylcarbonyl, alkoxycarbonyl or alkylcarbonyloxy having 1 to 12 carbon atoms, preferably F,
L' and L" are each independently H, F or Cl,
$X^1$ to $X^3$ are independently of one another —CO—O—, —O—CO— or a single bond,
r is 0, 1, 2, 3 or 4,
s is 0, 1, 2 or 3,
t is 0, 1 or 2, and
x is 0 or 1.

Suitable polymerisable compounds are listed, for example, in Table G. Particularly preferred reactive mesogens are compounds of formulae RM-A RM-B and RM-C as shown respectively in Examples 1 and 3.

The polymerisable compounds have at least one polymerisable group. The polymerisable group is preferably selected from $CH_2$=$CW^1$—COO—,

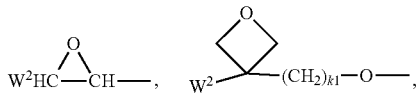

$CH_2$=$CW^2$—$(O)_{k1}$—, $CH_3$—CH=CH—O—, $(CH_2$=$CH)_2$CH—OCO—, $(CH_2$=$CH$—$CH_2)_2$CH—OCO—, $(CH_2$=$CH)_2$CH—O—, $(CH_2$=$CH$—$CH_2)_2$N—, HO—$CW^2W^3$—, HS—$CW^2W^3$—, $HW^2$N—, HO—$CW^2W^3$—NH—, $CH_2$=$CW^1$—CO—NH—, $CH_2$=$CH$—$(COO)_{k1}$-Phe-$(O)_{k2}$—, Phe-CH=CH—, HOOC—, OCN—, with $W^1$ being H, Cl, CN, phenyl or alkyl with 1 to 5 C atoms, in particular H, Cl or $CH_3$, $W^2$ and $W^3$ being independently of each other H or alkyl with 1 to 5 C atoms, in particular H, methyl, ethyl or n-propyl, Phe being 1,4-phenylene and $k_1$ and $k_2$ being independently of each other 0 or 1. The polymerisable or reactive group is preferably selected from a vinyl group, an acrylate group, a methacrylate group, a fluoroacrylate group, an oxetane group or an epoxy group, especially preferably an acrylate group or a methacrylate group.

In an embodiment, non-mesogenic monomers are included in the medium in addition to the one or more RMs. Preferably, one or more polymerisable compounds, either the non-mesogenic monomers or the RMs or both, are selected from acrylates, methacrylates, fluoroacrylates and vinyl acetate, wherein the composition more preferably further comprises one or more direactive and/or trireactive polymerisable compounds, preferably selected from diacrylates, dimethacrylates, triacrylates and trimethacrylates.

In a preferred embodiment the medium according to the invention comprises one or more non-mesogenic monoacrylates, particularly preferably one or more compounds selected from methyl acrylate, ethyl acrylate, propyl acrylate, isopropyl acrylate, butyl acrylate, t-butyl acrylate, pentyl acrylate, hexyl acrylate, nonyl acrylate, 2-ethylhexyl acrylate, 2-hydroxyethyl acrylate, 2-hydroxy-butyl acrylate and isobornyl acrylate.

Additionally or alternatively the medium according to the invention preferably comprises one or more non-mesogenic monomethacrylates, particularly preferably one or more compounds selected from methyl methacrylate, ethyl methacrylate, propyl methacrylate, ispropyl methacrylate, butyl methacrylate, t-butyl methacrylate, pentyl methacrylate, hexyl methacrylate, nonyl methacrylate, dodecyl methacrylate, 2-ethyl-hexyl methacrylate, 2-hydroxy-ethyl methacrylate, 2-hydroxy-butyl methacrylate, isobornyl methacrylate and 1-adamantyl methacrylate.

It is particularly preferred that at least one crosslinking agent is added to the medium, i.e. a polymerisable compound containing two or more polymerisable groups, wherein preferably di- or multireactive RMs are used.

In this respect direactive and multireactive compounds can serve to form polymer networks of their own and/or to crosslink polymer chains formed substantially from polymerising monoreactive compounds.

Alternatively or additionally, conventional crosslinkers known in the art can be used. It is particularly preferred to additionally provide direactive or multireactive acrylates and/or methacrylates. Particularly preferred compounds are selected from ethylene diacrylate, propylene diacrylate, butylene diacrylate, pentylene diacrylate, hexylene diacrylate, glycol diacrylate, glycerol diacrylate, pentaerythritol tetraacrylate, ethylene dimethacrylate, also known as ethyleneglycol dimethacrylate, propylene diamethcrylate, butylene dimethacrylate, pentylene dimethacrylate, hexylene dimethacrylate, tripropylene glycol diacrylate, glycol dimethacrylate, glycerol dimethacrylate, trimethylpropane trimethacrylate and pentaerythritol triacrylate.

The ratio of monoreactive monomers and di- or multireactive monomers can be favourably set and adjusted to influence the properties of the polymeric component to be formed.

Suitable and conventionally used initiators, in particular photoinitiators, can be added to the medium to facilitate the reaction, for example azo compounds or organic peroxides such as Luperox type initiators. Moreover, suitable conditions for the polymerisation and suitable types and amounts of initiators are known in the art and are described in the literature. In case a polymerisation initiator is included in the medium, the use of a photoinitiator is preferred.

For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure®, e.g. Irgacure 651 (available from BASF, containing 2,2-dimethoxy-1,2-diphenyl ethan-1-one), or Darocure® (Ciba Geigy AG, Basel, Switzerland). A typical cationic photoinitiator is for example UVI 6974 (Union Carbide). Further useful photoinitiators include α-aminoketones, e.g. Irgacure 907, coumarins, phosphine oxides, e.g. Irgacure 2100, acyl phosphines, e.g. Irgacure 819.

In a particular embodiment the added polymerisation initiator, preferably photoinitiator, comprises, preferably consists of, one or more mesogenic polymerisation initiators, preferably one or more mesogenic photoinitiators, i.e. one or more reactive compounds which can initiate polymerisation and which themselves have anisotropic and mesogenic properties.

However, according to a particularly preferred embodiment no polymerisation initiator, in particular no photoinitiator, is used. In certain cases this may improve the VHR and reduce the tendency to produce ions in the switching layer. This can contribute to obtaining and maintaining a modulation material and a light valve having good reliability and stability. Therefore, according to a preferred embodiment in the liquid-crystalline medium for use in the method according to the invention no polymerisation initiator is added.

In order to maintain and achieve a good VHR, preferably impurities in the reaction products of the polymerisation are kept at a minimum or are substantially avoided. In particular, residual reactive species and charged contaminants are suitably and preferably kept at a minimum. For example, in case UV polymerisation is carried out, in a preferred embodiment light with a comparatively long wavelength which is approaching the visible spectrum is used, preferably UV light in the range from 340 nm to 380 nm, and even more preferably from 360 nm to 380 nm is advantageously used. This way unwanted photodegradation or decomposition of components of the LC medium, and especially of the one or more dichroic dyes, may be avoided or at least minimized. In case a photoinitiator is used, the irradiation wavelength and the photoinitiator can be suitably matched or adjusted.

In the preferred case where no photoinitiator is used, the wavelength range of the light may be set such that at least some of the polymerisable compounds can undergo a photoreaction and initiate the polymerisation reaction by themselves, while furthermore degradation or decomposition of non-reactive components of the LC medium and in particular of the one or more dichroic dyes may be avoided or at least minimized. Obtaining and setting of the desired wavelength range can be achieved by conventional methods known in the art, e.g. by using optical filters, in particular edge filters.

It has surprisingly been found that the medium according to the invention can be favourably used to produce polymeric structures in situ by providing the one or more polymerisable mesogenic compounds as set forth above and below in the medium. In addition, by suitably choosing the one or more polymerisable mesogenic compounds together with the one or more dichroic dyes and by setting and adjusting the wavelength of the light used in the photopolymerisation with respect to the absorption characteristics of the dichroic dyes, an efficient and robust method can be provided which gives the desired polymerisation and polymeric products in the material while furthermore preserving the dichroic dyes and their performance. In an embodiment the wavelength or respectively the wavelength spectrum of the irradiation light is chosen such that an overlap with the absorption bands of the dichroic dyes is minimized.

The polymerisable compounds in the medium may be chosen such that after the polymerisation a stable system is obtained, which e.g. can be stable in further processing steps such as thermal heating steps, wherein a good VHR may be maintained.

Furthermore, according to the invention only a relatively small amount of (a) polymerisable mesogenic compound(s) is used which can favourably influence the stability and minimize unwanted degradation.

According to the invention the medium is used to prepare a modulation material which comprises a polymeric component, in particular a polymeric network, wherein the polymeric component is obtained by or respectively obtainable from polymerising the polymerisable compound(s) as set forth above and below.

The provision of the polymeric component may be useful in stabilizing one or more states or phases of the LC medium.

Preferably, the polymeric component is contained in the medium in an amount, based on the overall contents of the medium, in the range from 0.1% by weight to 4% by weight, more preferably in the range from 0.5% by weight to 1.5% by weight.

The polymeric component can contribute to the advantageous properties of the obtainable material. For example, the polymeric component may contribute to a significantly more stable hazy state, in particular the polydomain state, such that this hazy state may be maintained for more extended periods of time, in particular up to days, without refreshing or reapplying voltage. It may also contribute to achieving the fast switching times, in particular the superior $\tau_{off}$ switching times as observed.

Furthermore, the polymeric component as provided in the material which contains the CLC medium according to the invention can favourably influence the scattering efficiency and appearance, e.g. in terms of uniformity and viewing angle dependence. Thereby colour artefacts which may arise under oblique viewing angles can be significantly reduced.

In a preferred embodiment the modulation material comprises the liquid-crystalline medium and the polymeric component, where the polymeric component comprises a polymer network which is obtained by polymerisation of reactive mesogens, where the reactive mesogens preferably contain at least one group selected from acrylate groups, particularly preferably from monoacrylate groups, diacrylate groups or triacrylate groups, vinyl ether groups and epoxide groups. Compounds containing acrylate group(s) as used herein comprise acrylic monomers, methacrylic monomers, and mixtures of such monomers.

Polymerisation can be carried out using conventional methods. The polymerisation can be carried out in one or more steps. In the method according to the invention polymerisation of the polymerisable compound(s) is achieved by exposure to actinic radiation, wherein exposure to actinic radiation means irradiation with light, like UV light, visible light or IR light, irradiation with X-rays or gamma rays, or irradiation with high-energy particles, such as ions or electrons. In a preferred embodiment free radical polymerisation is carried out.

For the photopolymerisation the use of UV light is preferred. It is also possible to use UV light together with visible light, in particular violet or blue light. For example, light in the spectral range from 340 nm to 420 nm, preferably from 360 nm to 405 nm may be used. In an alternative embodiment it is also possible to only use visible light, in particular in the range from 380 nm to 415 nm, for example using visible light from a laser source.

Polymerisation can be carried out at a suitable temperature. In an embodiment polymerisation is performed at a temperature below the clearing point of the mesogenic mixture. In an alternative embodiment it is however also possible to carry out the polymerisation at or above the clearing point.

In the method polymerisation is carried out by photoirradiation, i.e. with light, preferably UV light. As a source for actinic radiation, for example a single UV lamp or a set of UV lamps can be used. When using a high lamp power the curing time can be reduced. Another possible source for photoradiation is a laser, like e.g. a UV laser, a visible laser or an IR laser.

In an embodiment, polymerisation is carried out by adding to the dye-doped chiral liquid crystalline host mixture one or more polymerisable compounds, preferably comprising a di-reactive compound and optionally a suitable photoinitiator, and polymerising the polymerisable compounds by exposure to UV irradiation.

Preferably the polymerisation is carried out in electro-optical cells maintained in a pre-determined state of the chiral liquid crystalline host mixture. In a preferred embodiment polymerisation, preferably polymerisation using UV light, is carried out when the medium is in the homeotropic state, wherein typically and preferably an electric field is applied.

For the photopolymerisation of the material in the layer preferably an exposure time from 30 s to 300 min, more preferably from 1 min to 240 min is used, preferably using irradiation intensities in the range from 0.01 mW/cm$^2$ to 100 mW/cm$^2$, more preferably from 0.1 mW/cm$^2$ to 100 mW/cm$^2$, and even more preferably from 0.5 mW/cm$^2$ to 75 mW/cm$^2$. In a particular embodiment preferred time periods for photopolymerisation and in particular preferred UV exposure times are in the range from 1 minute to 120 minutes, more preferably from 5 minutes to 60 minutes and in particular from 10 minutes to 30 minutes, wherein the UV light intensities are preferably in the range from 1 mW/cm$^2$ to 50 mW/cm$^2$.

Photopolymerisation may be carried out at room temperature, but in an alternative embodiment it is preferred to perform photopolymerisation at elevated temperatures. Therefore, in an embodiment a thermal pre-heating step is carried out before the photopolymerisation to raise the temperature above ambient room temperature. In this case it is preferred to set and maintain a temperature below the clearing point. This way polymerisation can be performed at a higher temperature with the medium however having a nematic or respectively chiral nematic phase.

According to the invention the medium contains one or more pleochroic dyes, in particular one or more dichroic dyes, preferably in an amount from 0.05% by weight to 5% by weight, more preferably from 0.1% by weight to 2.5% by weight.

The concentration of the dye(s) is preferably chosen such that the method and in particular the photopolymerisation can be carried out effectively and efficiently while furthermore ensuring the proper performance of the obtained modulation material, in particular in terms of the desired colour and dimming effects.

The dichroic dyes can be selected from for example azo dyes, anthraquinones, thiophenolanthraquinones, methine compounds, azomethine compounds, merocyanine compounds, naphthoquinones, tetrazines, pyrromethene dyes, malononitrile dyes, rylenes, in particular perylenes and terylenes, thiadiazole dyes, thienothiadiazole dyes, benzothiadiazoles, pyrromethenes, Irgaphor Black X11 DC, and diketopyrrolopyrroles. Particular preference is given to azo compounds, anthraquinones, thiophenolanthraquinones, benzothiadiazoles, in particular as described in WO 2014/187529, diketopyrrolopyrroles, in particular as described in WO 2015/090497, and rylenes, in particular as described in WO 2014/090373.

The liquid-crystalline medium for use in the method preferably comprises one, two, three, four, five, six, seven, eight, nine or ten different dichroic dyes, particularly preferably two or three dichroic dyes.

In an embodiment the liquid-crystalline medium comprises at least three different dichroic dyes, preferably in an amount, based on the overall contents of the medium, of 3% by weight or less, more preferably of 1.5% by weight or less.

In an embodiment the absorption spectra of the dichroic dyes of the switching layer preferably complement one another in such a way that the impression of a black colour arises for the eye. The preferably two or more, more preferably three or more dichroic dyes of the liquid-crystalline medium according to the invention preferably cover a large part of the visible spectrum. The precise way in which a mixture of dyes which appears black or grey to the eye can be prepared is known in the art and is described, for example, in M. Richter, Einführung in die Farbmetrik [Introduction to Colorimetry], 2nd Edition, 1981, ISBN 3-11-008209-8, Walter de Gruyter & Co.

In another embodiment the setting of a different colour is performed, e.g. red, green or blue.

The setting of the colour location of a mixture of dyes is described in the area of colorimetry. To this end, the spectra of the individual dyes are calculated taking into account the Lambert-Beer law to give an overall spectrum and converted into the corresponding colour locations and luminance values under the associated illumination, for example illuminant D65 for daylight, in accordance with the rules of colorimetry. The position of the white point is fixed by the respective illuminant, for example D65, and is quoted in tables, for example in the reference above. Different colour locations can be set by changing the proportions of the various dyes.

According to a preferred embodiment, the medium and the switching layer comprise one or more dichroic dyes which absorb light in the red and NIR region, i.e. at a wavelength of 600 nm to 2000 nm, preferably in the range from 600 nm to 1800 nm, particularly preferably in the range from 650 nm to 1300 nm.

Preferred dichroic dyes are selected from azo dyes, anthraquinones, thiophenolanthraquinones, methine compounds, azomethine compounds, merocyanine compounds, naphthoquinones, tetrazines, perylenes, ter-rylenes, quater-rylenes, higher rylenes, pyrromethenes, thiadiazoles, benzothiadiazoles, nickel dithiolenes, (metal) phthalocyanines, (metal) naphthalocyanines and (metal) porphyrins. Of these, particular preference is given to azo dyes, thiophenolanthraquinones, thiadiazoles and benzothiadiazoles.

In an embodiment the dichroic dyes which are provided in the medium and the switching layer preferably selected from the dye classes indicated in B. Bahadur, Liquid Crystals—Applications and Uses, Vol. 3, 1992, World Scientific Publishing, Section 11.2.1, and particularly preferably from the explicit compounds given in the table present therein.

Said dyes belong to the classes of dichroic dyes which are known in the art and have been described in the literature. Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described in DE 3126108 and DE 3202761, azo dyes in EP 43904, DE 3123519, WO 82/2054, GB 2079770, JP-A 56-57850, JP-A 56-104984, U.S. Pat. Nos. 4,308,161, 4,308, 162, 4,340,973, T. Uchida, C. Shishido, H. Seki and M. Wada: Mol. Cryst. Liq. Cryst. 39, 39-52 (1977), and H. Seki, C. Shishido, S. Yasui and T. Uchida: Jpn. J. Appl. Phys. 21, 191-192 (1982), and perylenes are described in EP 60895, EP 68427 and WO 82/1191. Rylene dyes as described, for example, in EP 2166040, US 2011/0042651, EP 68427, EP 47027, EP 60895, DE 3110960 and EP 698649.

Examples of preferred dichroic dyes which may be present in the medium and the switching layer of the light valve are shown below

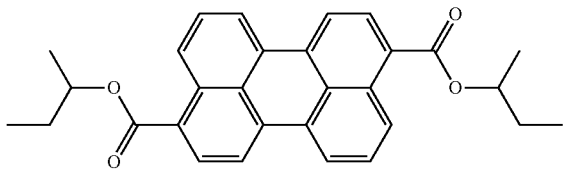

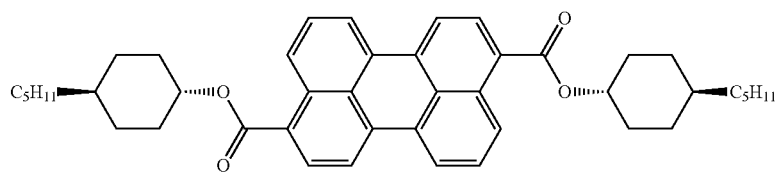

-continued
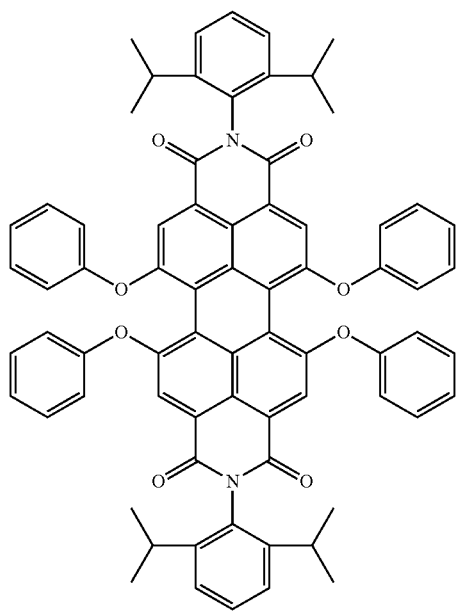
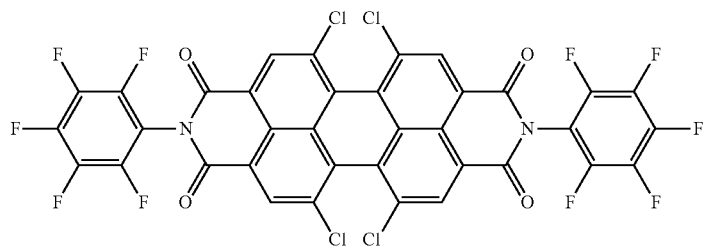
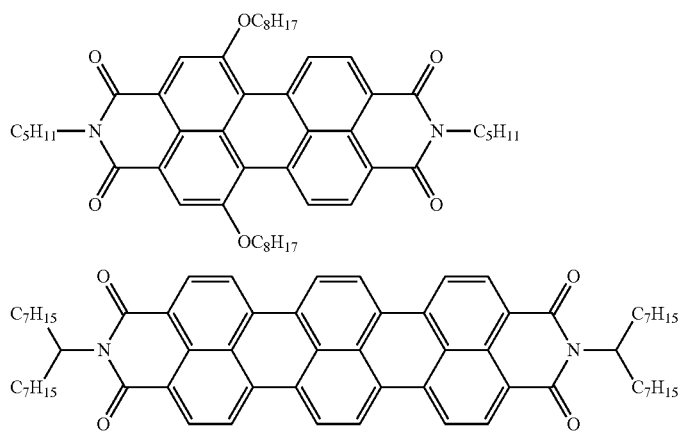

-continued
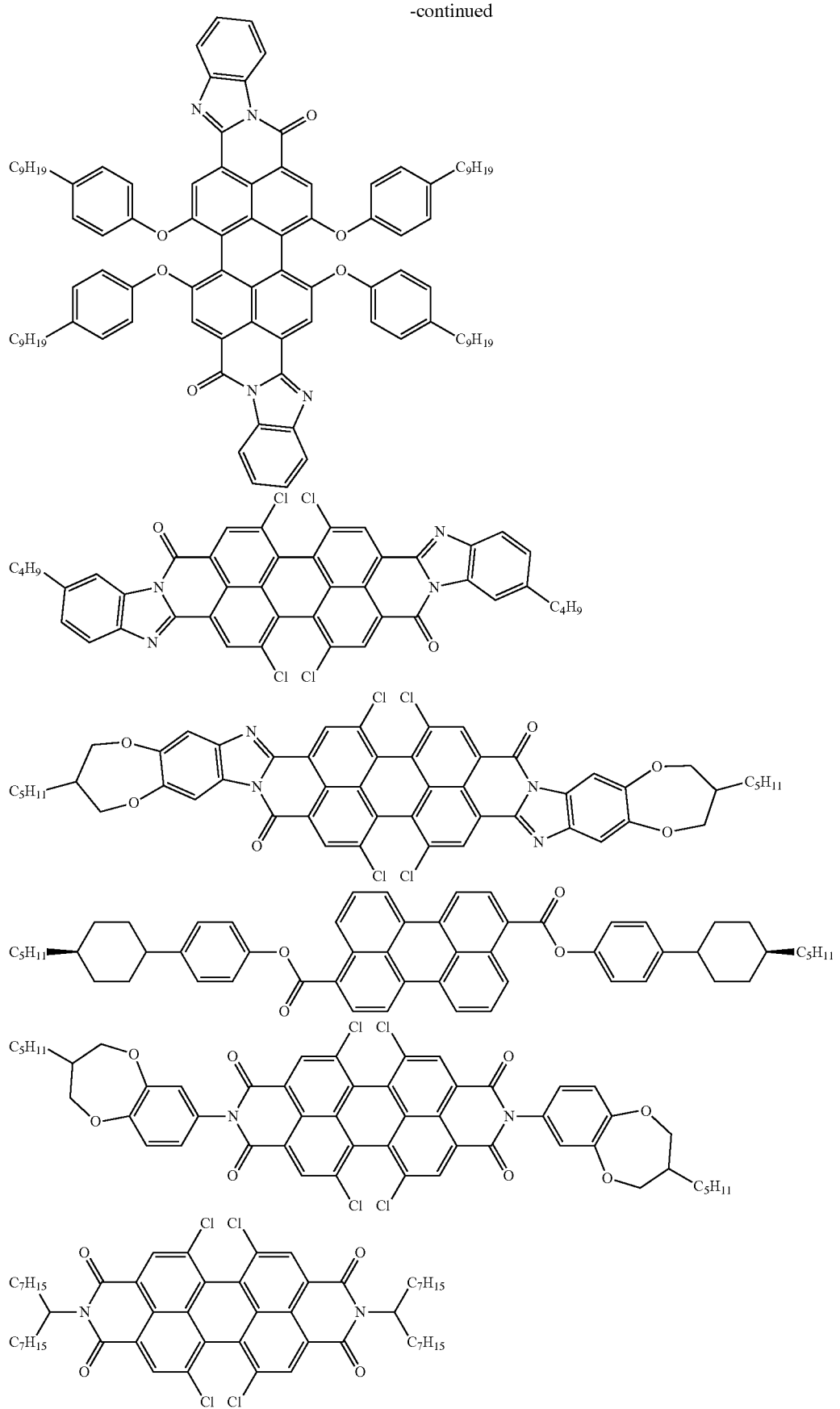

-continued
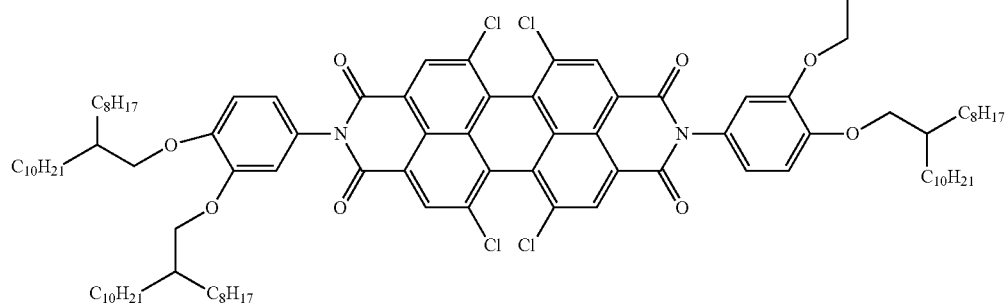
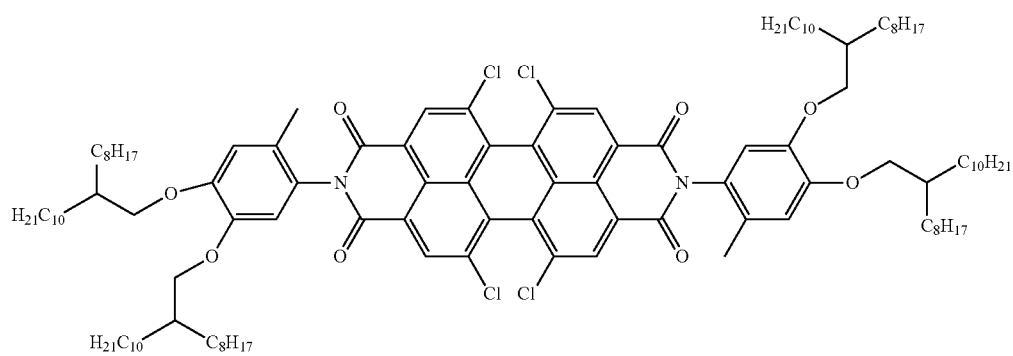
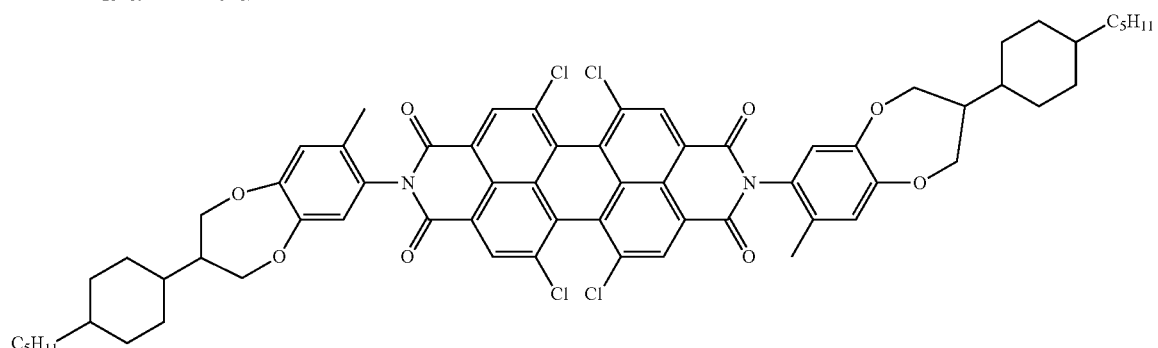
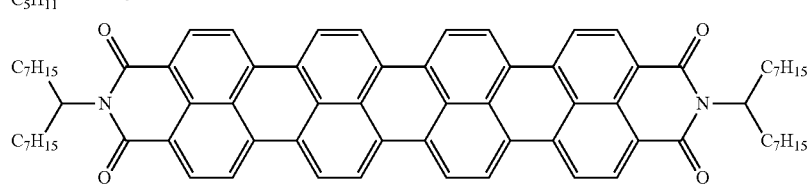
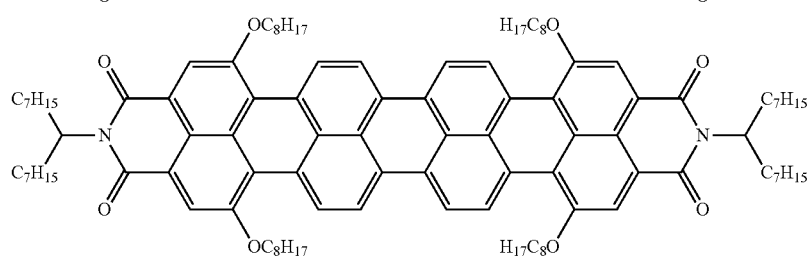
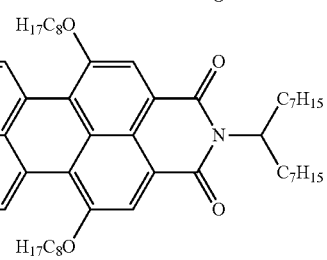
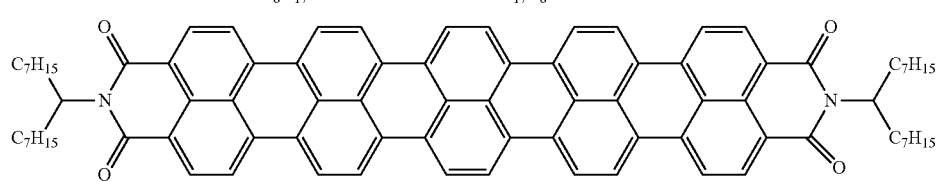

-continued
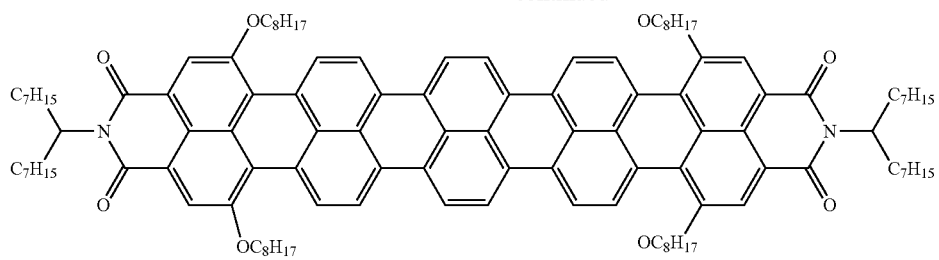
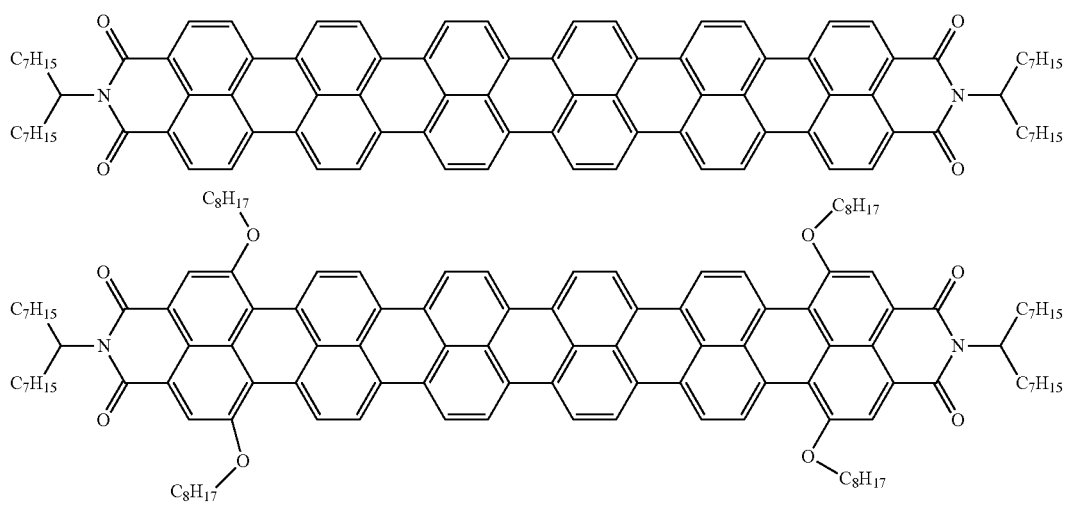
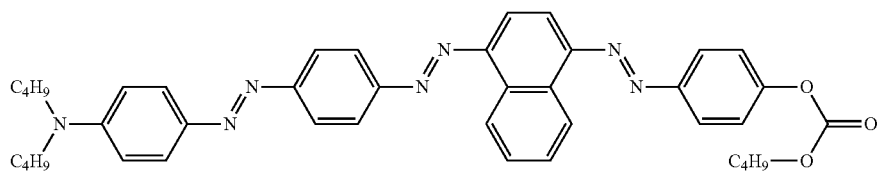
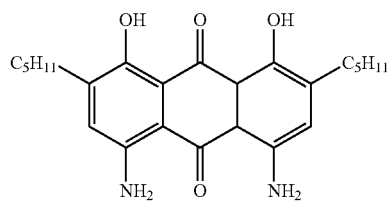
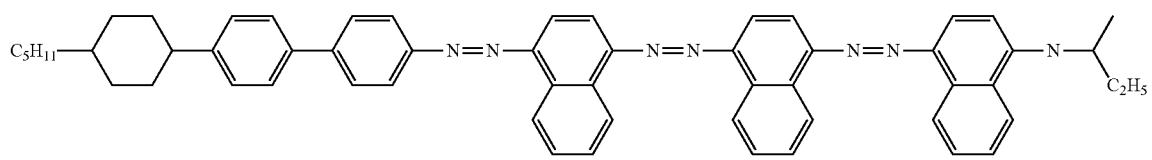
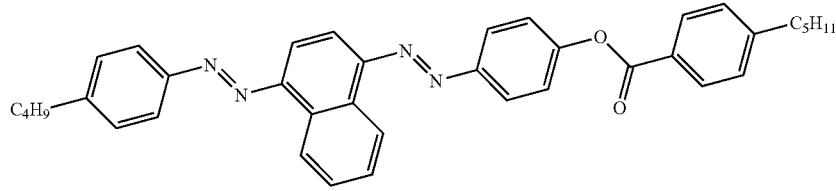

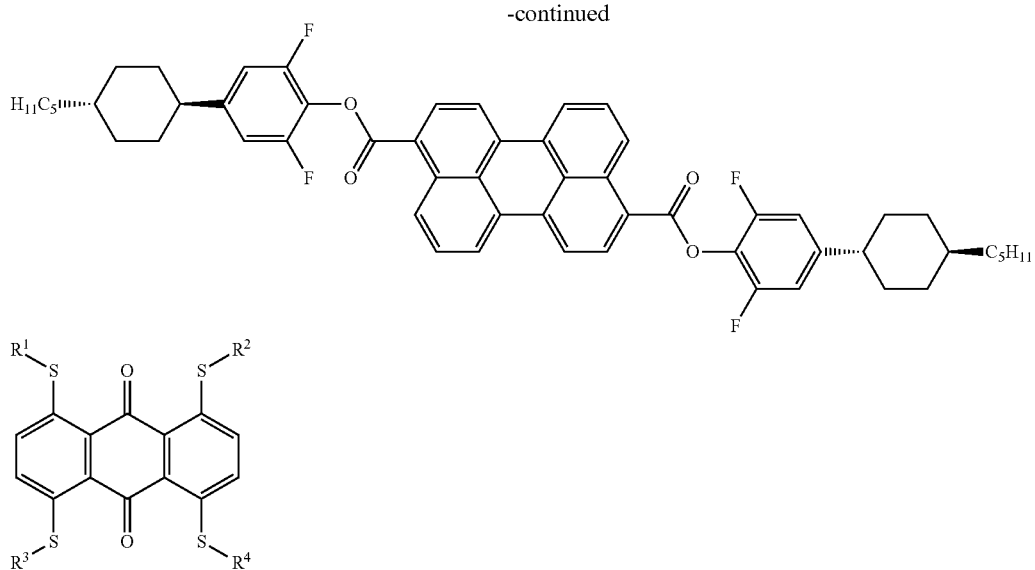

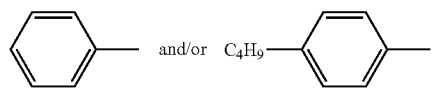

wherein $R^1$, $R^2$, $R^3$ and $R^4$ denote, independently of one another,

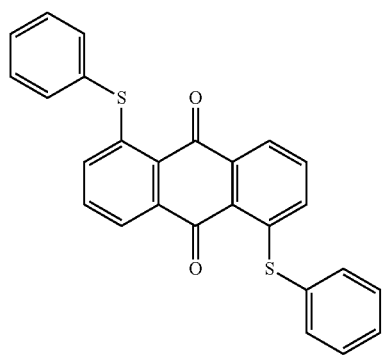

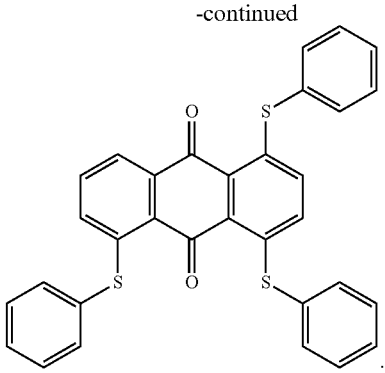

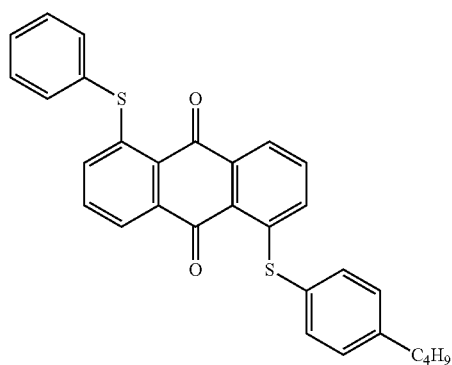

The dyes in switching layer can provide the variability of the overall transmission and can give a coloured or respectively black appearance in the opaque state.

In a preferred embodiment, the switching layer of the device according to the invention comprises one or more quencher compounds. This is particularly preferred if the device according to the invention comprises one or more fluorescent dyes in the switching layer. In order to achieve effective quenching, the quencher compound should be adapted to the respective dye system, in particular the dye absorbing at the longest wavelength in a dye combination. In a preferred embodiment of the switching layer according to the invention, any optionally added quencher compounds are selected so that fluorescence in the visible part of the spectrum is suppressed.

It is preferred that the light valve according to the invention contains only one switching layer.

In an alternative embodiment it is however also possible to provide more than one switching layer, in particular two switching layers.

Preferably, the medium as used according to the invention contains, based on the overall contents of the medium, at least 5% by weight, more preferably at least 10% by weight and even more preferably 15% by weight of the one or more mesogenic compounds selected from the compounds of formulae I and II. In an embodiment the medium contains one or more compounds of formula I, preferably in an amount, based on the overall contents of the medium, in the range from 5% by weight to 30% by weight. In some cases it can be beneficial and preferred that two, three or more compounds of formula I are contained in the medium.

Preferably the group $A^{11}$ as defined in formula I denotes

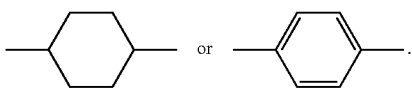

In an embodiment n as defined in formula I denotes 0.

In a preferred embodiment the one or more compounds of formula I are selected from compounds of formulae Ia, Ib and Ic, more preferably from compounds of formulae Ia and Ib

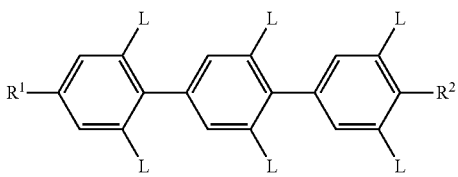

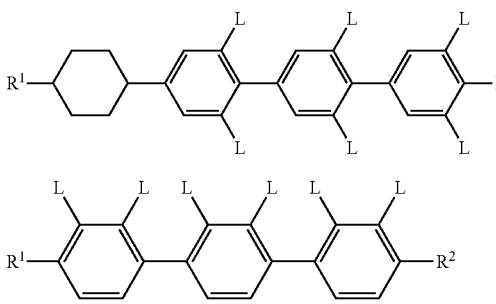

wherein
$R^1$ and $R^2$ denote, independently of one another, a group selected from F, Cl, CF$_3$, OCF$_3$, and straight-chain or branched alkyl or alkoxy having 1 to 15 carbon atoms or straight-chain or branched alkenyl having 2 to 15 carbon atoms which is unsubstituted, monosubstituted by CN or CF$_3$ or mono- or polysubstituted by halogen and wherein one or more CH$_2$ groups may be, in each case independently of one another, replaced by —O—, —S—, —CO—, —COO—, —OCO—, —OCOO— or —C≡C— in such a manner that oxygen atoms are not linked directly to one another, preferably from F, CF$_3$, OCF$_3$, straight-chain alkyl or alkoxy having 1 to 9 carbon atoms or alkenyl having 2 to 9 carbon atoms, and L is on each occurrence, identically or differently, H or halogen selected from F, Cl and Br, preferably from F and Cl, and more preferably is on each occurrence, identically or differently, H or F.

It is particularly preferred that in case the phenylene rings of the compounds of formula I are substituted that the substituent(s) is (are) F, and furthermore that the terminal groups $R^1$ and $R^2$ do not contain Cl.

In a particularly preferred embodiment the one or more compounds of formula I are selected from compounds which do not contain Cl.

In a particularly preferred embodiment the liquid-crystalline medium contains no Cl-containing compounds.

It is furthermore particularly preferred that at least one of the rings $A^{21}$, $A^{31}$ and $A^{41}$ according to formula I has at least one F substituent. It is furthermore particularly preferred that the rings $A^{21}$, $A^{31}$ and $A^{41}$ according to formula I together have at least two F substituents.

In the medium according to the invention the use of compounds containing CN is preferably and favourably limited, preferably to 75% by weight or below, more preferably to 50% by weight or below, even more preferably to 25% by weight or below and in particular to 15% by weight or below. In a particularly preferred embodiment the use of compounds containing CN is completely avoided.

The liquid-crystalline medium preferably contains mesogenic compounds which are added in view of contributing to or maintaining the favourable properties of the medium, e.g. a good VHR and a favourable stability.

In an embodiment the liquid-crystalline medium according to the invention comprises one or more compounds of formula II, preferably in an amount, based on the overall contents of the medium, in the range from 1% by weight to 45% by weight, more preferably from 5% by weight to 25% by weight. In some cases it can be beneficial and preferred that two, three or more compounds of formula I are contained in the medium.

In a further embodiment the liquid-crystalline medium according to the invention comprises one or more compounds of formula III

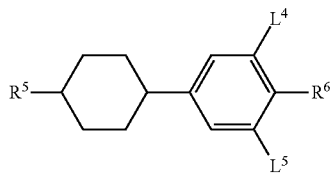

wherein $R^5$ and $R^6$ are defined as $R^3$ and $L^4$ and $L^5$ are defined as $L^1$ for formula II.

Compounds of formula III preferably are used in the medium in a total concentration from 1% by weight to 45% by weight, more preferably from 5% by weight to 25% by weight.

It is preferred that the medium contains of one or more mesogenic compounds of formula I, optionally one or more photoinitiators, and one or more mesogenic compounds selected from the group of compounds of formulae II and III.

It is particularly preferred that the medium comprises one or more compounds of formula I, one or more compounds of formula II and one or more compounds of formula III as set forth above.

Preferably the liquid-crystalline medium according to the invention comprises, alternatively or preferably in addition, one or more compounds of formula IV

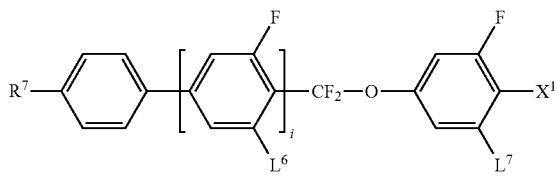

wherein

R⁷ denotes straight-chain or branched alkyl or alkoxy having 1 to 15 carbon atoms, preferably 1 to 7 carbon atoms, or straight-chain or branched alkenyl having 2 to 15 carbon atoms which is unsubstituted, monosubstituted by CN or CF₃ or mono- or polysubstituted by halogen and wherein one or more CH₂ groups may be, in each case independently of one another, replaced by —O—, —S—, —CO—, —COO—, —OCO—, —OCOO— or —C≡C— in such a manner that oxygen atoms are not linked directly to one another, i is 0, 1 or 2, L⁶ and L⁷ are, independently of one another, H or F, and X¹ denotes F, CF₃, OCF₃ or CN.

Compounds of formula IV preferably are used in the medium in a total concentration from 1% by weight to 45% by weight, more preferably from 5% by weight to 25% by weight.

It is particularly preferred that the medium comprises one or more compounds of formula I as set forth above and below, one or more compounds of formula II, one or more compounds of formula III and one or more compounds of formula IV.

In a further embodiment the liquid-crystalline medium according to the invention comprises one or more compounds of formula V, preferably in an amount, based on the overall contents of the medium, in the range from 1 by weight to 15% by weight, more preferably from 5% by weight to 10% by weight,

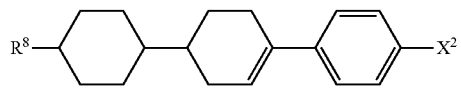

V wherein

R⁸ denotes straight-chain or branched alkyl or alkoxy having 1 to 15 carbon atoms, preferably 1 to 7 carbon atoms, or straight-chain or branched alkenyl having 2 to 15 carbon atoms which is unsubstituted, monosubstituted by CN or CF₃ or mono- or polysubstituted by halogen and wherein one or more CH₂ groups may be, in each case independently of one another, replaced by —O—, —S—, —CO—, —COO—, —OCO—, —OCOO— or —C≡C— in such a manner that oxygen atoms are not linked directly to one another, and X² denotes F, CF₃, OCF₃ or CN, preferably CF₃.

In a particularly preferred embodiment one or more of the one or more compounds of formula I are selected from compounds of formulae I-1 and I-2

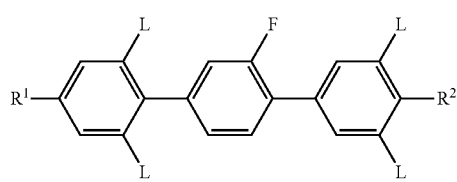

I-1

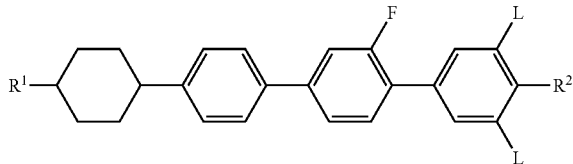

I-2 wherein

R¹ and R² are as defined for formula Ia above, and

L is on each occurrence, identically or differently, H or F.

Optionally the medium further comprises one or more compounds selected from the compounds designated as CC-n-V and CC-n-Vm as shown and explained in Table D, wherein preferably n and m are independently of one another integers of 1 to 7, in particular in a concentration range from 1% by weight to 25% by weight.

Optionally the media according to the present invention may comprise further liquid crystal compounds in order to adjust the physical properties. Such compounds are known in the field. The concentration of these optionally further included liquid crystal compounds in the media according to the present invention is preferably from 0% by weight to 30% by weight, more preferably from 0.1% by weight to 20% by weight and most preferably from 1% by weight to 15% by weight.

Preferably the medium according to the present invention comprises a compound of formula R-5011 as shown in Table F below.

The liquid-crystalline media according to the present invention may contain further additives in usual concentrations. The total concentration of these further constituents is in the range of 0% to 5%, preferably 0.1% to 4%, based on the total mixture. The concentrations of the individual compounds used each are preferably in the range of 0.01% to 3%. The concentration of these and of similar additives is herein not taken into consideration for the values and ranges of the concentrations of the liquid crystal components and compounds of the liquid crystal media. In particular, the medium may further comprise customary and suitable additives such as stabilizers, antioxidants, free radical scavengers, chain transfer agents, e.g. thioethers, and/or plasticizers, preferably in an amount from 0.01% by weight to 5% by weight. Stabilizers may be useful to further stabilize the medium and the modulation material against degradation or oxidation, e.g. due to thermal stress or light stress.

Herein, unless explicitly stated otherwise, all concentrations are given in weight percent.

The liquid-crystalline media according to the present invention consist of several compounds, preferably of 3 to 30, more preferably of 4 to 20, and most preferably of 4 to 16 compounds. These compounds are mixed in a conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle systems, the constituents of which are ready to use mixtures themselves.

Many of the mesogenic compounds or mixtures thereof described above and below are commercially available. These compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here in greater detail. The media according to the invention are prepared in a manner conventional per se. In general, the components are dissolved in one another, preferably at elevated temperature. Suitable additives or substances can be added to modify the dielectric anisotropy, the viscosity and/or the alignment of the liquid-crystalline phases.

The term "alkyl" according to the present invention preferably encompasses straight-chain and branched alkyl groups having 1 to 7 carbon atoms, particularly the straight-chain groups methyl, ethyl, propyl, butyl, pentyl, hexyl and heptyl. Groups having 2 to 5 carbon atoms are generally preferred.

An alkoxy can be straight-chain or branched, and it preferably is straight-chain and has 1, 2, 3, 4, 5, 6 or 7 carbon atoms, and accordingly is preferably methoxy, ethoxy, propoxy, butoxy, pentoxy, hexoxy or heptoxy.

The term "alkenyl" according to the present invention preferably encompasses straight-chain and branched alkenyl groups having 2-7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4E-alkenyl, $C_6$-$C_7$-5E-alkenyl and $C_7$-6E-alkenyl, in particular $C_2$-$C_7$-1E-alkenyl, $C_4$-$C_7$-3E-alkenyl and $C_5$-$C_7$-4E-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Groups having up to 5 carbon atoms are generally preferred.

Fluorinated alkyl or alkoxy preferably comprises $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, $OCFHCF_2H$, $OCFHCFH_2$, $OCH_2CF_3$, $OCH_2CF_2H$, $OCH_2CFH_2$, $OCF_2CF_2H$, $OCF_2CFH_2$, $C_3F_7$ or $OC_3F_7$, in particular $CF_3$, $OCF_3$, $CF_2H$, $OCF_2H$, $C_2F_5$, $OC_2F_5$, $CFHCF_3$, $CFHCF_2H$, $CFHCFH_2$, $CF_2CF_2H$, $CF_2CFH_2$, $OCFHCF_3$, $OCFHCF_2H$, $OCFHCFH_2$, $OCF_2CF_2H$, $OCF_2CFH_2$, $C_3F_7$ or $OC_3F_7$, particularly preferably $OCF_3$ or $OCF_2H$. Fluoroalkyl in a preferred embodiment encompasses straight-chain groups with terminal fluorine, i.e. fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

Oxaalkyl preferably encompasses straight-chain groups of the formula $C_nH_{2n+1}$—O—$(CH_2)_m$, where n and m are each, independently of one another, from 1 to 6. Preferably, n=1 and m is 1 to 6.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

Halogen is preferably F or Cl, in particular F.

If one of the above mentioned groups is an alkyl group in which one $CH_2$ group has been replaced by —CH═CH—, this can be straight-chain or branched. It is preferably straight-chain and has 2 to 10 carbon atoms. Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1-, -2-, -3-, -4-, -5- or hept-6-enyl, oct-1-, -2-, -3-, -4-, -5-, -6- or oct-7-enyl, non-1-, -2-, -3-, -4-, -5-, -6-, -7- or non-8-enyl, dec-1-, -2-, -3-, -4-, -5-, -6-, -7-, -8- or dec-9-enyl.

If one of the above mentioned groups is an alkyl group in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms.

They are accordingly in particular acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonyl-methyl, propoxycarbonylmethyl, butoxycarbonylmethyl, 2-(meth-oxycarbonyl)ethyl, 2-(ethoxycarbonyl)ethyl, 2-(propoxycarbonyl) ethyl, 3-(m ethoxycarbonyl)propyl, 3-(ethoxycarbonyl) propyl or 4-(methoxy-carbonyl)butyl.

If one of the above mentioned groups is an alkyl group in which one $CH_2$ group has been replaced by unsubstituted or substituted —CH═CH— and an adjacent $CH_2$ group has been replaced by CO, CO—O or O—$CO_3$ this can be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxy-octyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If one of the above mentioned groups is an alkyl or alkenyl group which is monosubstituted by CN or $CF_3$, this group is preferably straight-chain. The substitution by CN or $CF_3$ is in any position.

If one of the above mentioned groups is an alkyl or alkenyl group which is at least monosubstituted by halogen, this group is preferably straight-chain and halogen is preferably F or Cl, more preferably F. In the case of polysubstitution, halogen is preferably F. The resulting groups also include perfluorinated groups. In the case of monosubstitution, the fluoro or chloro substituent can be in any desired position, but is preferably in the ω-position.

Compounds containing branched groups may occasionally be of importance owing to better solubility in some conventional liquid-crystalline base materials. However, they are particularly suitable as chiral dopants if they are optically active.

Branched groups of this type generally contain not more than one chain branch. Preferred branched groups are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If one of the above mentioned groups is an alkyl group in which two or more $CH_2$ groups have been replaced by —O— and/or —CO—O—, this can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-bis-carboxynonyl, 10,10-biscarboxydecyl, bis(methoxycarbonyl)methyl, 2,2-bis-(methoxycarbonyl)ethyl, 3,3-bis(methoxycarbonyl)propyl, 4,4-bis(methoxy-carbonyl)butyl, 5,5-bis(methoxycarbonyl)pentyl, 6,6-bis(methoxycarbonyl)-hexyl, 7,7-bis (methoxycarbonyl)heptyl, 8,8-bis(methoxycarbonyl)octyl, bis-(ethoxycarbonyl)methyl, 2,2-bis(ethoxycarbonyl)ethyl, 3,3-bis(ethoxy-carbonyl)propyl, 4,4-bis(ethoxycarbonyl) butyl or 5,5-bis(ethoxycarbonyl)-pentyl.

In another aspect of the invention a switching layer is provided which comprises the medium or the modulation material according to the invention.

The switching layer according to the invention preferably has a thickness in the range from 2 µm to 50 µm, even more preferably from 4 µm to 40 µm and in particular from 10 µm to 25 µm.

In the light valve the switching layer is arranged between two substrates, in particular two transparent substrates.

The substrates may comprise, preferably consist of, glass or a polymer, in particular glass, polyethylene terephthalate (PET), polyethylene naphthalate (PEN), polyvinylbutyral (PVB), polymethyl methacrylate (PMMA), polycarbonate (PC), polyimide (PI), COP (cyclic olefin polymers) or TAC (triacetylcellulose).

In a particularly preferred embodiment glass substrates are used.

The finally assembled light valve can further comprise one or more layers which block UV light.

Advantageously the light valve can be produced by the facile and efficient process described herein.

In the preparation method the liquid-crystalline medium which comprises the one or more polymerisable mesogenic compounds is provided as a layer between two opposing transparent substrates which are each provided with an electrode. Preferably the electrodes are arranged as conductive layers above the inner surface of each substrate, wherein more preferably the conductive layers are respectively arranged on a passivation layer, even more preferably arranged between passivation layers, and wherein optionally alignment layers are further provided which are in direct contact with the liquid-crystalline medium.

Subsequently the one or more polymerisable mesogenic compounds are polymerised, in particular using photopolymerisation. Preferably, the photopolymerisation of the one or more polymerisable mesogenic compounds is carried out in the presence of an electric field in the layer, preferably an alternating current electric field, wherein preferably the layer has a thickness in the range from 2 µm to 50 µm, more preferably from 5 µm to 25 µm, and wherein preferably the applied electric field induces a homeotropic alignment in the layer comprising the liquid-crystalline medium.

In the method described herein polymerising is carried out by photopolymerisation, preferably using UV light. In a particularly preferred embodiment during the polymerisation, at least temporarily, an electric field is applied to induce an alignment of the medium, preferably a homeotropic alignment. The application of a voltage to set a predetermined orientation during polymerisation can favourably influence the product properties of the switching layer and the light valve. For example, inducing a homeotropic alignment during polymerisation can contribute to achieving a homogeneous low-haze clear state, while furthermore a homogeneous and suitably strong haze can be obtained in the opaque state.

It is possible to control the temperature during photopolymerisation, for example in a range from 20° C. to 100° C., preferably below the clearing point.

In a preferred embodiment the reactive mesogens are self-starting, while in another embodiment a photoinitiator is used to trigger the polymerisation.

For the photopolymerisation of the material in the switching layer preferably an exposure time from 30 s to 240 min, more preferably from 1 min to 120 min is used, preferably using irradiation intensities in the range from 0.01 mW/cm$^2$ to 100 mW/cm$^2$, more preferably from 0.1 mW/cm$^2$ to 50 mW/cm$^2$, even more preferably from 1 mW/cm$^2$ to 50 mW/cm$^2$ and in particular from 2 mW/cm$^2$ to 20 mW/cm$^2$.

For the polymerisation several parameters may be suitably set or varied, e.g. the irradiation dose, the magnitude or respectively the frequency of the optionally applied voltage or respectively the electric field strength, and the amount of chiral dopant and dichroic dye in the medium.

Following the photopolymerisation, further treatments may be carried out. Preferably, a thermal treatment is carried out after the polymerisation step. The thermal treatment, i.e. an exposure to an increased temperature relative to the previous polymerisation step may lead to further curing or further conversion rate or completion of the polymerisation. This can be beneficial in terms of the product performance and stability, in particular in that in the product the amount of residual unreacted monomer is minimized.

The optional thermal treatment step following polymerisation is preferably performed for a period of time in the range from 5 minutes to 240 minutes, more preferably from 10 minutes to 120 minutes and in particular from 20 minutes to 60 minutes. The thermal treatment preferably uses a temperature in the range from 85° C. to 200° C., more preferably from 110° C. to 190° C. and in particular from 140° C. to 180° C.

It is also possible to perform pre-treatment steps on the substrates used, for example surface treatment methods such as a UV-ozone treatment or a plasma treatment, which can improve alignment and wetting behaviour over larger areas and contribute to an improved homogeneity as well as a favourable reduction of unwanted haze in the clear state.

The method described herein is advantageously useful to produce a light valve with favourable durability, a low-haze clear state, and a scattering state giving good opacity, even in the case where only a single switching layer is used in the device.

In the present invention and especially in the following Examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

| Code | Structure | Code | Structure |
|---|---|---|---|
| C | (cyclohexane) | | |
| P | (1,4-phenylene) | | |
| D | (1,3-dioxane) | Dl | (1,3-dioxane, inverted) |
| A | (tetrahydropyran) | Al | (tetrahydropyran, inverted) |
| G | (fluorophenylene) | Gl | (fluorophenylene, inverted) |
| U | (difluorophenylene) | Ul | (difluorophenylene, inverted) |
| Y | (2,3-difluorophenylene) | | |
| M | (pyrimidine) | Ml | (pyrimidine, inverted) |
| N | (pyridine) | Nl | (pyridine, inverted) |
| Np | (naphthalene) | dH | (decahydronaphthalene) |
| N3f | (trifluoronaphthalene) | N3fl | (trifluoronaphthalene, inverted) |
| tH | (tetrahydronaphthalene) | tHl | (tetrahydronaphthalene, inverted) |
| tH2f | (difluoro-tetrahydronaphthalene) | tH2fl | (difluoro-tetrahydronaphthalene, inverted) |
| K | (tetrafluoroindane) | Kl | (tetrafluoroindane, inverted) |
| L | (cyclohexene) | Ll | (cyclohexene, inverted) |
| F | (fluorocyclohexene) | Fl | (fluorocyclohexene, inverted) |
| Nf | (fluoropyridine) | Nfl | (fluoropyridine, inverted) |

TABLE B

Linking groups

| Code | Group | Code | Group |
|---|---|---|---|
| E | —CH$_2$CH$_2$— | Z | —CO—O— |
| V | —CH=CH— | Zl | —O—CO— |
| X | —CF=CH— | O | —CH$_2$—O— |
| Xl | —CH=CF— | Ol | —O—CH$_2$— |
| B | —CF=CF— | Q | —CF$_2$—O— |
| T | —C≡C— | Ql | —O—CF$_2$— |
| W | —CF$_2$CF$_2$— | | |

TABLE C

End groups

| Left-hand side | | Right-hand side | |
|---|---|---|---|
| Used alone | | | |
| -n- | C$_n$H$_{2n+1}$— | -n | —C$_n$H$_{2n+1}$ |
| —nO— | C$_n$H$_{2n+1}$—O— | —On | —O—C$_n$H$_{2n+1}$ |
| —V— | CH$_2$=CH— | —V | —CH=CH$_2$ |
| —nV— | C$_n$H$_{2n+1}$—CH=CH— | —nV | —C$_n$H$_{2n}$—CH=CH$_2$ |
| —Vn— | CH$_2$=CH—C$_n$H$_{2n+1}$— | —Vn | —CH=CH—C$_n$H$_{2n+1}$ |
| —nVm— | C$_n$H$_{2n+1}$—CH=CH—C$_m$H$_{2m}$— | —nVm | —C$_n$H$_{2n}$—CH=CH—C$_m$H$_{2m+1}$ |
| —N— | N≡C— | —N | —C≡N |
| —S— | S=C=N— | —S | —N=C=S |
| —F— | F— | —F | —F |

TABLE C-continued

| End groups | | | |
|---|---|---|---|
| Left-hand side | | Right-hand side | |
| —Cl— | Cl— | —Cl | —Cl |
| —M— | CFH$_2$— | —M | —CFH$_2$ |
| —D— | CF$_2$H— | —D | —CF$_2$H |
| —T— | CF$_3$— | —T | —CF$_3$ |
| —MO— | CFH$_2$O— | —OM | —OCFH$_2$ |
| —DO— | CF$_2$HO— | —OD | —OCF$_2$H |
| —TO— | CF$_3$O— | —OT | —OCF$_3$ |
| —FXO— | CF$_2$=CH—O— | —OXF | —O—CH=CF$_2$ |
| —A— | H—C≡C— | —A | —C≡C—H |
| —nA— | C$_n$H$_{2n+1}$—C≡C— | —An | —C≡C—C$_n$H$_{2n+1}$ |
| —NA— | N≡C—C≡C— | —AN | —C≡C—C≡N |
| Used together with one another and with others | | | |
| —...A...— | —C≡C— | —...A... | —C≡C— |
| —...V...— | CH=CH— | —...V... | —CH=CH |
| —...Z...— | —CO—O— | —...Z... | —CO—O— |
| —...ZI...— | —O—CO— | —...ZI... | —O—CO— |
| —...K...— | —CO— | —...K... | —CO— |
| —...W...— | —CF=CF— | —...W... | —CF=CF— | wherein n and m each denote integers, and the three dots "..." are place-holders for other abbreviations from this table.

The following table shows illustrative structures together with their respective abbreviations. These are shown in order to illustrate the meaning of the rules for the abbreviations. They furthermore represent compounds which may be preferably used.

TABLE D

Illustrative structures

C$_n$H$_{2n+1}$—[cyclohexyl]—[cyclohexyl]—C$_m$H$_{2m+1}$

CC-n-m

C$_n$H$_{2n+1}$—[cyclohexyl]—[cyclohexyl]—O—C$_m$H$_{2m+1}$

CC-n-Om

C$_n$H$_{2n+1}$—[cyclohexyl]—[cyclohexyl]—CH=CH$_2$

CC-n-V

C$_n$H$_{2n+1}$—[cyclohexyl]—[cyclohexyl]—CH=CH—C$_m$H$_{2m+1}$

CC-n-Vm

C$_n$H$_{2n+1}$—[cyclohexyl]—[cyclohexyl]—(CH$_2$)$_m$—CH=CH$_2$

CC-n-mV

C$_n$H$_{2n+1}$—[cyclohexyl]—[cyclohexyl]—(CH$_2$)$_m$—CH=CH—C$_l$H$_{2l+1}$

CC-n-mVl

TABLE D-continued
Illustrative structures
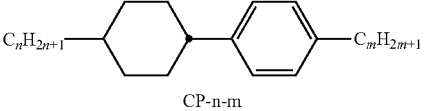
CP-n-m
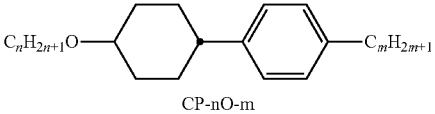
CP-nO-m
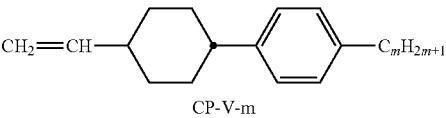
CP-V-m
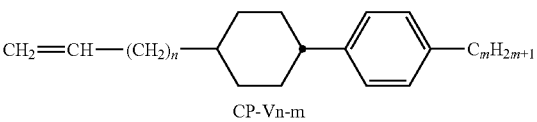
CP-Vn-m
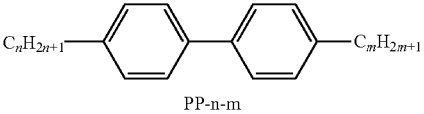
PP-n-m
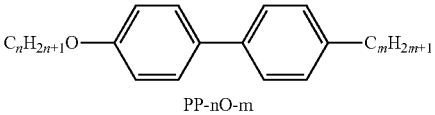
PP-nO-m
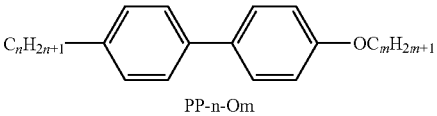
PP-n-Om
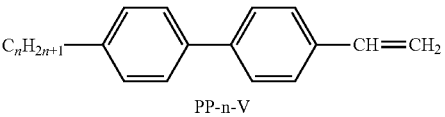
PP-n-V
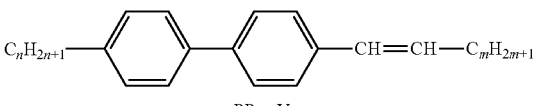
PP-n-Vm
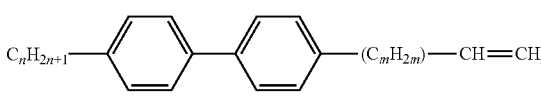
PP-n-mV
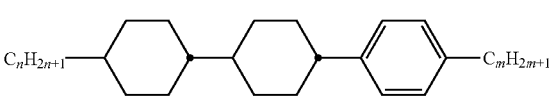
CCP-n-m
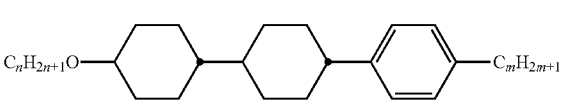
CCP-nO-m TABLE D-continued
Illustrative structures
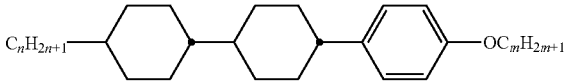
CCP-n-Om
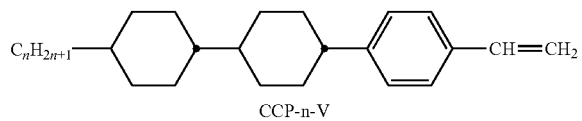
CCP-n-V
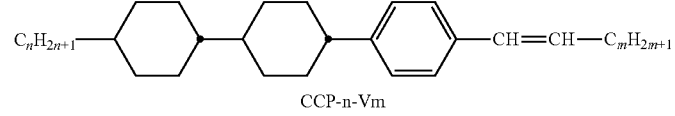
CCP-n-Vm
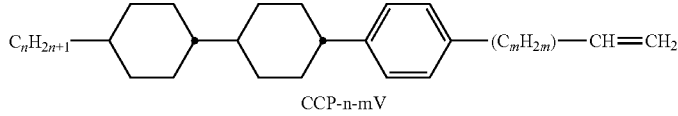
CCP-n-mV
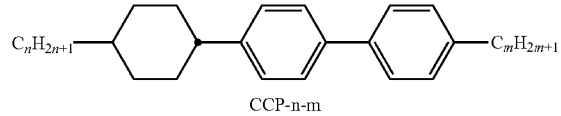
CCP-n-m
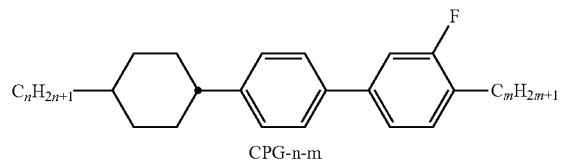
CPG-n-m
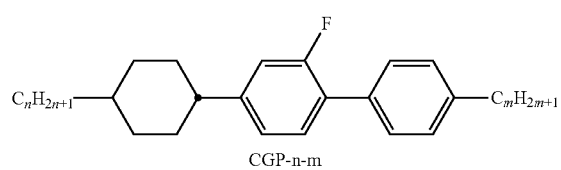
CGP-n-m
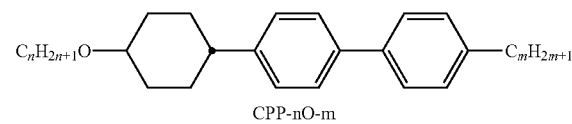
CPP-nO-m
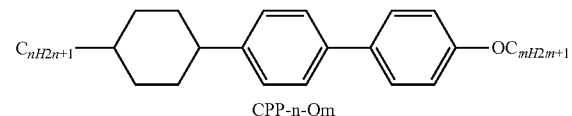
CPP-n-Om
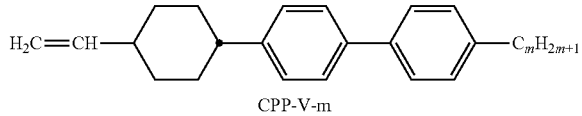
CPP-V-m
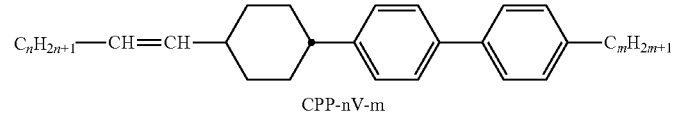
CPP-nV-m TABLE D-continued Illustrative structures CH₂=CH—(CₙH₂ₙ)—[Cy]—[Ph]—[Ph]—CₘH₂ₘ₊₁

CPP-Vn-m

CₙH₂ₙ₊₁—[Ph]—[Ph(F)]—[Ph]—CₘH₂ₘ₊₁

PGP-n-m

CₙH₂ₙ₊₁—[Ph]—[Ph(F)]—[Ph]—CH=CH₂

PGP-n-V

CₙH₂ₙ₊₁—[Ph]—[Ph(F)]—[Ph]—CH=CH—CₘH₂ₘ₊₁

PGP-n-Vm

CₙH₂ₙ₊₁—[Ph]—[Ph(F)]—[Ph]—(CH₂)ₘ—CH=CH₂

PGP-n-mV

CₙH₂ₙ₊₁—[Ph]—[Ph(F)]—[Ph]—(CH₂)ₘ—CH=CH—CₗH₂ₗ₊₁

PGP-n-mVl

CₙH₂ₙ₊₁—[Cy]—[Cy]—CH₂—CH₂—[Cy]—O—CₘH₂ₘ₊₁

CCEC-n-Om

CₙH₂ₙ₊₁—[Cy]—[Ph]—[Ph]—[Cy]—CₘH₂ₘ₊₁

CPPC-n-m

CₙH₂ₙ₊₁—[Cy]—[Ph(F)]—[Ph]—[Cy]—CₘH₂ₘ₊₁

CGPC-n-m

CₙH₂ₙ₊₁—[Cy]—[Cy]—[Ph]—[Cy]—CₘH₂ₘ₊₁

CCPC-n-m

TABLE D-continued

Illustrative structures $C_nH_{2n+1}$—⬡—⬡—CO—O—⬢—⬢—$C_mH_{2m+1}$
CCZPC-n-m $C_nH_{2n+1}$—⬡—⬢—⬢(F)—⬢—$C_mH_{2m+1}$
CPGP-n-m $C_nH_{2n+1}$—⬡—⬢—⬢(F)—⬢—$(CH_2)_m$—CH=CH$_2$
CPGP-n-mV $C_nH_{2n+1}$—⬡—⬢—⬢(F)—⬢—$(CH_2)_m$—CH=CH—$C_lH_{2l+1}$
CPGP-n-mVl $C_nH_{2n+1}$—⬢(F)—⬢(F)—⬢—$C_mH_{2m+1}$
PGlGP-n-m $C_nH_{2n+1}$—⬡—⬢—F
CP-n-F $C_nH_{2n+1}$—⬡—⬢—Cl
CP-n-Cl $C_nH_{2n+1}$—⬢(F)—⬢—F
GP-n-F $C_nH_{2n+1}$—⬢(F)—⬢—Cl
GP-n-Cl $C_nH_{2n+1}$—⬡—⬡—⬢—OCF$_3$
CCP-n-OT TABLE D-continued
Illustrative structures
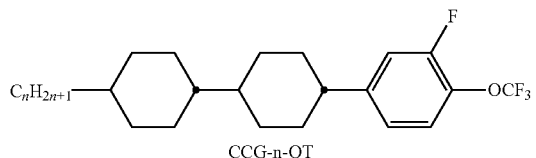
CCG-n-OT
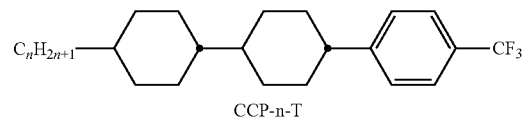
CCP-n-T
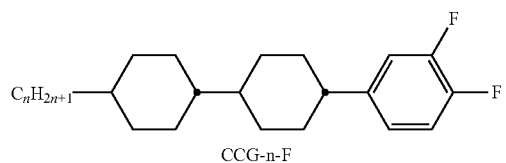
CCG-n-F
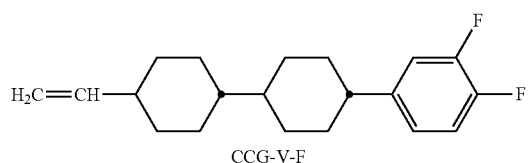
CCG-V-F
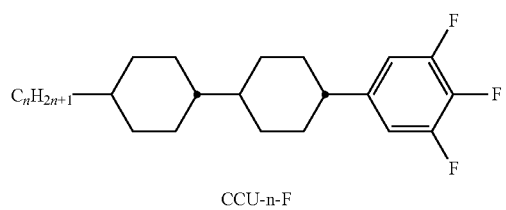
CCU-n-F
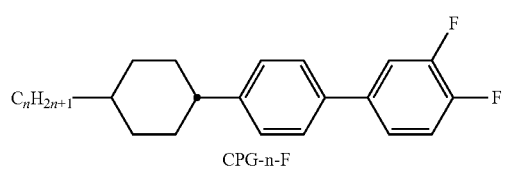
CPG-n-F
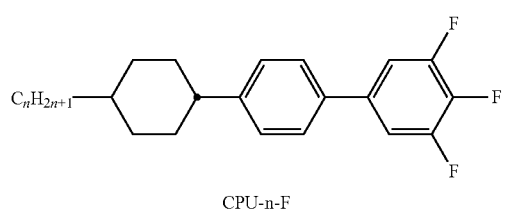
CPU-n-F
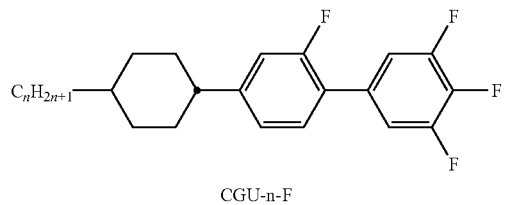
CGU-n-F TABLE D-continued
Illustrative structures
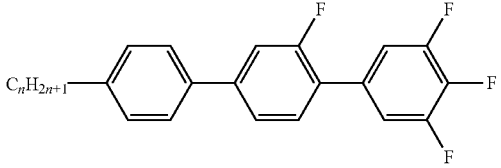
PGU-n-F
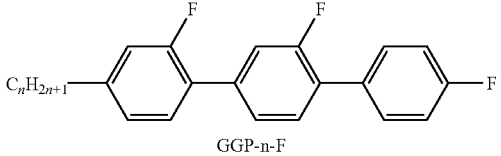
GGP-n-F
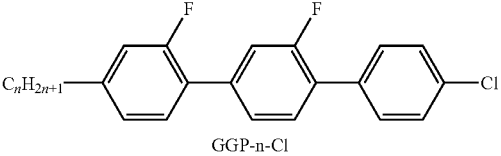
GGP-n-Cl
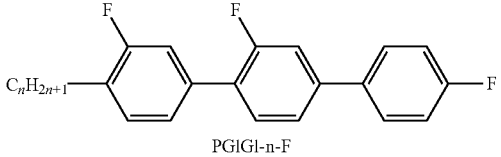
PGlGl-n-F
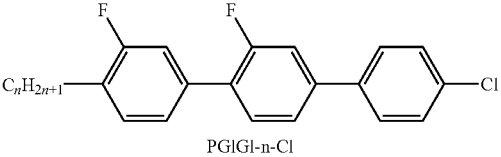
PGlGl-n-Cl
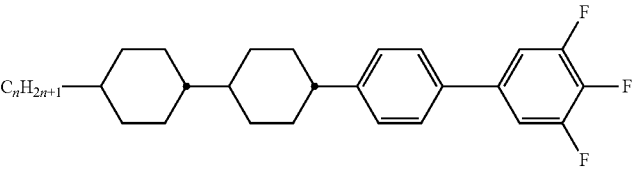
CCPU-n-F
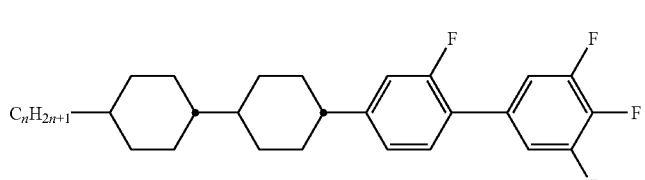
CCGU-n-F
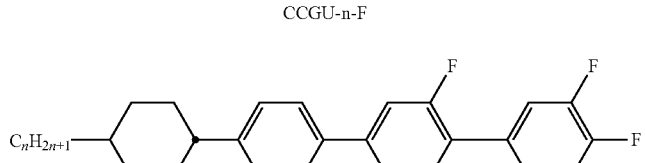
CPGU-n-F TABLE D-continued
Illustrative structures
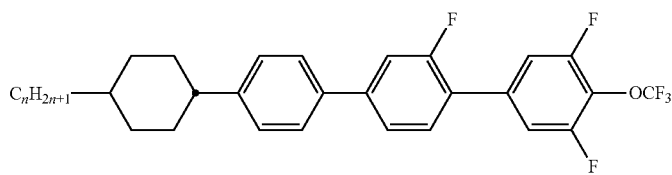
CPGU-n-OT
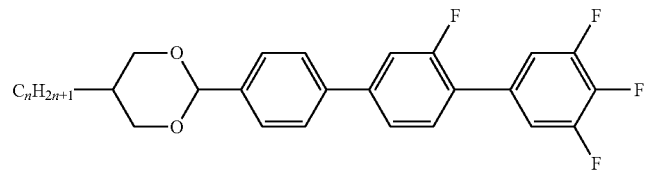
DPGU-n-F
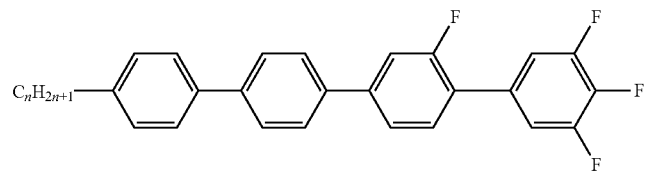
PGGU-n-F
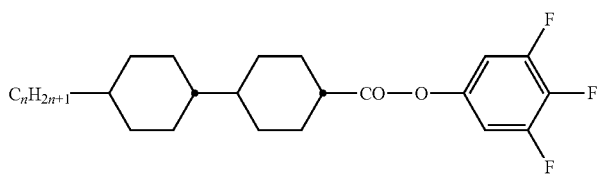
CCZU-n-F
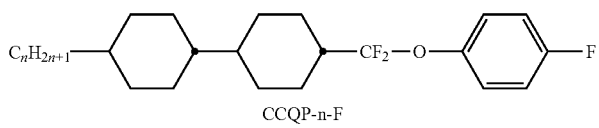
CCQP-n-F
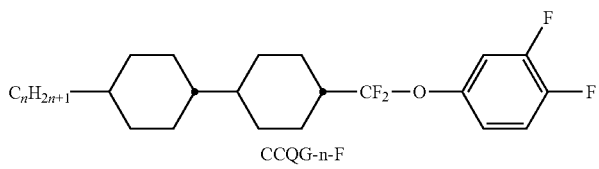
CCQG-n-F
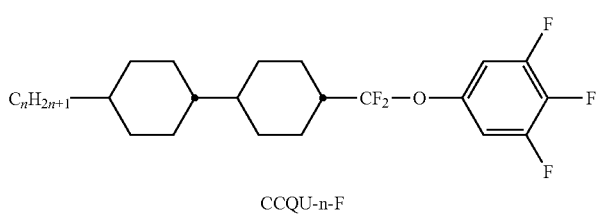
CCQU-n-F
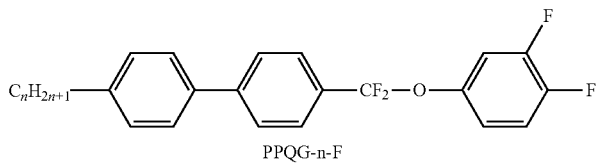
PPQG-n-F TABLE D-continued
Illustrative structures
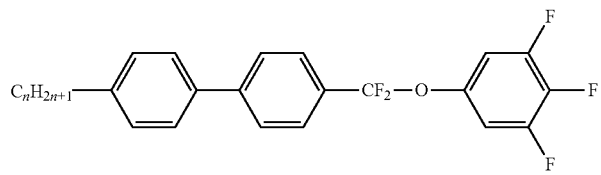
PPQU-n-F
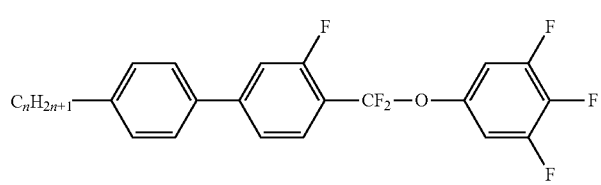
PGQU-n-F
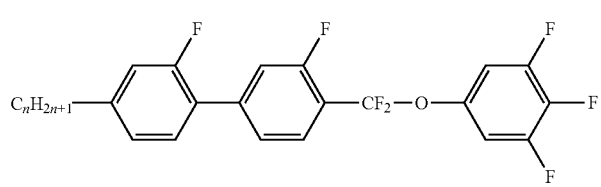
GGQU-n-F
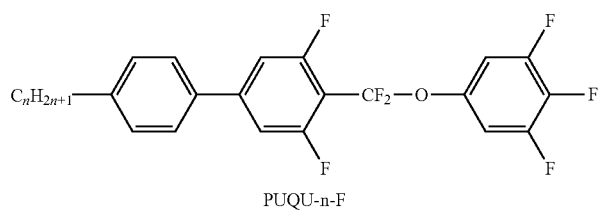
PUQU-n-F
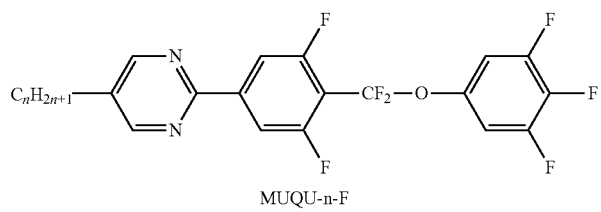
MUQU-n-F
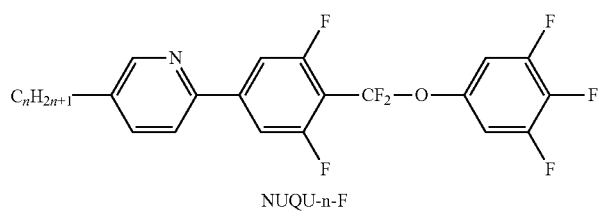
NUQU-n-F
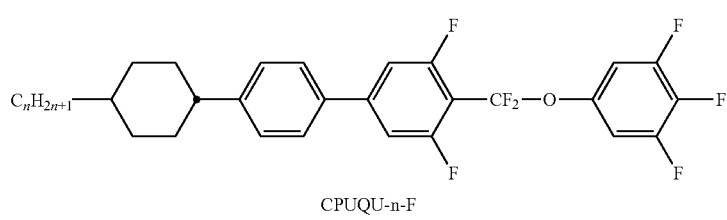
CPUQU-n-F TABLE D-continued Illustrative structures CGUQU-n-F PGPQP-n-F PGPQG-n-F PGPQU-n-F PGUQU-n-F APUQU-n-F DGUQU-n-F CY-n-Om TABLE D-continued
Illustrative structures
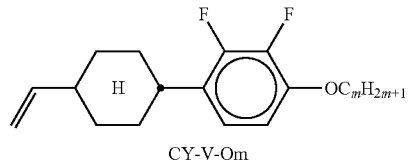
CY-V-Om
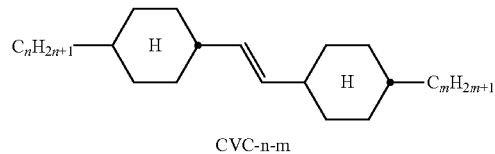
CVC-n-m
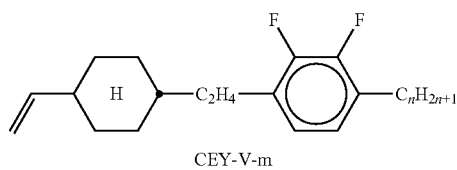
CEY-V-m
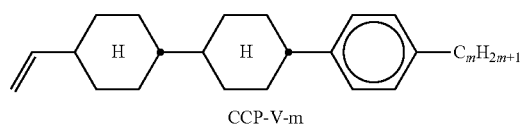
CCP-V-m
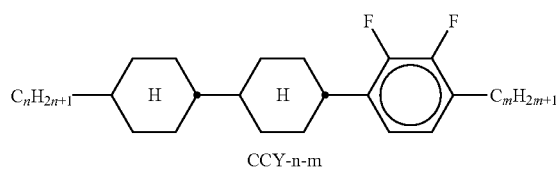
CCY-n-m
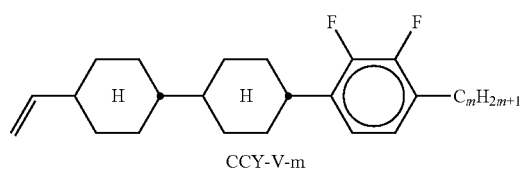
CCY-V-m
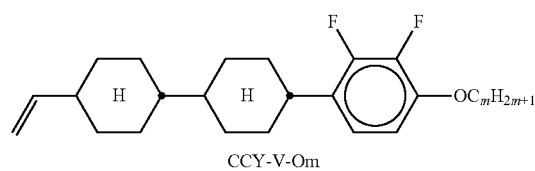
CCY-V-Om
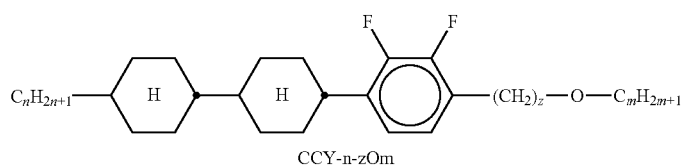
CCY-n-zOm
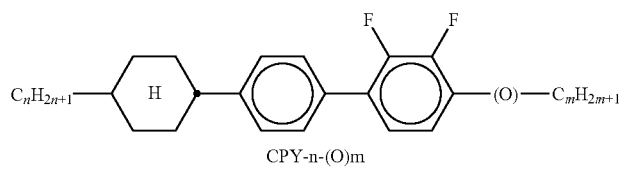
CPY-n-(O)m TABLE D-continued
Illustrative structures
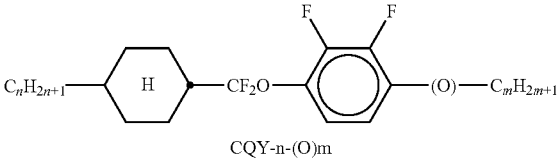
CQY-n-(O)m
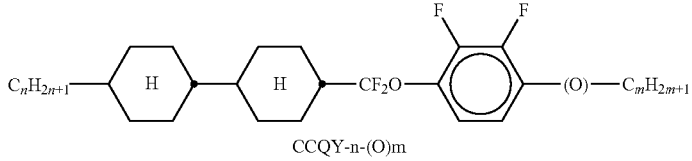
CCQY-n-(O)m
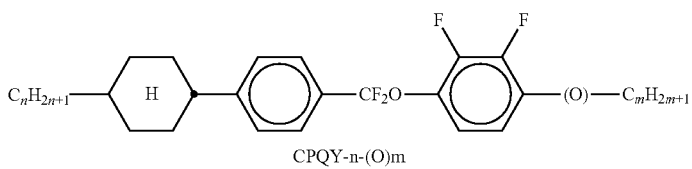
CPQY-n-(O)m
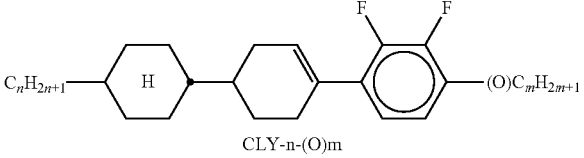
CLY-n-(O)m
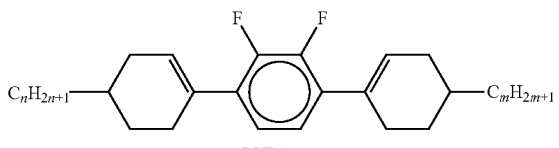
LYLI-n-m
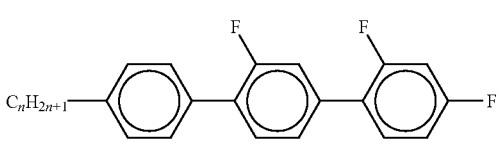
PGIGI-n-F
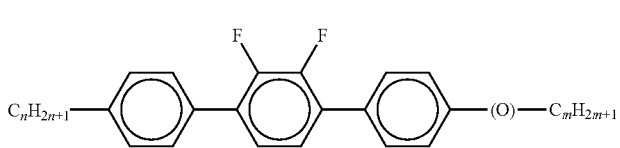
PYP-n-(O)m
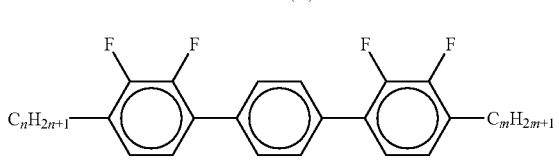
YPY-n-m
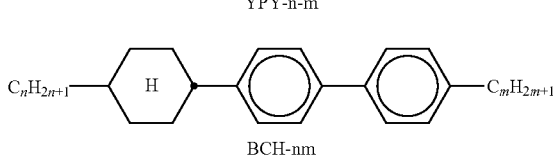
BCH-nm TABLE D-continued
Illustrative structures
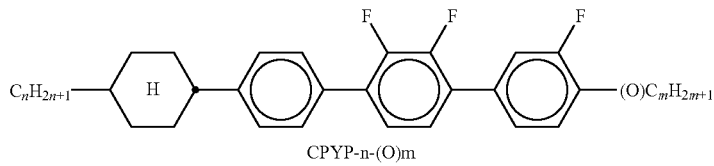
CPYP-n-(O)m
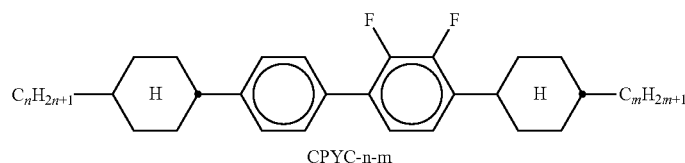
CPYC-n-m
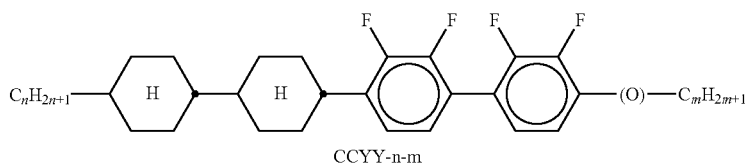
CCYY-n-m
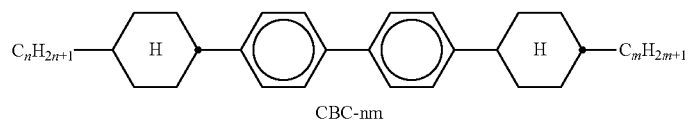
CBC-nm
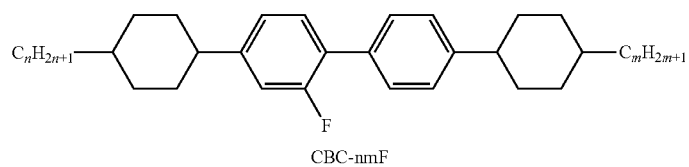
CBC-nmF
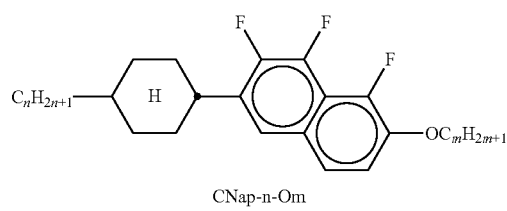
CNap-n-Om
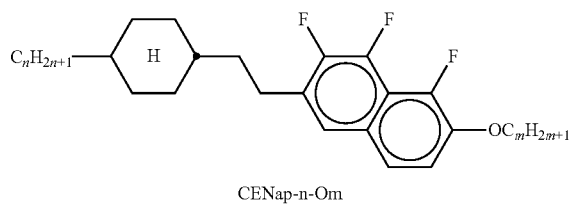
CENap-n-Om
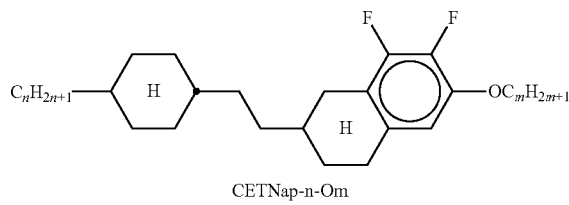
CETNap-n-Om TABLE D-continued
Illustrative structures
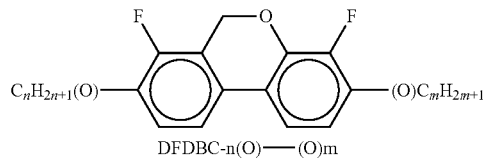
DFDBC-n(O)—(O)m
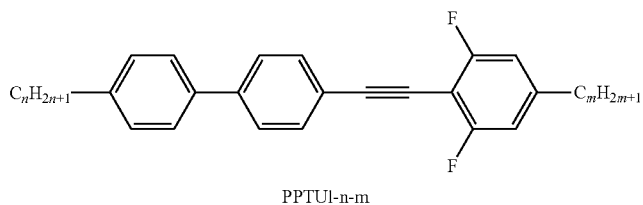
PPTUI-n-m
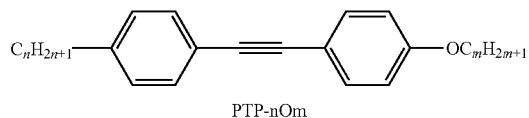
PTP-nOm
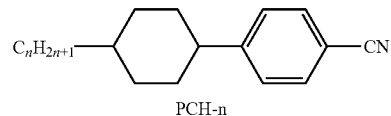
PCH-n
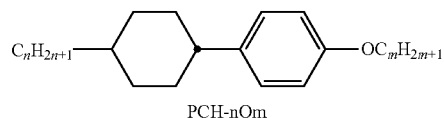
PCH-nOm
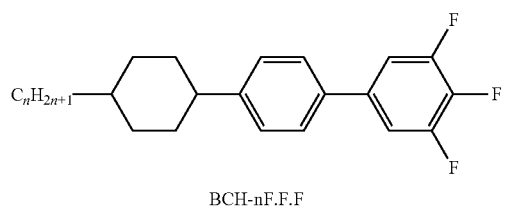
BCH-nF.F.F
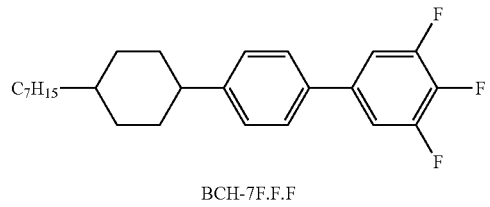
BCH-7F.F.F
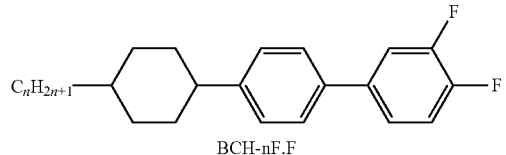
BCH-nF.F wherein n, m and 1 preferably, independently of one another, denote 1 to 7.

The following table shows illustrative compounds which can be used as stabilizers in the media according to the present invention.

TABLE E

Table E shows possible stabilizers which can be added to the LC media according to the invention, wherein n denotes an integer from 1 to 12, preferably 1, 2, 3, 4, 5, 6, 7 or 8, terminal methyl groups are not shown.

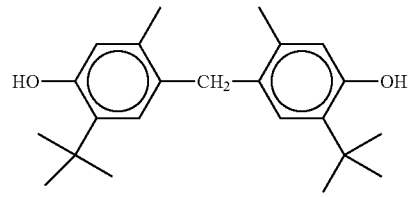

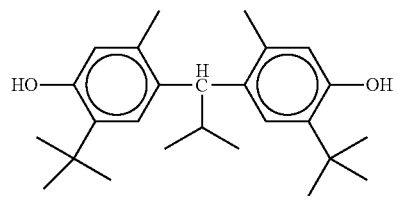

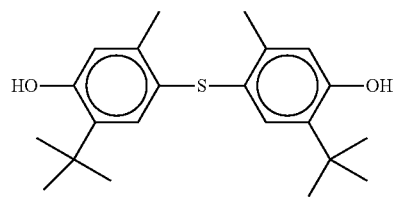

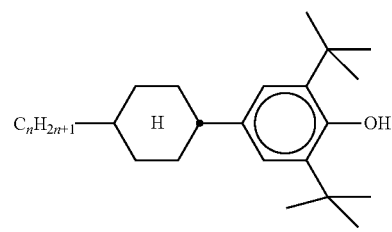

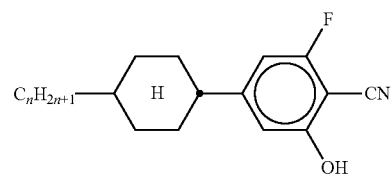

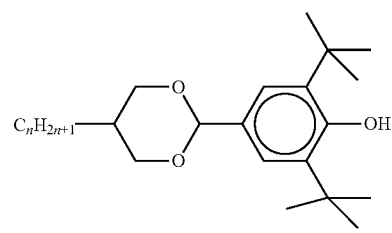

TABLE E-continued
Table E shows possible stabilizers which can be added to the LC media according to the invention, wherein n denotes an integer from 1 to 12, preferably 1, 2, 3, 4, 5, 6, 7 or 8, terminal methyl groups are not shown.
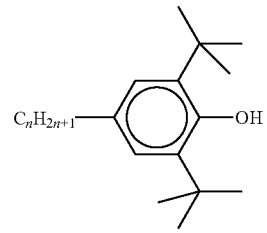
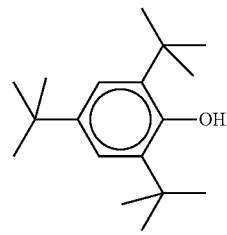
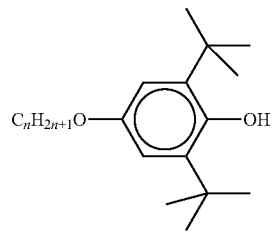
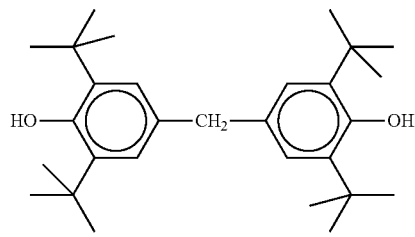
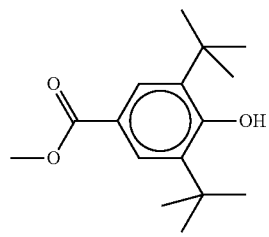
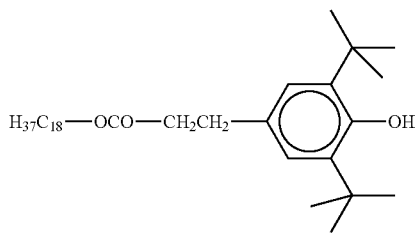

TABLE E-continued
Table E shows possible stabilizers which can be added to the LC media according to the invention, wherein n denotes an integer from 1 to 12, preferably 1, 2, 3, 4, 5, 6, 7 or 8, terminal methyl groups are not shown.
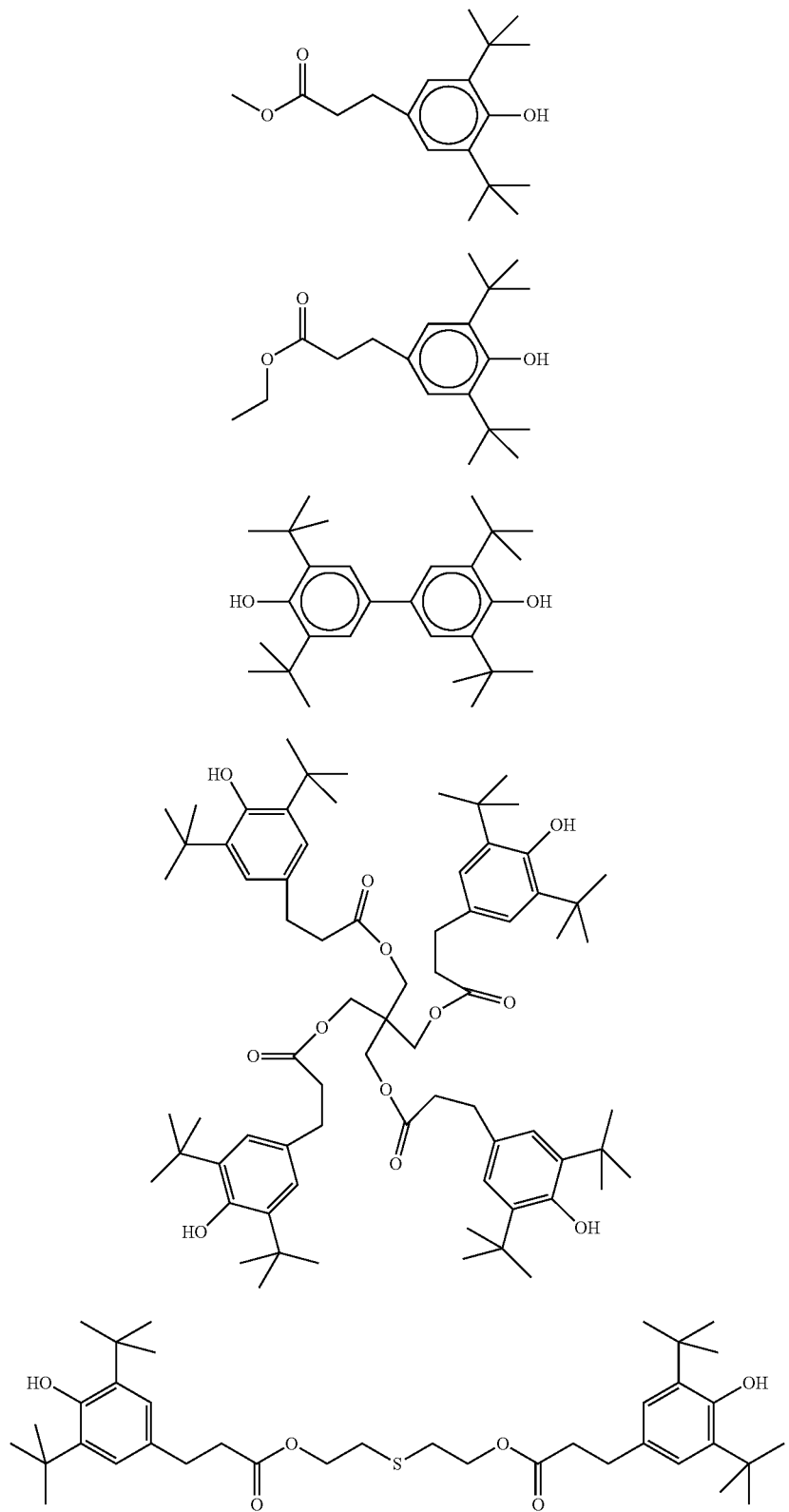

TABLE E-continued
Table E shows possible stabilizers which can be added to the LC media according to the invention, wherein n denotes an integer from 1 to 12, preferably 1, 2, 3, 4, 5, 6, 7 or 8, terminal methyl groups are not shown.
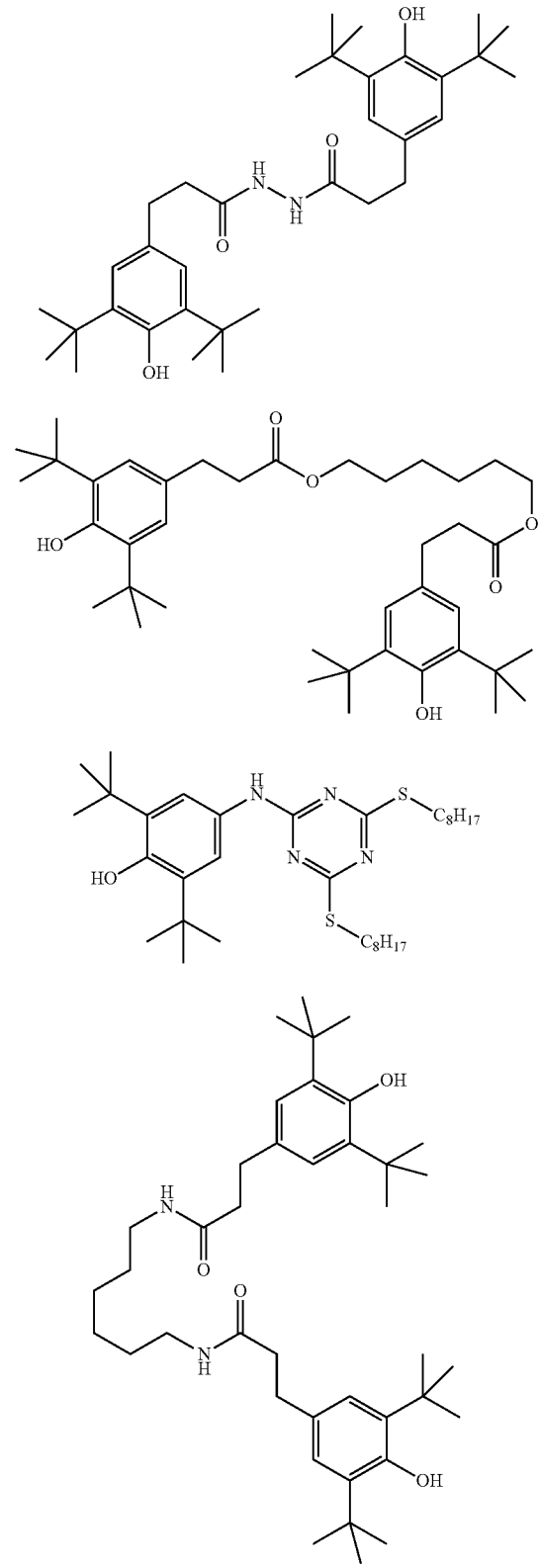

TABLE E-continued
Table E shows possible stabilizers which can be added to the LC media according to the invention, wherein n denotes an integer from 1 to 12, preferably 1, 2, 3, 4, 5, 6, 7 or 8, terminal methyl groups are not shown.
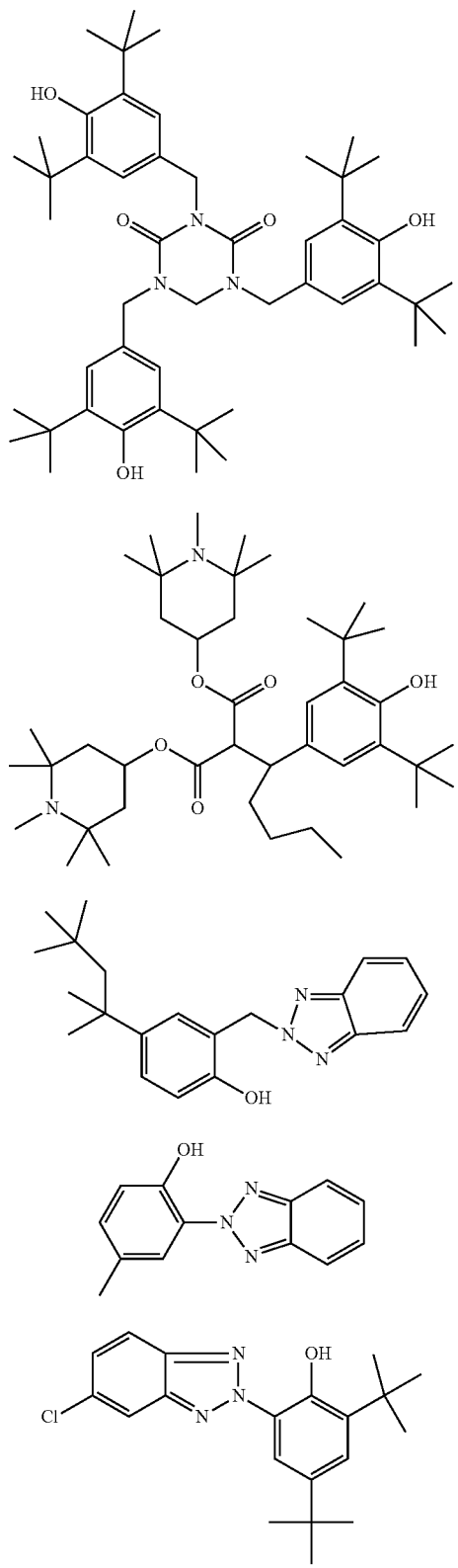

TABLE E-continued
Table E shows possible stabilizers which can be added to the LC media according to the invention, wherein n denotes an integer from 1 to 12, preferably 1, 2, 3, 4, 5, 6, 7 or 8, terminal methyl groups are not shown.
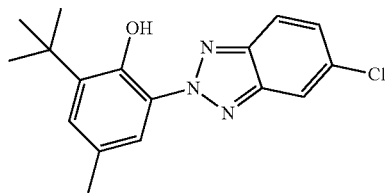 [SMILES: Cc1cc(-n2nc3ccc(Cl)cc3n2)c(O)c(C(C)(C)C)c1]
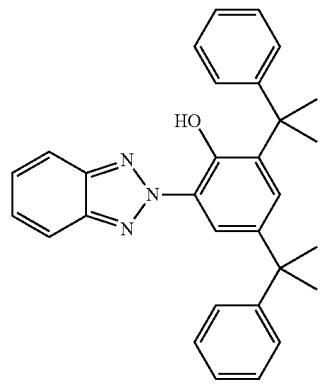 [SMILES: CC(C)(c1ccccc1)c1cc(-n2nc3ccccc3n2)c(O)c(C(C)(C)c2ccccc2)c1]
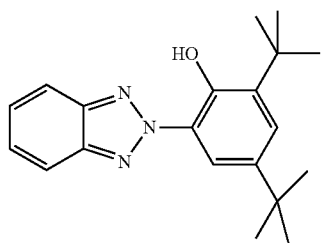 [SMILES: CC(C)(C)c1cc(-n2nc3ccccc3n2)c(O)c(C(C)(C)C)c1]
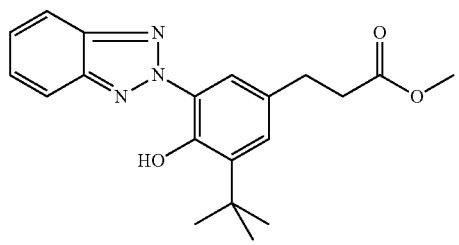 [SMILES: COC(=O)CCc1cc(-n2nc3ccccc3n2)c(O)c(C(C)(C)C)c1]
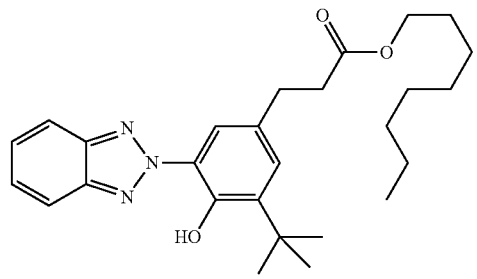 [SMILES: CCCCCCCCOC(=O)CCc1cc(-n2nc3ccccc3n2)c(O)c(C(C)(C)C)c1]

TABLE E-continued
Table E shows possible stabilizers which can be added to the LC media according to the invention, wherein n denotes an integer from 1 to 12, preferably 1, 2, 3, 4, 5, 6, 7 or 8, terminal methyl groups are not shown.
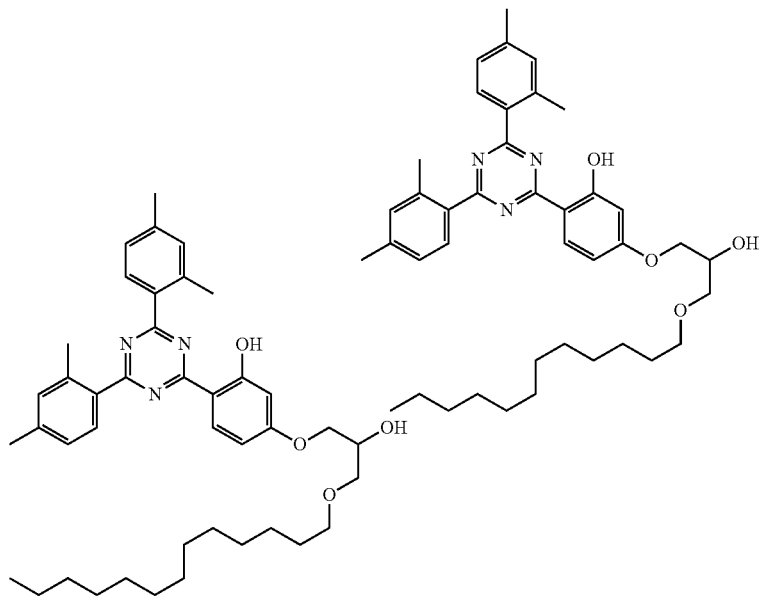
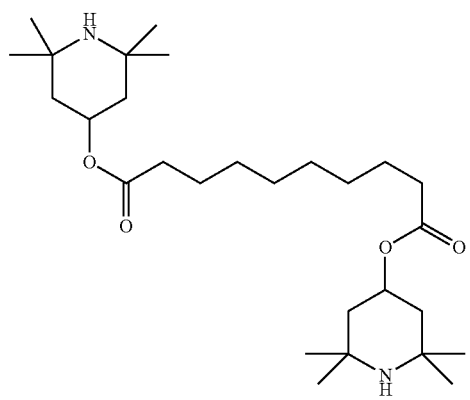
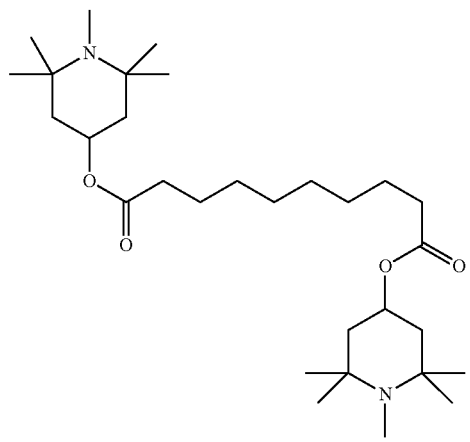

TABLE E-continued
Table E shows possible stabilizers which can be added to the LC media according to the invention, wherein n denotes an integer from 1 to 12, preferably 1, 2, 3, 4, 5, 6, 7 or 8, terminal methyl groups are not shown.
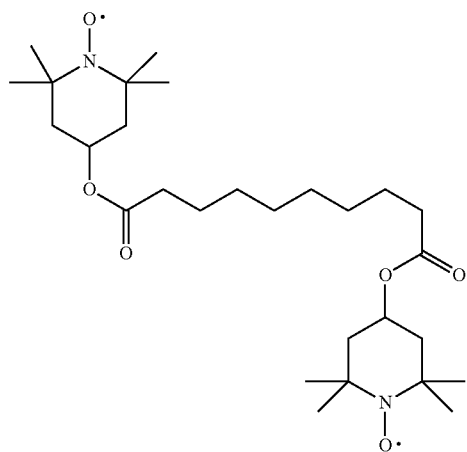
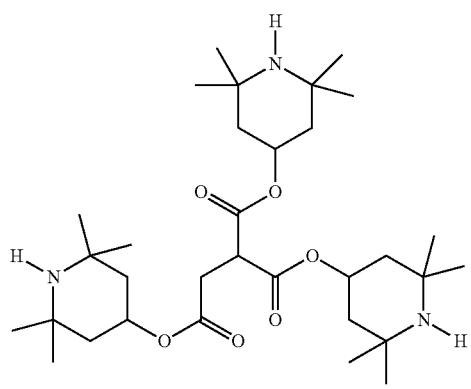
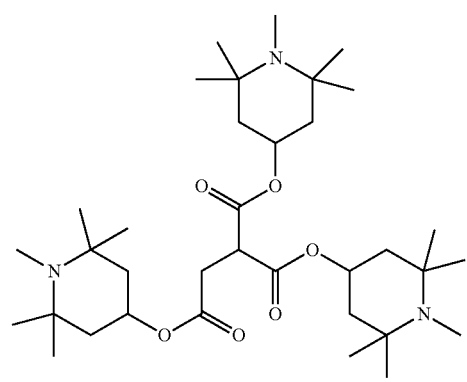

TABLE E-continued
Table E shows possible stabilizers which can be added to the LC media according to the invention, wherein n denotes an integer from 1 to 12, preferably 1, 2, 3, 4, 5, 6, 7 or 8, terminal methyl groups are not shown.
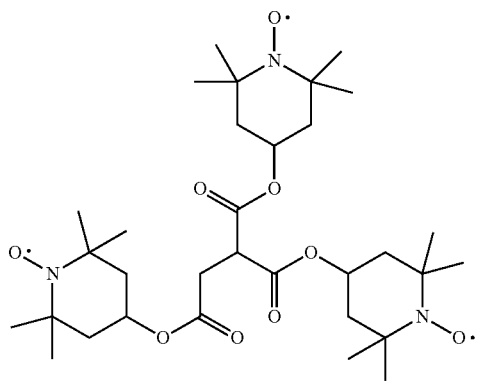
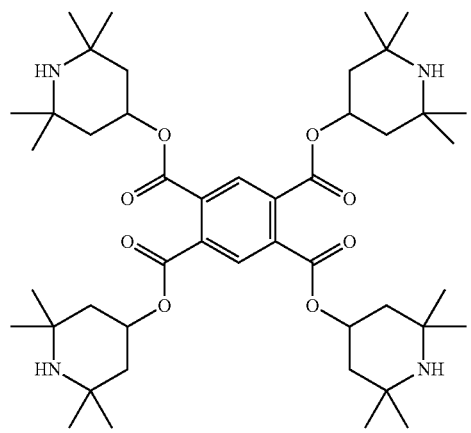
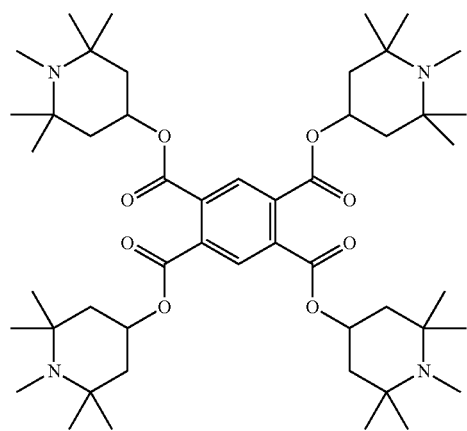

TABLE E-continued

Table E shows possible stabilizers which can be added to the LC media according to the invention, wherein n denotes an integer from 1 to 12, preferably 1, 2, 3, 4, 5, 6, 7 or 8, terminal methyl groups are not shown.

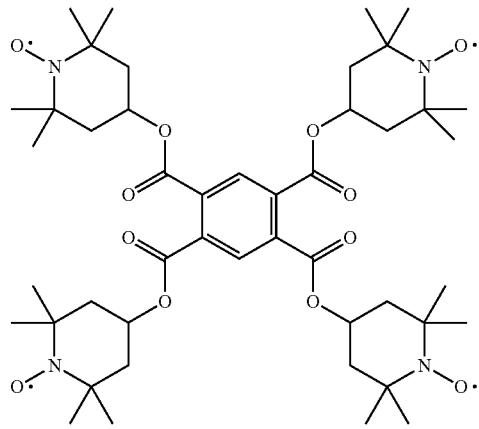

The LC media preferably comprise 0 to 10% by weight, in particular 1 ppm to 5% by weight, particularly preferably 1 ppm to 1% by weight, of stabilizers.

Table F below shows illustrative compounds which can preferably be used as chiral dopants in the mesogenic media according to the present invention.

TABLE F

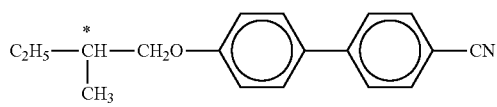

C 15

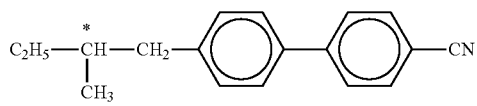

CB 15

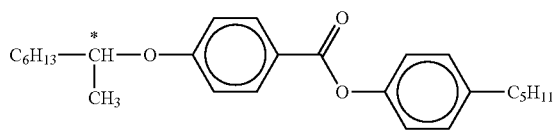

CM 21

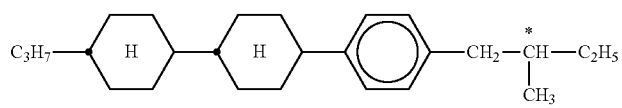

CM 44

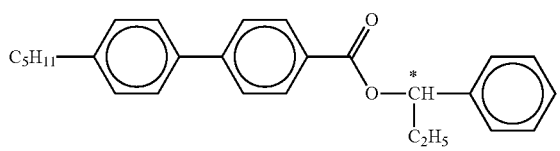

CM 45

TABLE F-continued
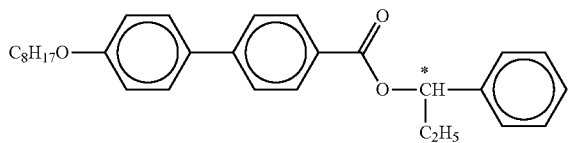
CM 47
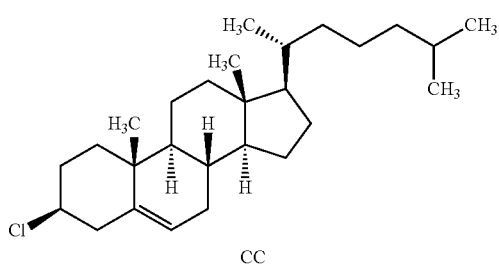
CC
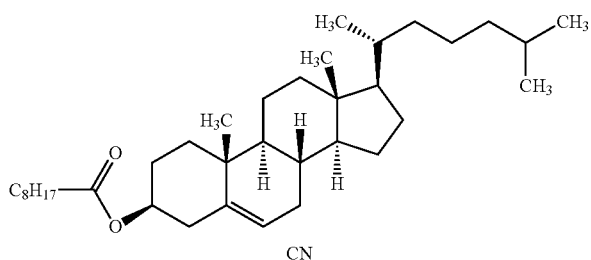
CN
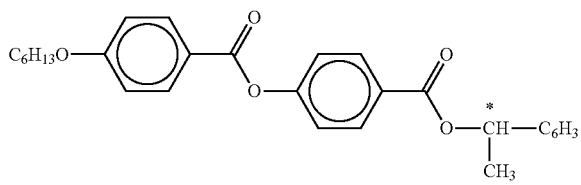
R/S-811
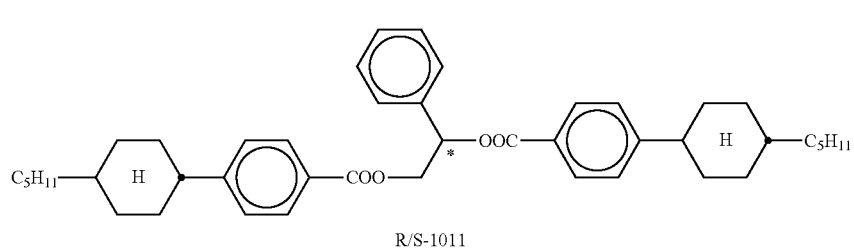
R/S-1011
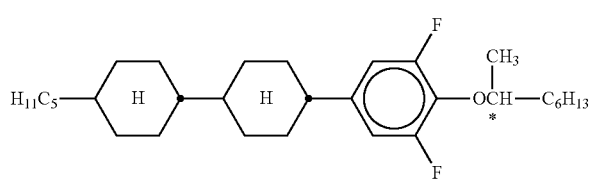
R/S-2011
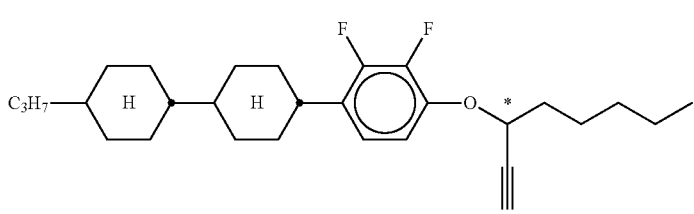
R/S-3011

TABLE F-continued

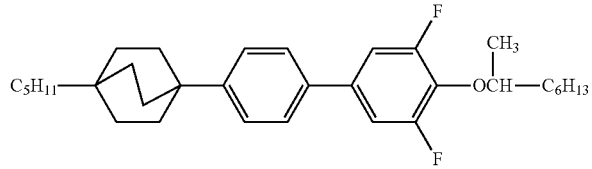

R/S-4011

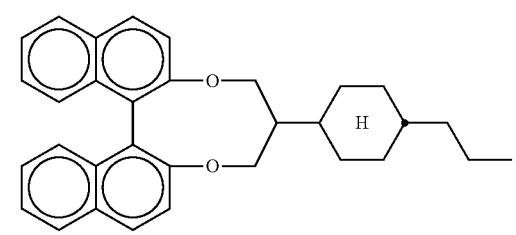

R/S-5011

In a preferred embodiment of the present invention, the mesogenic media comprise one or more compounds selected from the compounds shown in Table F.

The mesogenic media according to the present invention preferably comprise two or more, preferably four or more, compounds selected from the compounds shown in the above tables D to F.

In an embodiment the LC media according to the present invention preferably comprise three or more, more preferably five or more compounds shown in Table D.

TABLE G

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

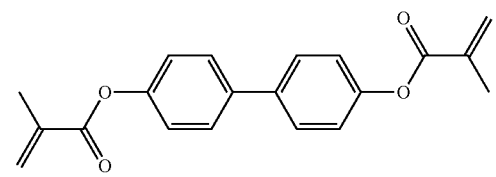 [SMILES: C=C(C)C(=O)Oc1ccc(-c2ccc(OC(=O)C(=C)C)cc2)cc1]

RM-1

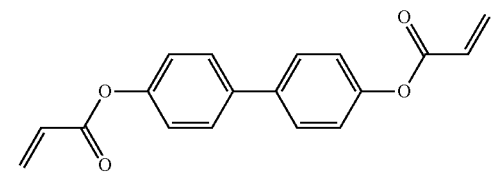

RM-2

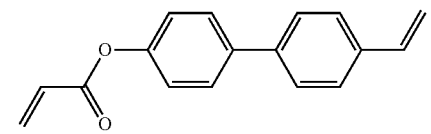 [SMILES: C=CC(=O)Oc1ccc(-c2ccc(C=C)cc2)cc1]

RM-3

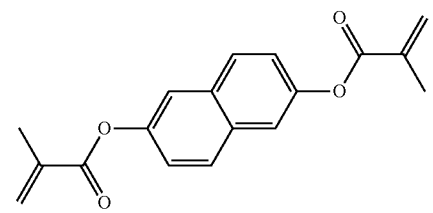 [SMILES: C=C(C)C(=O)Oc1ccc2cc(OC(=O)C(=C)C)ccc2c1]

RM-4

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

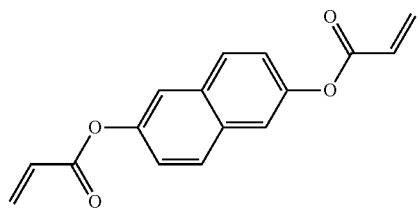 [SMILES: C=CC(=O)Oc1ccc2cc(OC(=O)C=C)ccc2c1] RM-5

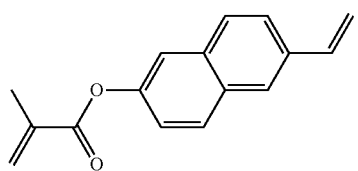 [SMILES: C=Cc1ccc2cc(OC(=O)C(=C)C)ccc2c1] RM-6

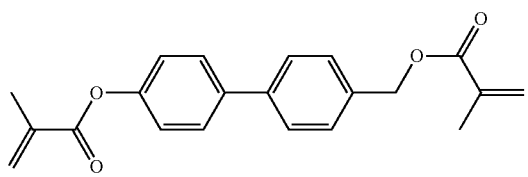 [SMILES: C=C(C)C(=O)OCc1ccc(-c2ccc(OC(=O)C(=C)C)cc2)cc1] RM-7

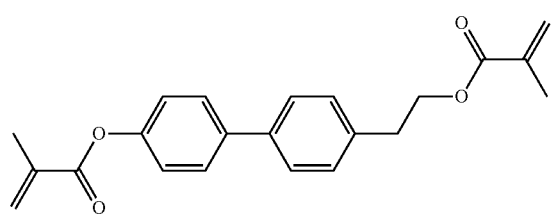 [SMILES: C=C(C)C(=O)OCCc1ccc(-c2ccc(OC(=O)C(=C)C)cc2)cc1] RM-8

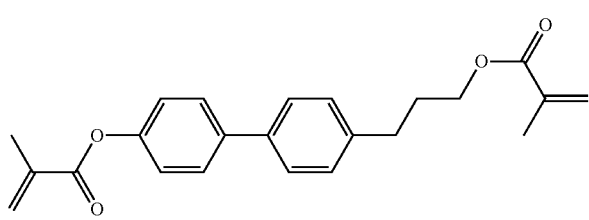 [SMILES: C=C(C)C(=O)OCCCc1ccc(-c2ccc(OC(=O)C(=C)C)cc2)cc1] RM-9

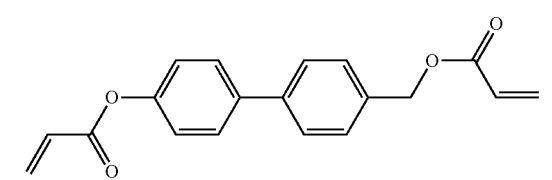 [SMILES: C=CC(=O)OCc1ccc(-c2ccc(OC(=O)C=C)cc2)cc1] RM-10

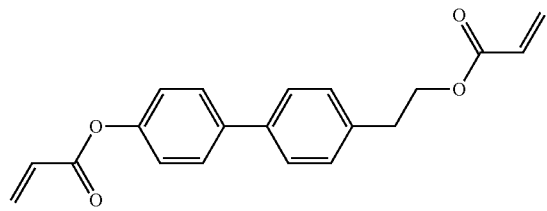 [SMILES: C=CC(=O)OCCc1ccc(-c2ccc(OC(=O)C=C)cc2)cc1] RM-11

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

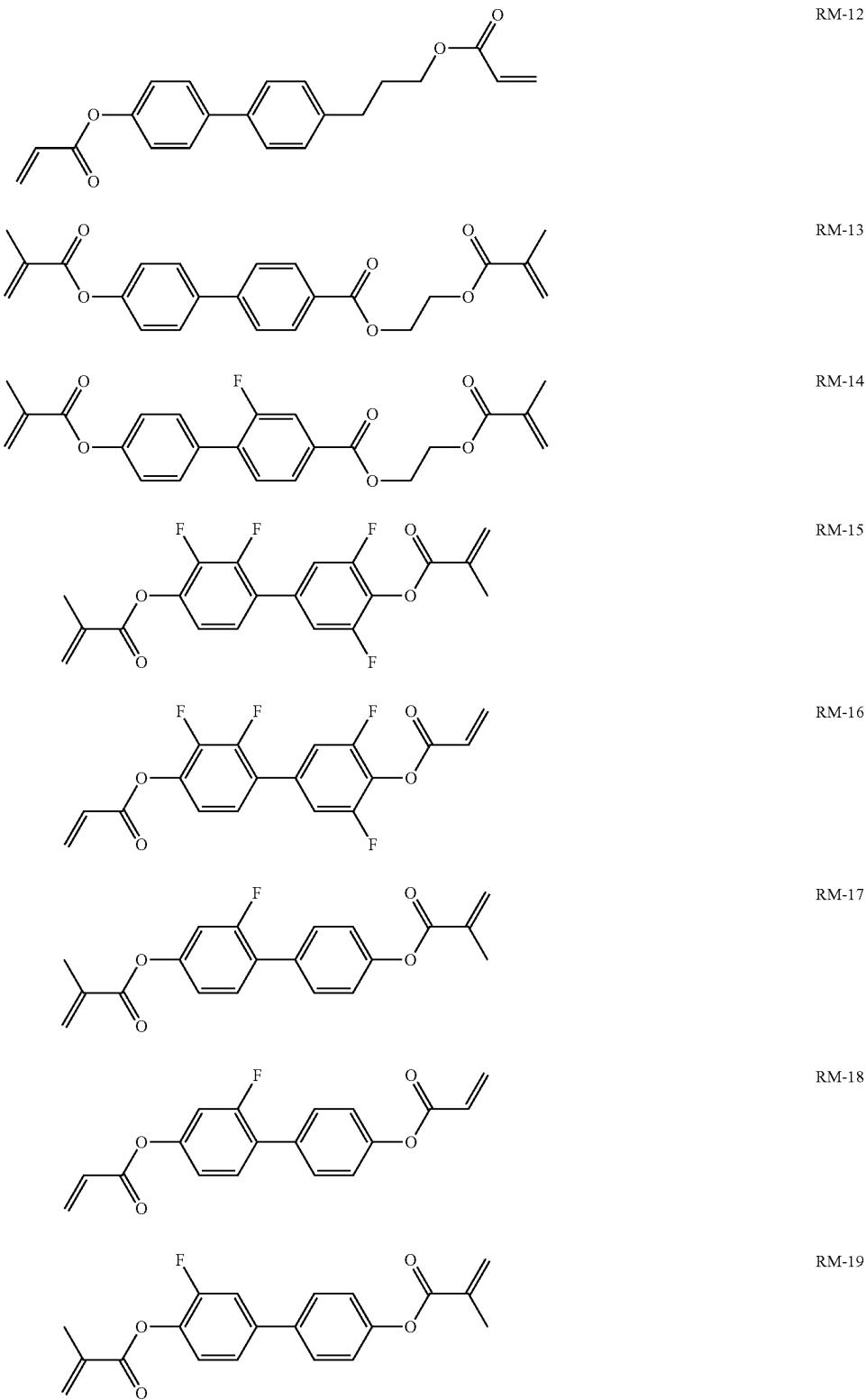

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

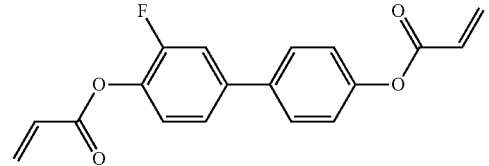 [SMILES: C=CC(=O)Oc1ccc(-c2ccc(OC(=O)C=C)c(F)c2)cc1]
RM-20

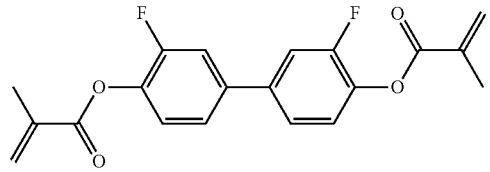 [SMILES: C=C(C)C(=O)Oc1ccc(-c2ccc(OC(=O)C(=C)C)c(F)c2)cc1F]
RM-21

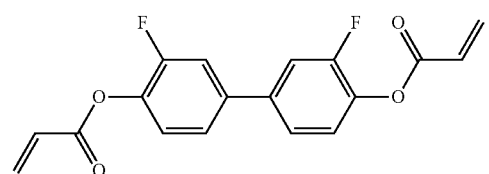
RM-22

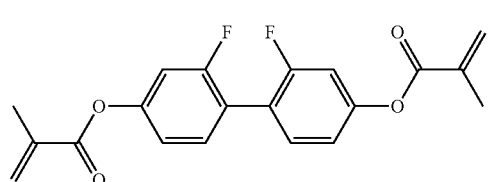
RM-23

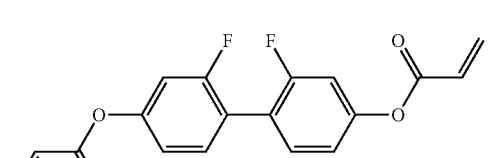
RM-24

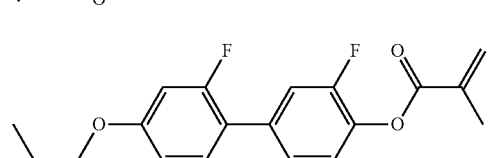
RM-25

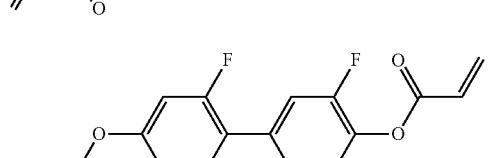
RM-26

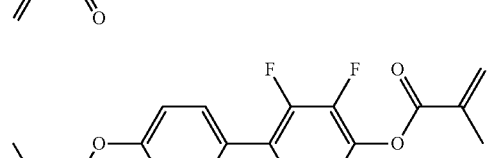
RM-27

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

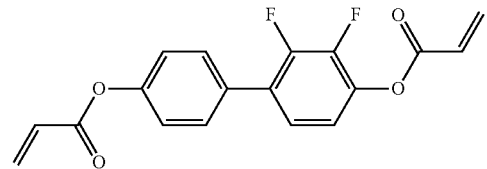

RM-28

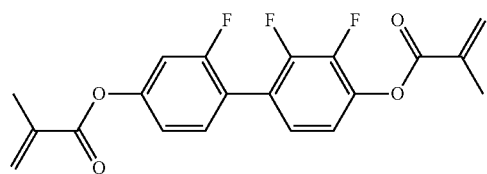

RM-29

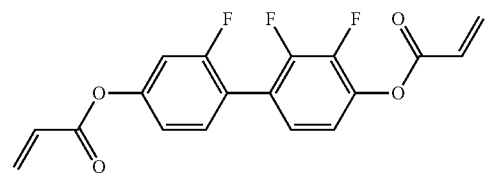 [SMILES: C=CC(=O)Oc1ccc(-c2ccc(OC(=O)C=C)c(F)c2F)cc1]

RM-30

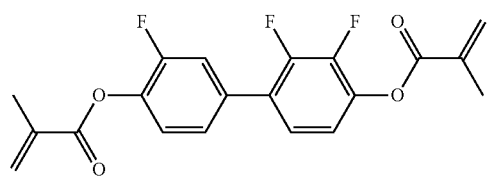 [SMILES: C=C(C)C(=O)Oc1ccc(-c2ccc(OC(=O)C(=C)C)c(F)c2F)cc1F]

RM-31

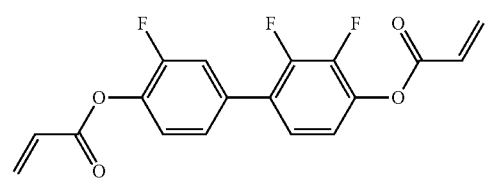 [SMILES: C=CC(=O)Oc1ccc(-c2ccc(OC(=O)C=C)c(F)c2F)cc1F]

RM-32

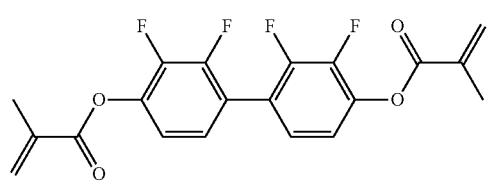 [SMILES: C=C(C)C(=O)Oc1ccc(-c2ccc(OC(=O)C(=C)C)c(F)c2F)c(F)c1F]

RM-33

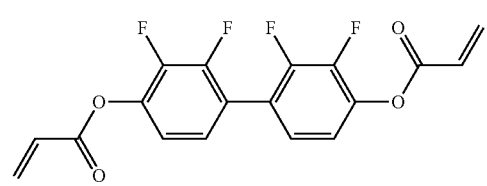

RM-34

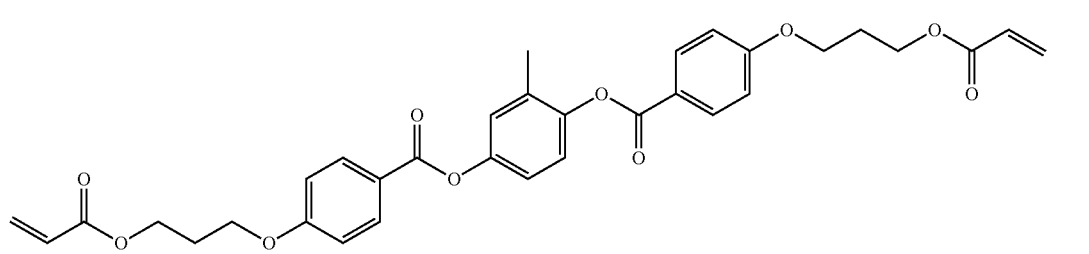 [SMILES: C=CC(=O)OCCCOc1ccc(C(=O)Oc2ccc(OC(=O)c3ccc(OCCCOC(=O)C=C)cc3)c(C)c2)cc1]

RM-35

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

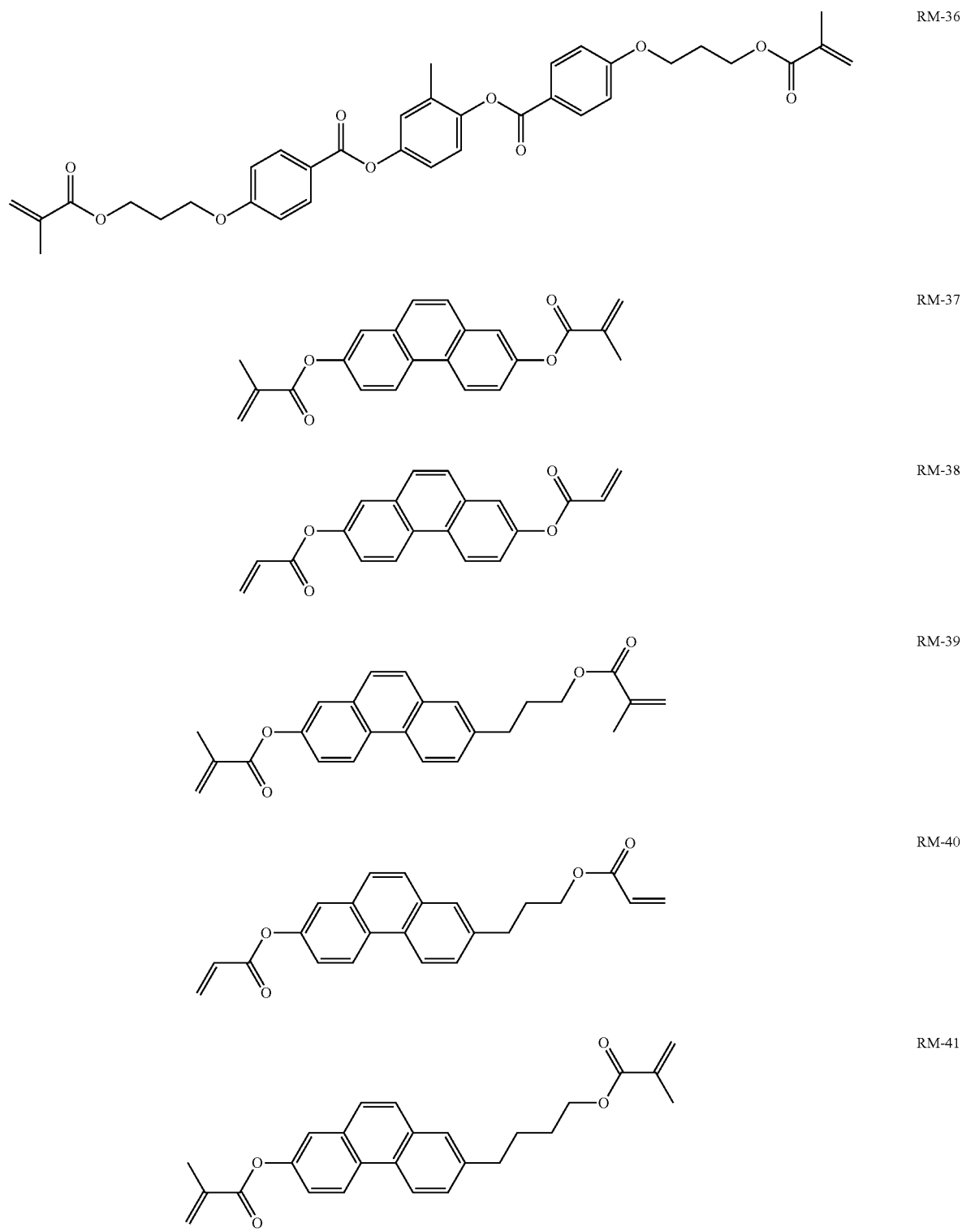

RM-36

RM-37

RM-38

RM-39

RM-40

RM-41

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

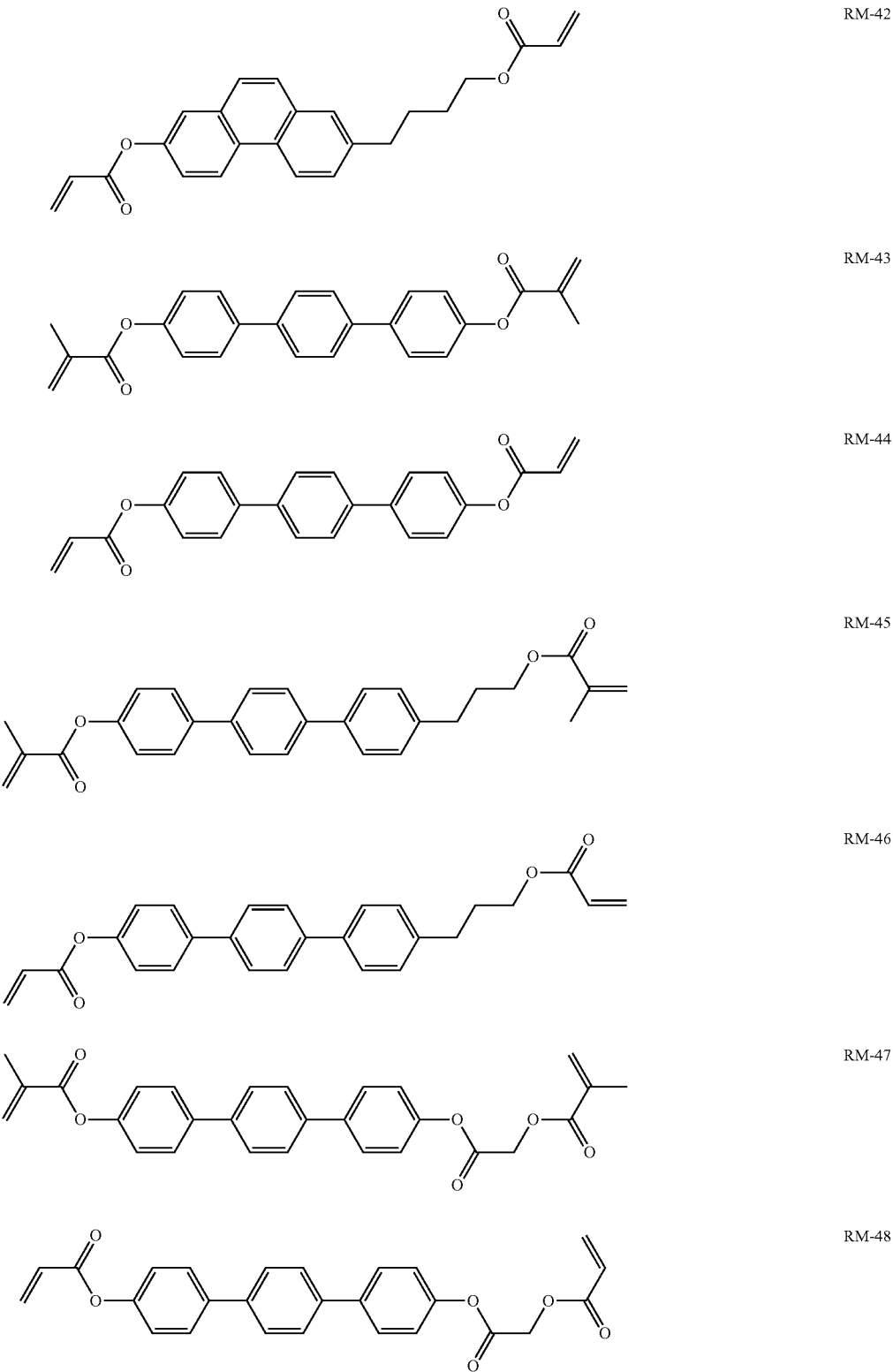

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

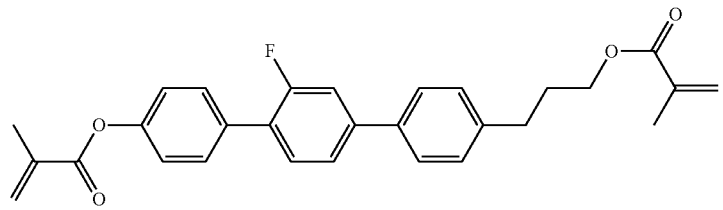 [SMILES: C=C(C)C(=O)OCCCc1ccc(-c2ccc(-c3ccc(OC(=O)C(=C)C)cc3)c(F)c2)cc1] RM-49

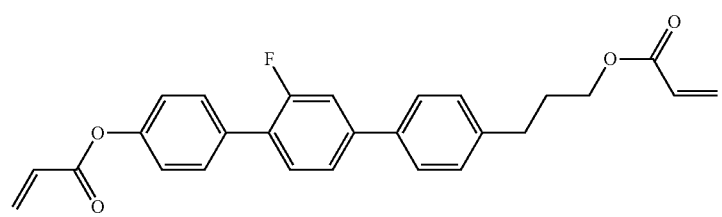 [SMILES: C=CC(=O)OCCCc1ccc(-c2ccc(-c3ccc(OC(=O)C=C)cc3)c(F)c2)cc1] RM-50

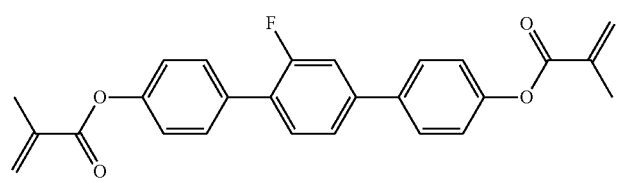 [SMILES: C=C(C)C(=O)Oc1ccc(-c2ccc(-c3ccc(OC(=O)C(=C)C)cc3)c(F)c2)cc1] RM-51

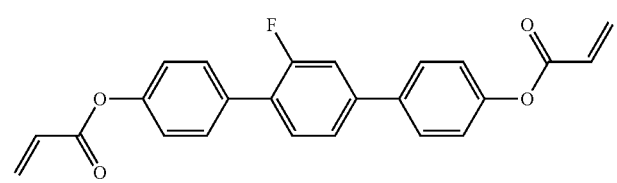 RM-52

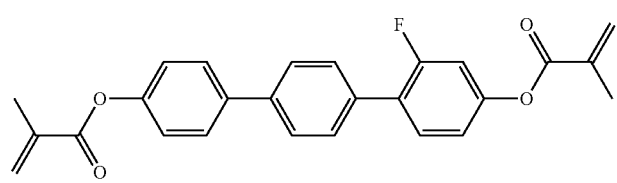 RM-53

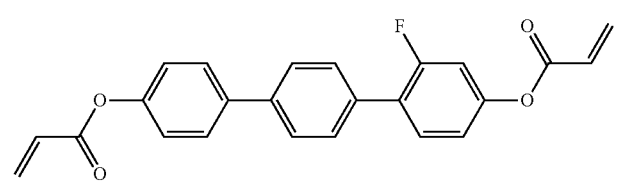 RM-54

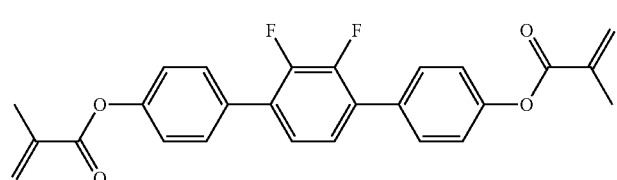 RM-55

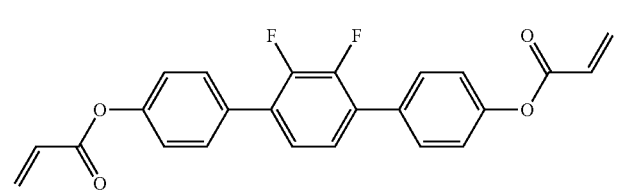 [SMILES: C=CC(=O)Oc1ccc(-c2ccc(-c3ccc(OC(=O)C=C)cc3)c(F)c2)cc1] RM-56

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

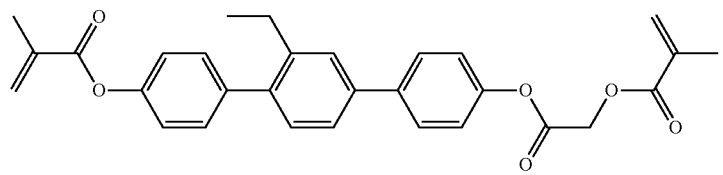 [SMILES: C=C(C)C(=O)OCC(=O)Oc1ccc(-c2ccc(-c3ccc(OC(=O)C(=C)C)cc3)c(CC)c2)cc1]

RM-57

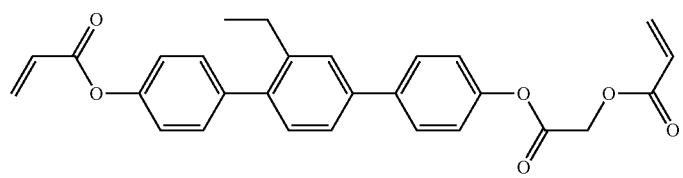 [SMILES: C=CC(=O)OCC(=O)Oc1ccc(-c2ccc(-c3ccc(OC(=O)C=C)cc3)c(CC)c2)cc1]

RM-58

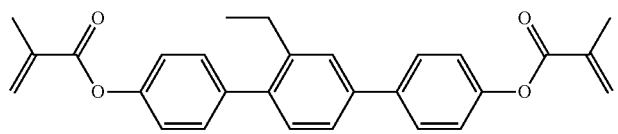

RM-59

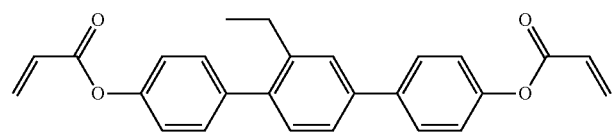 [SMILES: C=CC(=O)Oc1ccc(-c2ccc(-c3ccc(OC(=O)C=C)cc3)c(CC)c2)cc1]

RM-60

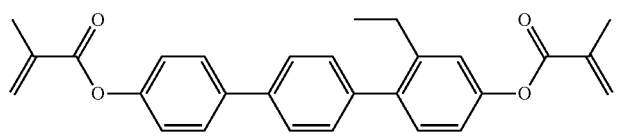 [SMILES: C=C(C)C(=O)Oc1ccc(-c2ccc(-c3ccc(OC(=O)C(=C)C)cc3CC)cc2)cc1]

RM-61

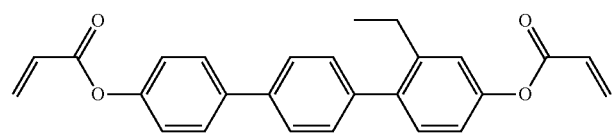 [SMILES: C=CC(=O)Oc1ccc(-c2ccc(-c3ccc(OC(=O)C=C)cc3CC)cc2)cc1]

RM-62

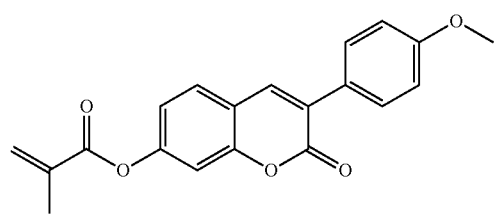 [SMILES: C=C(C)C(=O)Oc1ccc2cc(-c3ccc(OC)cc3)c(=O)oc2c1]

RM-63

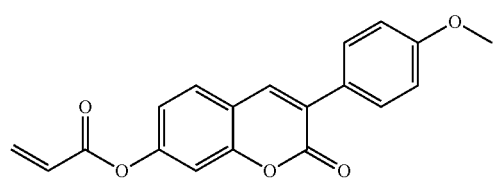 [SMILES: C=CC(=O)Oc1ccc2cc(-c3ccc(OC)cc3)c(=O)oc2c1]

RM-64

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

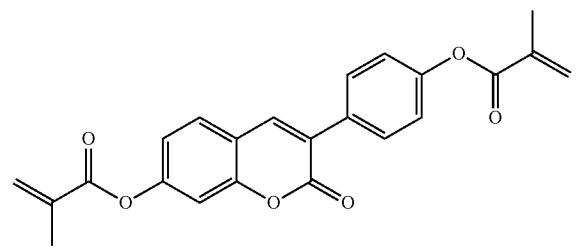 [SMILES: C=C(C)C(=O)Oc1ccc(-c2cc3ccc(OC(=O)C(=C)C)cc3oc2=O)cc1]
RM-65

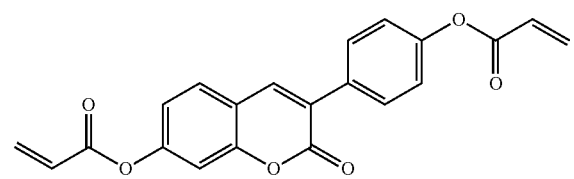 [SMILES: C=CC(=O)Oc1ccc(-c2cc3ccc(OC(=O)C=C)cc3oc2=O)cc1]
RM-66

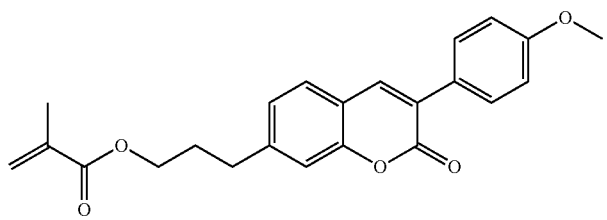 [SMILES: C=C(C)C(=O)OCCCc1ccc2cc(-c3ccc(OC)cc3)c(=O)oc2c1]
RM-67

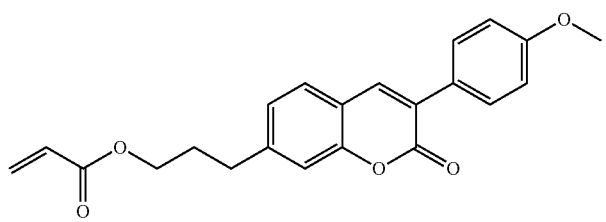 [SMILES: C=CC(=O)OCCCc1ccc2cc(-c3ccc(OC)cc3)c(=O)oc2c1]
RM-68

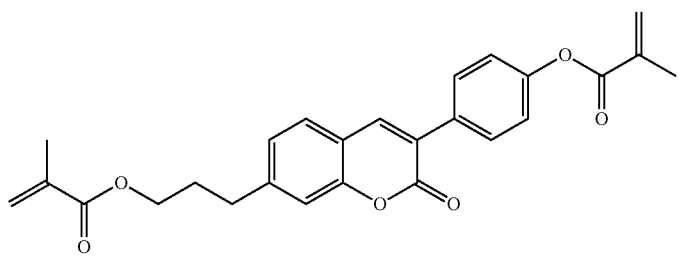 [SMILES: C=C(C)C(=O)OCCCc1ccc2cc(-c3ccc(OC(=O)C(=C)C)cc3)c(=O)oc2c1]
RM-69

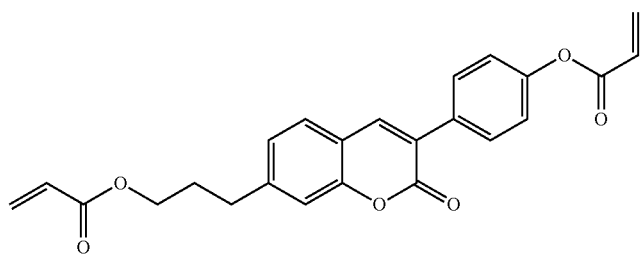 [SMILES: C=CC(=O)OCCCc1ccc2cc(-c3ccc(OC(=O)C=C)cc3)c(=O)oc2c1]
RM-70

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

RM-71

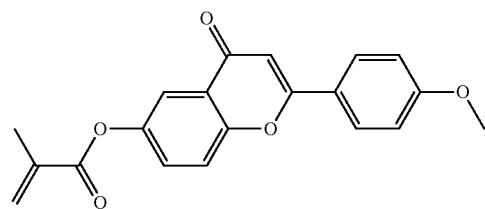 [SMILES: C=C(C)C(=O)Oc1ccc2oc(-c3ccc(OC)cc3)cc(=O)c2c1]

RM-72

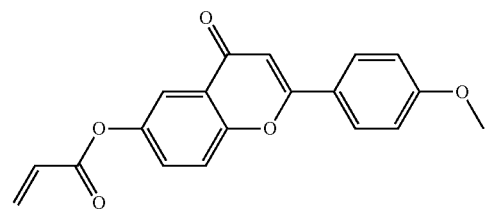 [SMILES: C=CC(=O)Oc1ccc2oc(-c3ccc(OC)cc3)cc(=O)c2c1]

RM-73

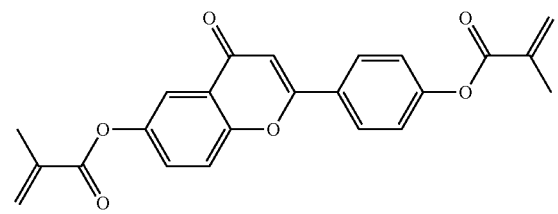 [SMILES: C=C(C)C(=O)Oc1ccc(-c2cc(=O)c3cc(OC(=O)C(=C)C)ccc3o2)cc1]

RM-74

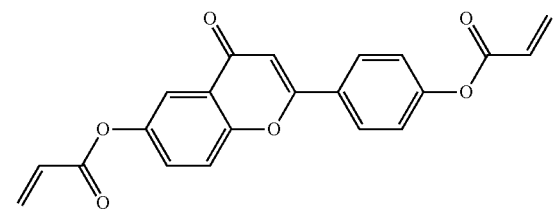 [SMILES: C=CC(=O)Oc1ccc(-c2cc(=O)c3cc(OC(=O)C=C)ccc3o2)cc1]

RM-75

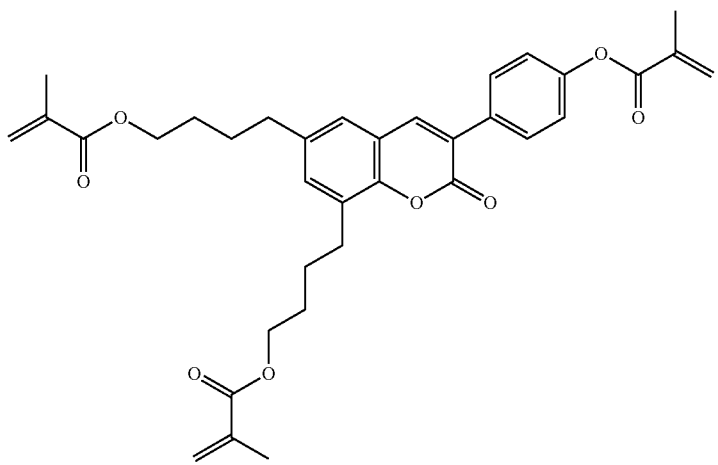 [SMILES: C=C(C)C(=O)OCCCCc1cc(CCCCOC(=O)C(=C)C)c2oc(=O)c(-c3ccc(OC(=O)C(=C)C)cc3)cc2c1]

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

RM-76
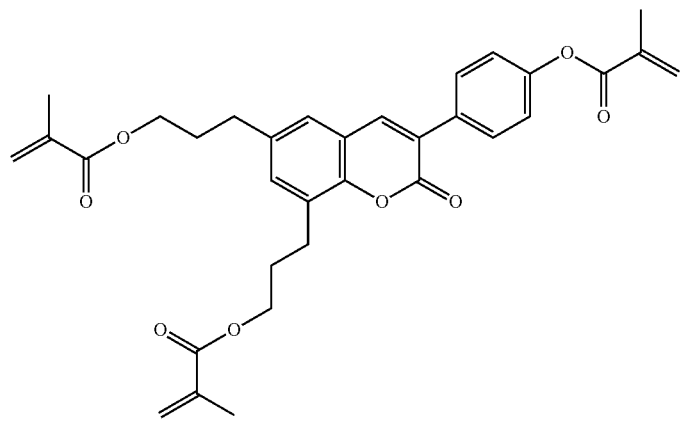 [SMILES: C=C(C)C(=O)OCCCc1cc(CCCOC(=O)C(=C)C)c2oc(=O)c(-c3ccc(OC(=O)C(=C)C)cc3)cc2c1]

RM-77
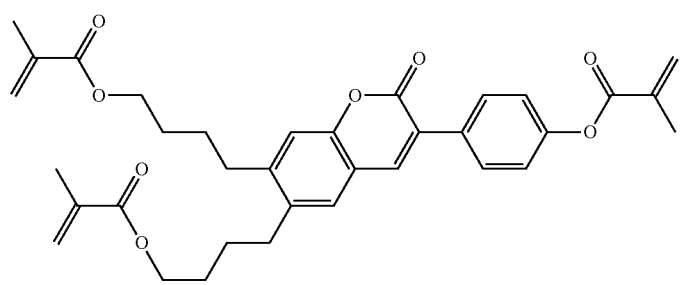 [SMILES: C=C(C)C(=O)OCCCCc1cc2cc(-c3ccc(OC(=O)C(=C)C)cc3)c(=O)oc2cc1CCCCOC(=O)C(=C)C]

RM-78
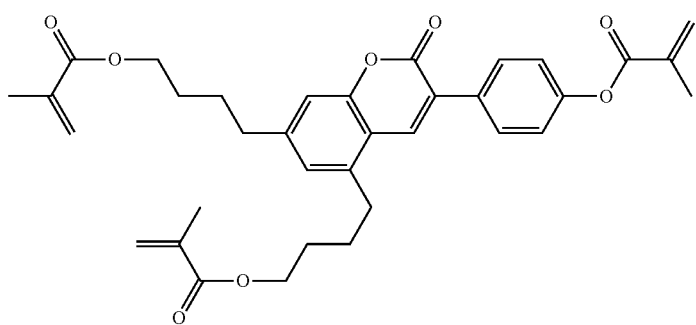 [SMILES: C=C(C)C(=O)OCCCCc1cc(CCCCOC(=O)C(=C)C)c2cc(-c3ccc(OC(=O)C(=C)C)cc3)c(=O)oc2c1]

RM-79
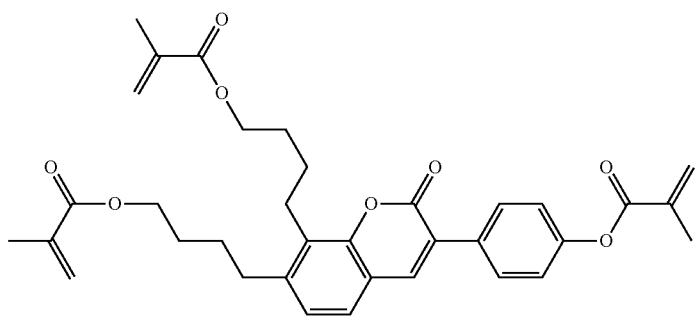 [SMILES: C=C(C)C(=O)OCCCCc1ccc2cc(-c3ccc(OC(=O)C(=C)C)cc3)c(=O)oc2c1CCCCOC(=O)C(=C)C]

RM-80
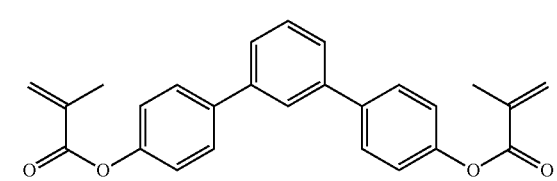 [SMILES: C=C(C)C(=O)Oc1ccc(-c2cccc(-c3ccc(OC(=O)C(=C)C)cc3)c2)cc1]

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

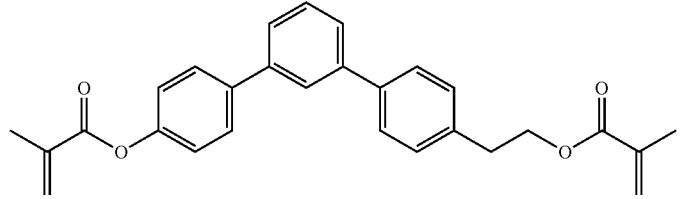 [SMILES: C=C(C)C(=O)OCCc1ccc(-c2cccc(-c3ccc(OC(=O)C(=C)C)cc3)c2)cc1]

RM-81

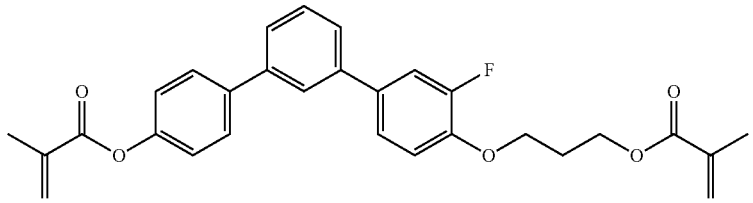 [SMILES: C=C(C)C(=O)OCCCOc1ccc(-c2cccc(-c3ccc(OC(=O)C(=C)C)cc3)c2)cc1F]

RM-82

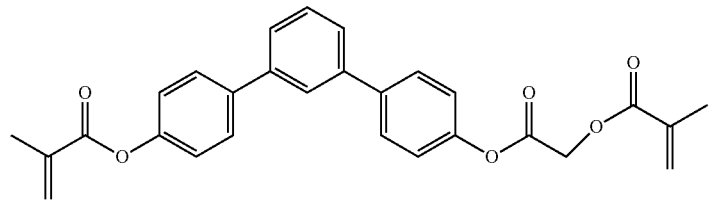 [SMILES: C=C(C)C(=O)OCC(=O)Oc1ccc(-c2cccc(-c3ccc(OC(=O)C(=C)C)cc3)c2)cc1]

RM-83

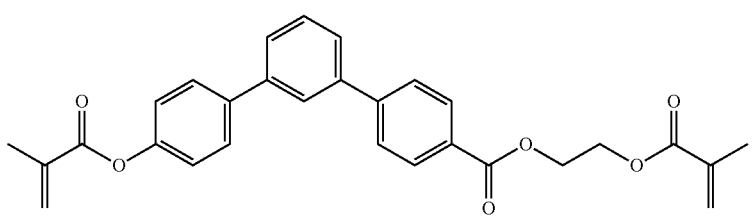 [SMILES: C=C(C)C(=O)OCCOC(=O)c1ccc(-c2cccc(-c3ccc(OC(=O)C(=C)C)cc3)c2)cc1]

RM-84

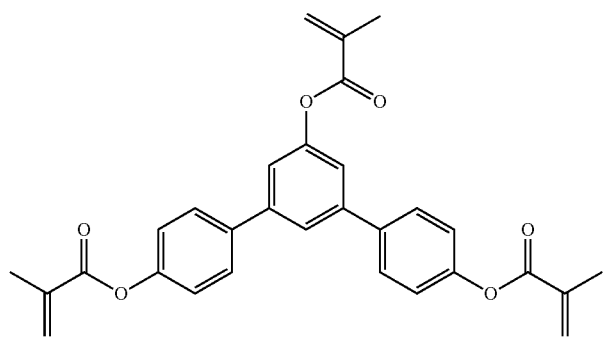 [SMILES: C=C(C)C(=O)Oc1ccc(-c2cc(OC(=O)C(=C)C)cc(-c3ccc(OC(=O)C(=C)C)cc3)c2)cc1]

RM-85

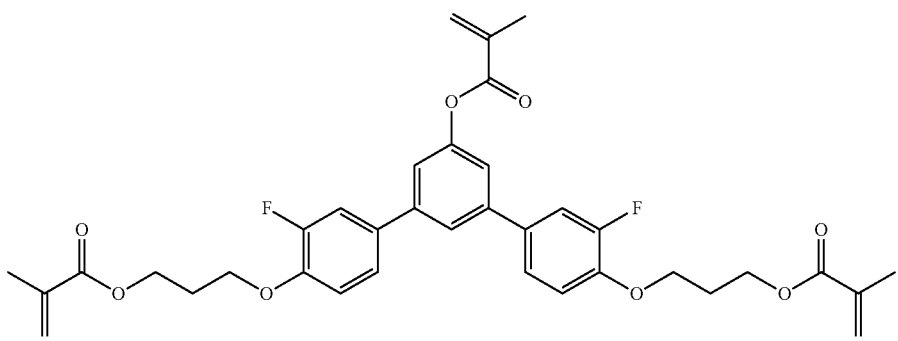 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]

RM-86

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

RM-87
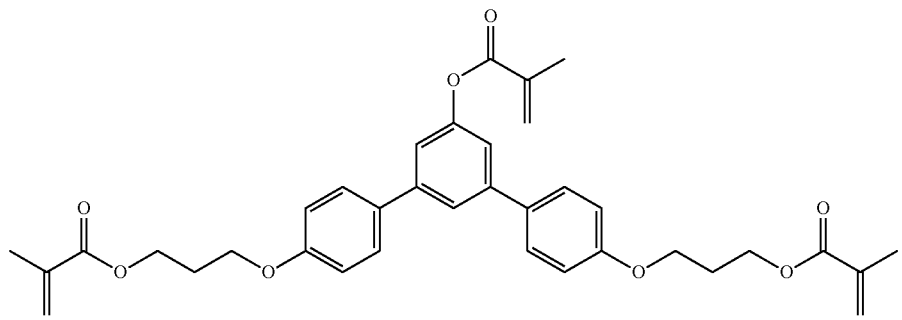 [SMILES: C=C(C)C(=O)OCCCOc1ccc(-c2cc(OC(=O)C(=C)C)cc(-c3ccc(OCCCOC(=O)C(=C)C)cc3)c2)cc1]

RM-88
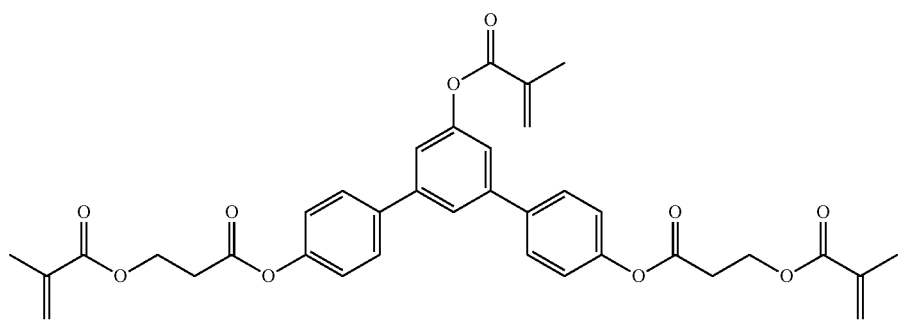 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]

RM-89
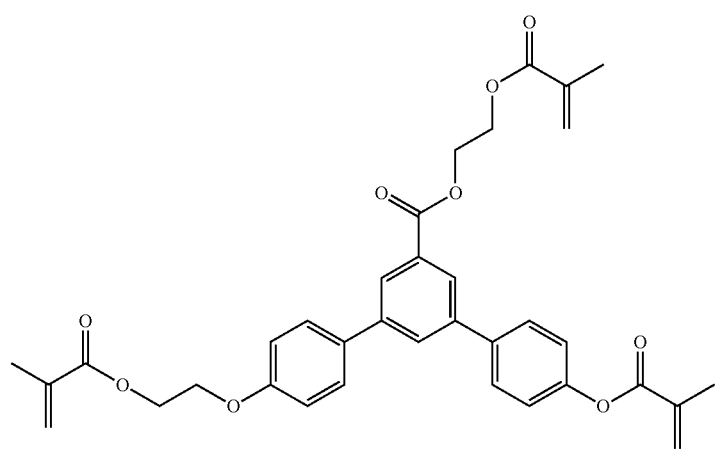 [SMILES: C=C(C)C(=O)OCCOC(=O)c1cc(-c2ccc(OCCOC(=O)C(=C)C)cc2)cc(-c2ccc(OC(=O)C(=C)C)cc2)c1]

RM-90
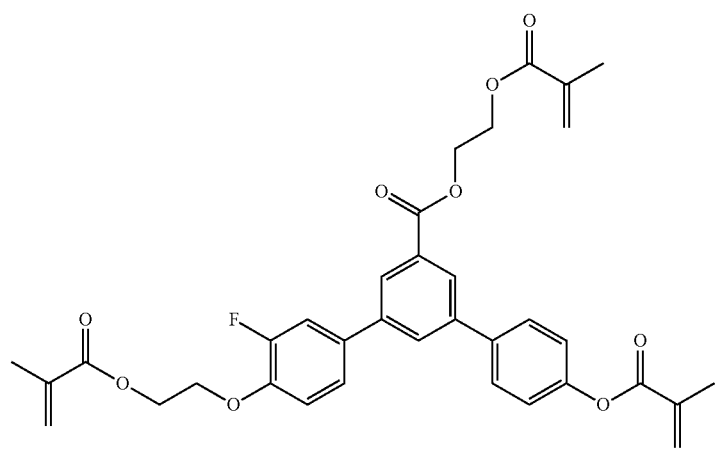 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

RM-91

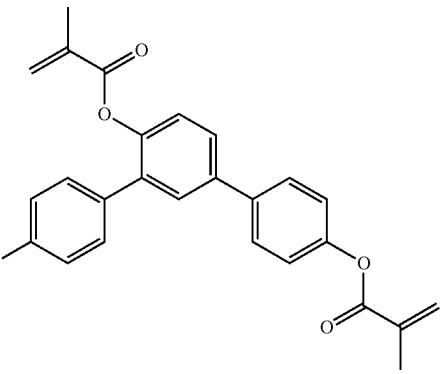

RM-92

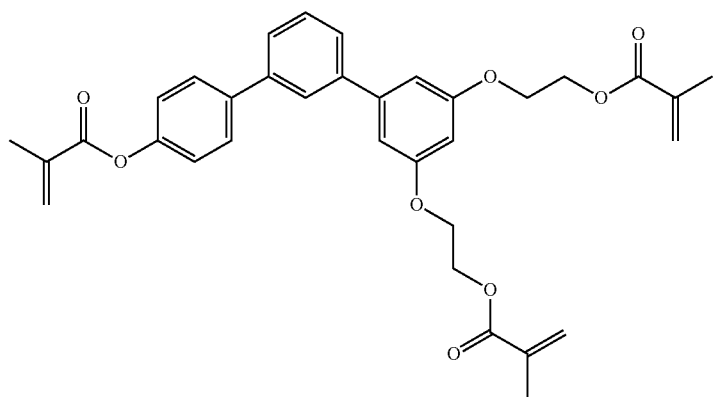 [SMILES: C=C(C)C(=O)OCCOc1cc(OCCOC(=O)C(=C)C)cc(-c2cccc(-c3ccc(OC(=O)C(=C)C)cc3)c2)c1]

RM-93

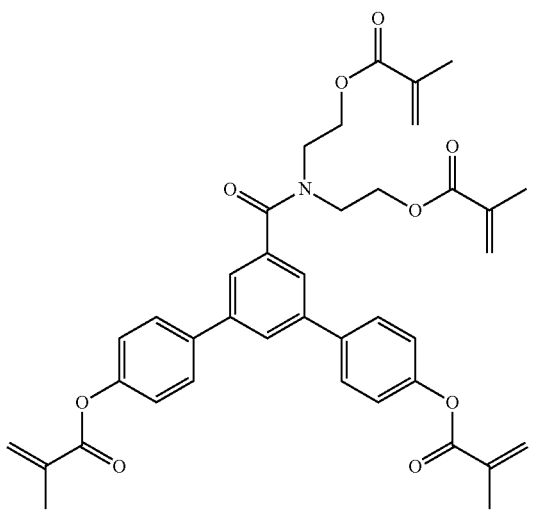 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]

RM-94

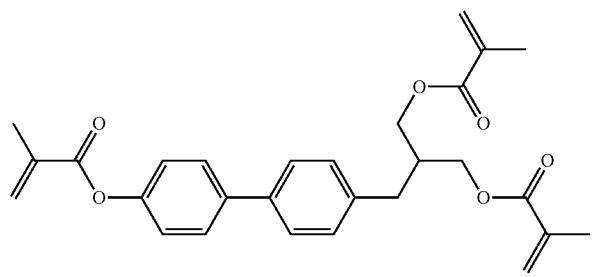 [SMILES: C=C(C)C(=O)OCC(COC(=O)C(=C)C)Cc1ccc(-c2ccc(OC(=O)C(=C)C)cc2)cc1]

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

RM-95

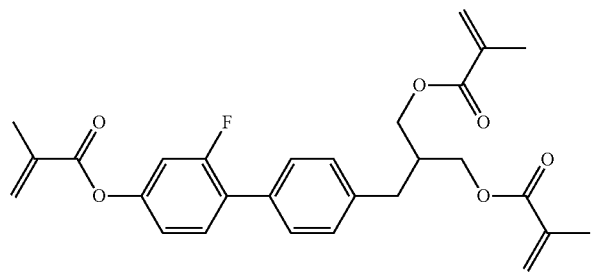 [SMILES: C=C(C)C(=O)OCC(COC(=O)C(=C)C)Cc1ccc(-c2ccc(OC(=O)C(=C)C)cc2F)cc1]

RM-96

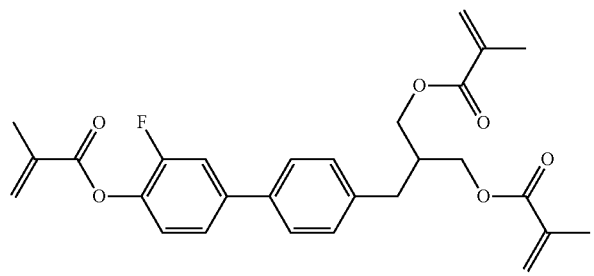 [SMILES: C=C(C)C(=O)OCC(COC(=O)C(=C)C)Cc1ccc(-c2ccc(OC(=O)C(=C)C)c(F)c2)cc1]

RM-97

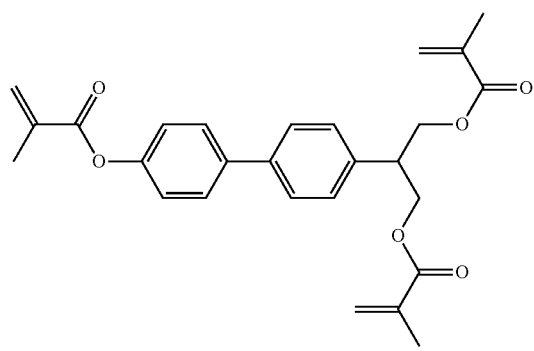 [SMILES: C=C(C)C(=O)OCC(COC(=O)C(=C)C)c1ccc(-c2ccc(OC(=O)C(=C)C)cc2)cc1]

RM-98

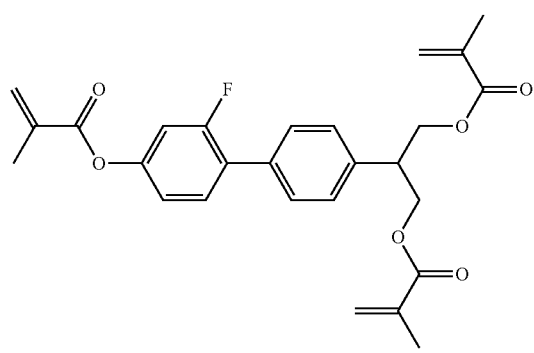 [SMILES: C=C(C)C(=O)OCC(COC(=O)C(=C)C)c1ccc(-c2ccc(OC(=O)C(=C)C)cc2F)cc1]

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

RM-99

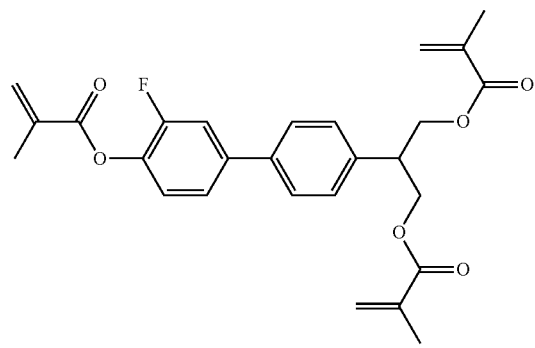 [SMILES: C=C(C)C(=O)OCC(COC(=O)C(=C)C)c1ccc(-c2ccc(OC(=O)C(=C)C)c(F)c2)cc1]

RM-100

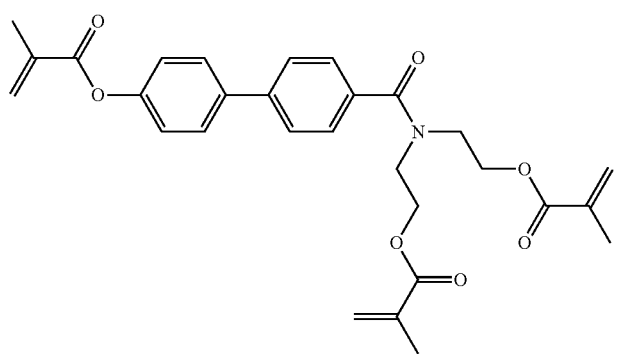 [SMILES: C=C(C)C(=O)OCCN(CCOC(=O)C(=C)C)C(=O)c1ccc(-c2ccc(OC(=O)C(=C)C)cc2)cc1]

RM-101

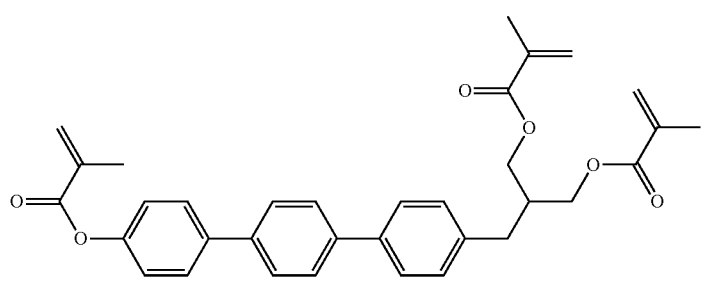 [SMILES: C=C(C)C(=O)OCC(COC(=O)C(=C)C)Cc1ccc(-c2ccc(-c3ccc(OC(=O)C(=C)C)cc3)cc2)cc1]

RM-102

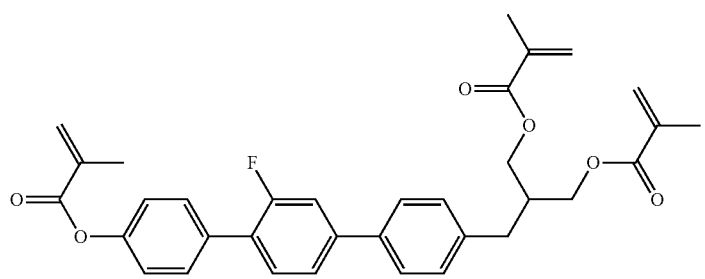 [SMILES: C=C(C)C(=O)OCC(COC(=O)C(=C)C)Cc1ccc(-c2ccc(-c3ccc(OC(=O)C(=C)C)cc3)c(F)c2)cc1]

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

RM-103

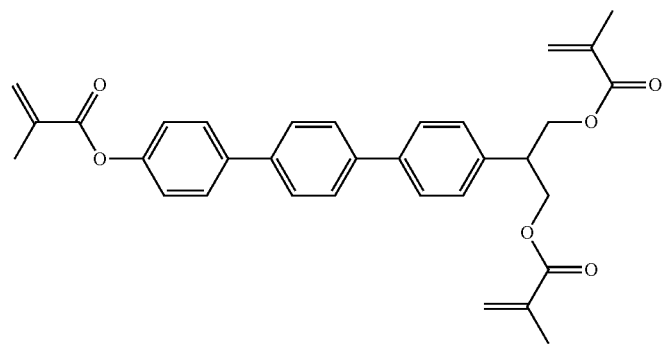 [SMILES: C=C(C)C(=O)OCC(COC(=O)C(=C)C)c1ccc(-c2ccc(-c3ccc(OC(=O)C(=C)C)cc3)cc2)cc1]

RM-104

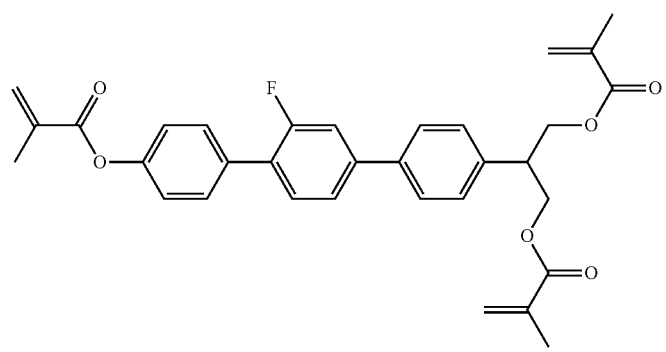 [SMILES: C=C(C)C(=O)OCC(COC(=O)C(=C)C)c1ccc(-c2ccc(-c3ccc(OC(=O)C(=C)C)cc3)c(F)c2)cc1]

RM-105

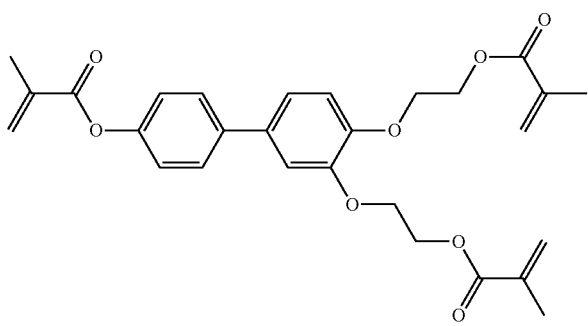 [SMILES: C=C(C)C(=O)OCCOc1ccc(-c2ccc(OC(=O)C(=C)C)cc2)cc1OCCOC(=O)C(=C)C]

RM-106

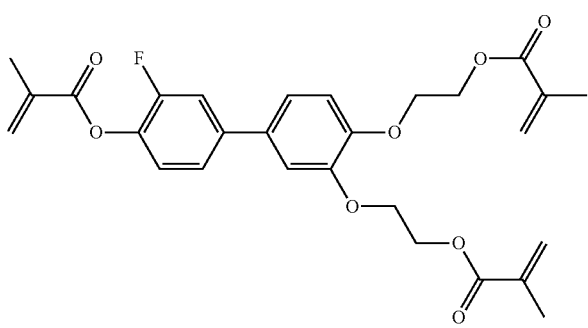 [SMILES: C=C(C)C(=O)OCCOc1ccc(-c2ccc(OC(=O)C(=C)C)c(F)c2)cc1OCCOC(=O)C(=C)C]

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

RM-107

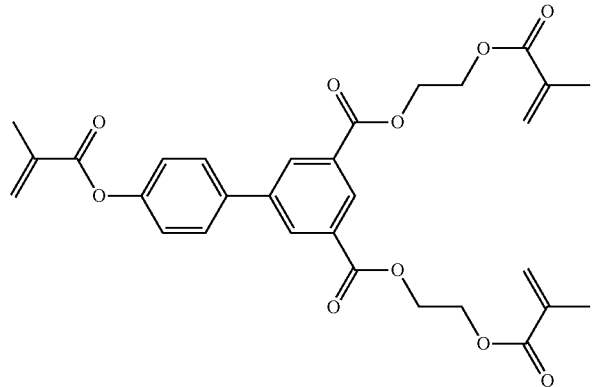 [SMILES: C=C(C)C(=O)OCCOC(=O)c1cc(C(=O)OCCOC(=O)C(=C)C)cc(-c2ccc(OC(=O)C(=C)C)cc2)c1]

RM-108

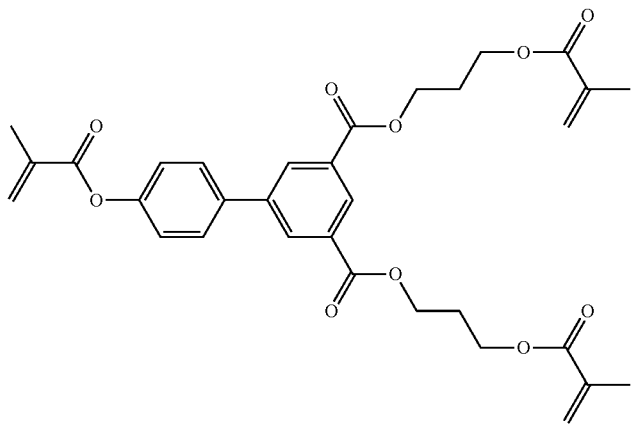 [SMILES: C=C(C)C(=O)OCCCOC(=O)c1cc(C(=O)OCCCOC(=O)C(=C)C)cc(-c2ccc(OC(=O)C(=C)C)cc2)c1]

RM-109

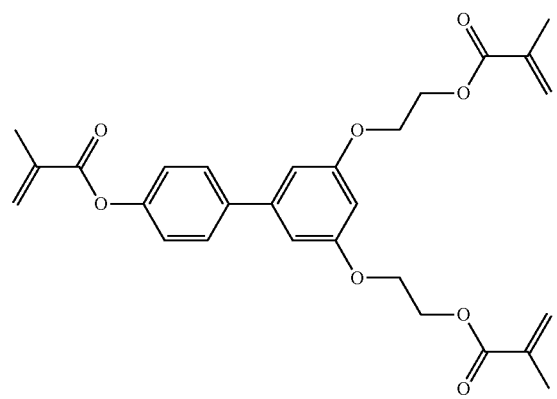 [SMILES: C=C(C)C(=O)OCCOc1cc(OCCOC(=O)C(=C)C)cc(-c2ccc(OC(=O)C(=C)C)cc2)c1]

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

RM-110

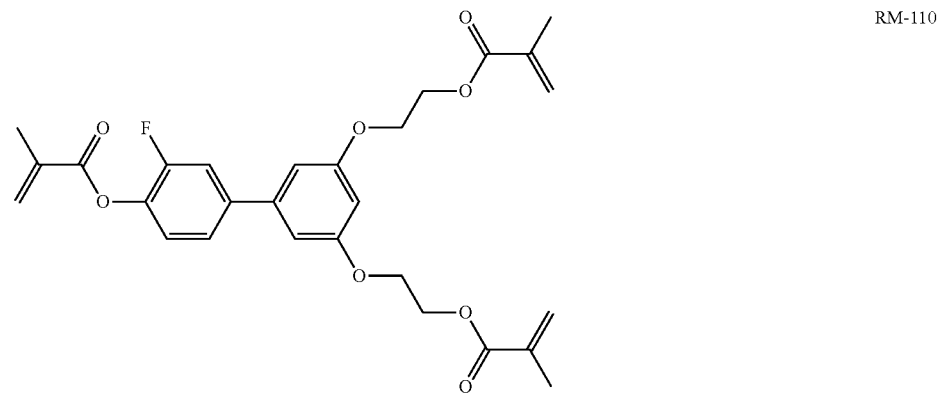

RM-111

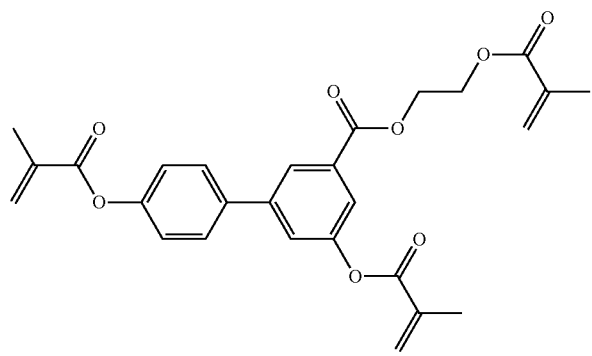 [SMILES: C=C(C)C(=O)OCCOC(=O)c1cc(OC(=O)C(=C)C)cc(-c2ccc(OC(=O)C(=C)C)cc2)c1]

RM-112

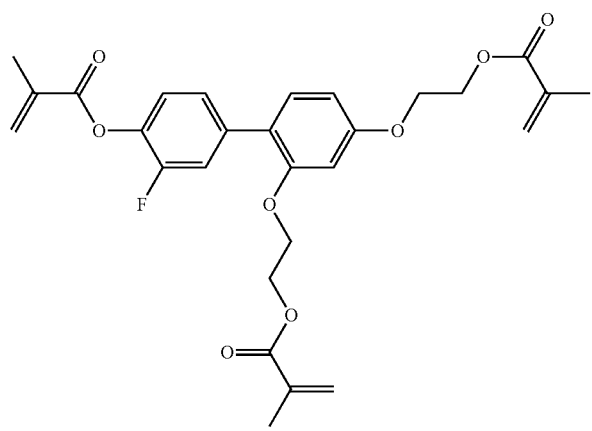 [SMILES: C=C(C)C(=O)OCCOc1ccc(-c2ccc(OC(=O)C(=C)C)c(F)c2)c(OCCOC(=O)C(=C)C)c1]

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

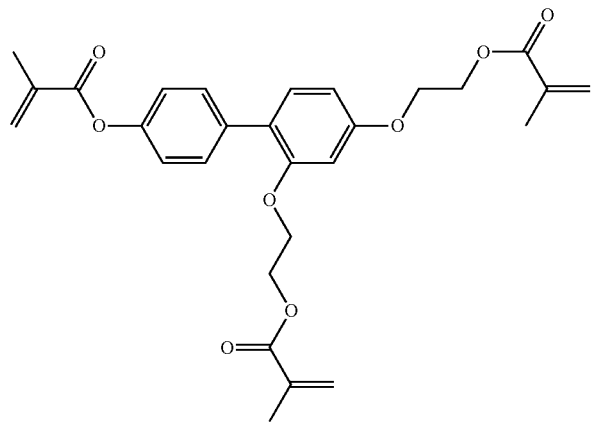 [SMILES: C=C(C)C(=O)OCCOc1ccc(-c2ccc(OC(=O)C(=C)C)cc2)c(OCCOC(=O)C(=C)C)c1]

RM-113

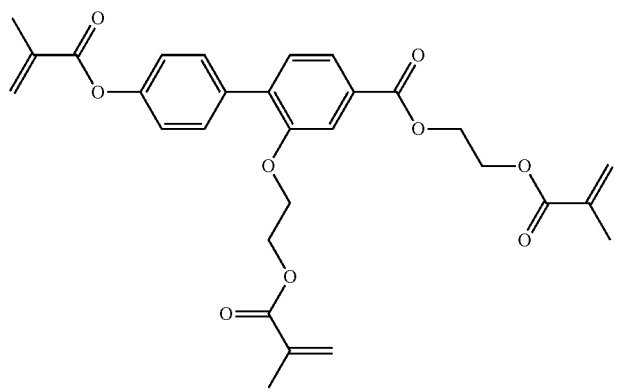 [SMILES: C=C(C)C(=O)OCCOC(=O)c1ccc(-c2ccc(OC(=O)C(=C)C)cc2)c(OCCOC(=O)C(=C)C)c1]

RM-114

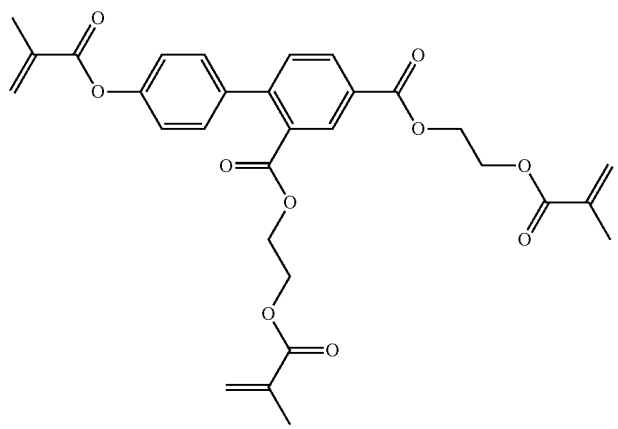 [SMILES: C=C(C)C(=O)OCCOC(=O)c1ccc(-c2ccc(OC(=O)C(=C)C)cc2)c(C(=O)OCCOC(=O)C(=C)C)c1]

RM-115

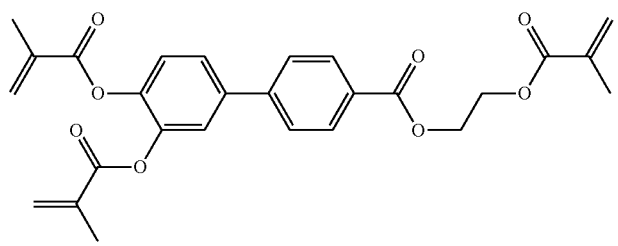 [SMILES: C=C(C)C(=O)OCCOC(=O)c1ccc(-c2ccc(OC(=O)C(=C)C)c(OC(=O)C(=C)C)c2)cc1]

RM-116

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

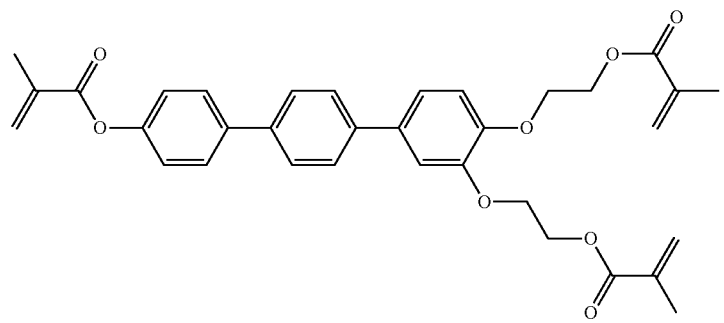 [SMILES: C=C(C)C(=O)OCCOc1ccc(-c2ccc(-c3ccc(OC(=O)C(=C)C)cc3)cc2)cc1OCCOC(=O)C(=C)C]

RM-117

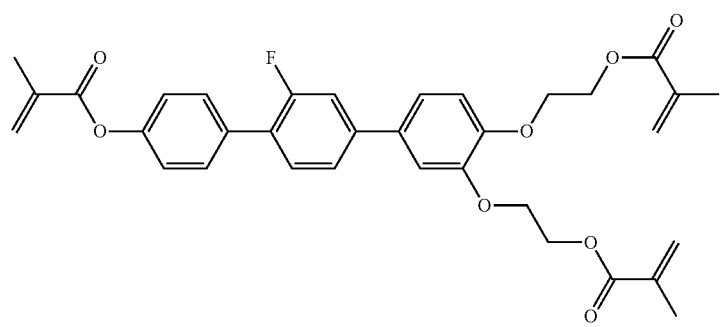 [SMILES: C=C(C)C(=O)OCCOc1ccc(-c2ccc(-c3ccc(OC(=O)C(=C)C)cc3)c(F)c2)cc1OCCOC(=O)C(=C)C]

RM-118

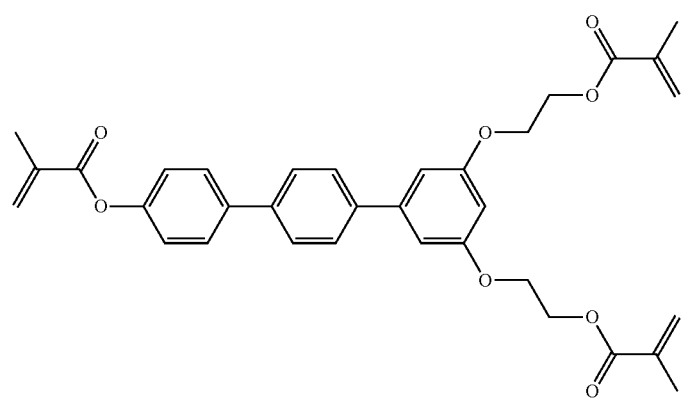 [SMILES: C=C(C)C(=O)OCCOc1cc(OCCOC(=O)C(=C)C)cc(-c2ccc(-c3ccc(OC(=O)C(=C)C)cc3)cc2)c1]

RM-119

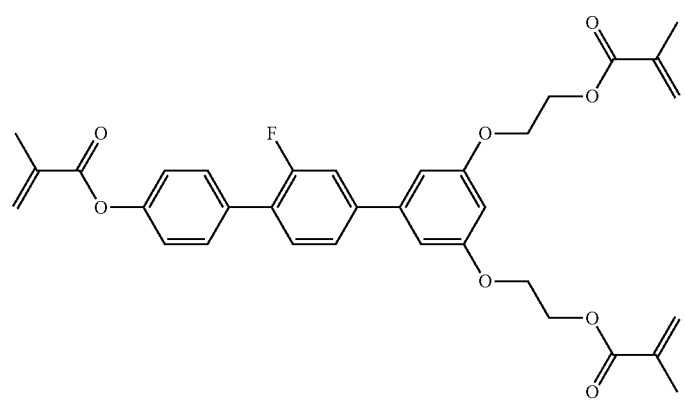 [SMILES: C=C(C)C(=O)OCCOc1cc(OCCOC(=O)C(=C)C)cc(-c2ccc(-c3ccc(OC(=O)C(=C)C)cc3)c(F)c2)c1]

RM-120

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure ®651 (from BASF).

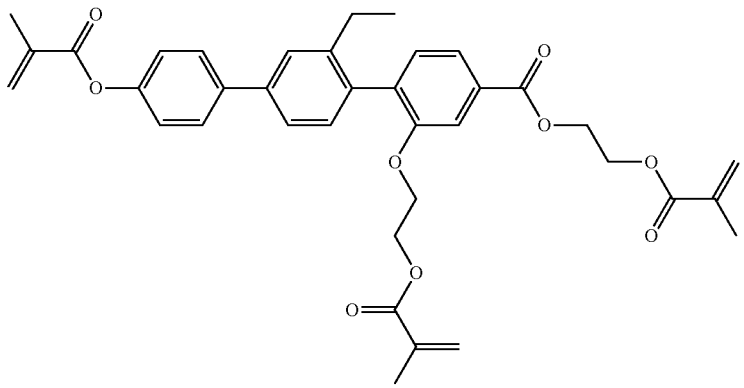 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]

RM-121

In a preferred embodiment of the present invention, the mesogenic media comprise one or more compounds selected from the group of the compounds from Table G.

The liquid crystalline media according to the present invention comprise preferably four or more, more preferably six or more, even more preferably seven or more, and particularly preferably eight or more compounds selected from the group of compounds of table D, preferably compounds of three or more different formulae selected from the group of formulae of table D. It is particularly preferred that the medium additionally contains one, two or more compounds selected from the group of formulae of table E. Even more preferably the medium further contains one, two or more compounds selected from the group of formulae of table G.

The following examples are merely illustrative of the present invention and they should not be considered as limiting the scope of the invention in any way. The examples and modifications or other equivalents thereof will become apparent to those skilled in the art in the light of the present disclosure.

However, the physical properties and compositions shown in the following illustrate which properties can be achieved and in which ranges they can be modified. Especially the combination of the various properties, which can be preferably achieved, is thus well defined.

EXAMPLES

In the Examples, $V_o$ denotes threshold voltage, capacitive [V] at 20° C.,
$n_e$ denotes extraordinary refractive index at 20° C. and 589 nm,
$n_o$ denotes ordinary refractive index at 20° C. and 589 nm,
$\Delta n$ denotes optical anisotropy at 20° C. and 589 nm,
$\varepsilon_\|$ denotes dielectric permittivity parallel to the director at 20° C. and 1 kHz,
$\varepsilon_\perp$ denotes dielectric permittivity perpendicular to the director at 20° C. and 1 kHz,
$\Delta\varepsilon$ denotes dielectric anisotropy at 20° C. and 1 kHz,
cl.p., T(N,I) denotes clearing point [° C.],
$\gamma_1$ denotes rotational viscosity measured at 20° C. [mPa·s], determined by the rotation method in a magnetic field,
$K_1$ denotes elastic constant, "splay" deformation at 20° C. [pN],
$K_2$ denotes elastic constant, "twist" deformation at 20° C. [pN],
$K_3$ denotes elastic constant, "bend" deformation at 20° C. [pN].

The term "threshold voltage" for the present invention relates to the capacitive threshold ($V_0$), unless explicitly indicated otherwise. In the Examples, as is generally usual, the optical threshold can also be indicated for 10% relative contrast ($V_{10}$).

Liquid crystal mixtures and composite systems are realized with the compositions and properties as given in the following. Their properties and optical performance are investigated.

Reference Example 1

A liquid-crystal base mixture B-1 is prepared and characterized with respect to its general physical properties, having the composition and properties as indicated in the following table.

| | | | |
|---|---|---|---|
| PPZPP-7-N | 7.00% | Clearing point: | 100.0° C. |
| PP-3-N | 5.00% | Δn [589 nm, 20° C.] | 0.263 |
| PP-2-N | 15.00% | $n_e$ [589 nm, 20° C.] | 1.790 |
| PPP-5-N | 10.00% | Δε [1 kHz, 20° C.] | 17.2 |
| CPP-5-N | 15.00% | $\varepsilon_\|$ [1 kHz, 20° C.] | 22.4 |
| PP-30-N | 11.00% | | |
| PP-5-N | 37.00% | | |
| Σ 100.00% | | | |

Reference Example 2

A liquid-crystal base mixture B-2 is prepared and characterized with respect to its general physical properties, having the composition and properties as indicated in the following table.

| | | | |
|---|---|---|---|
| PGIGI-3-F | 10.00% | Clearing point: | 105.0° C. |
| CPG-2-F | 6.00% | Δn [589 nm, 20° C.] | 0.160 |
| CPG-3-F | 7.00% | $n_e$ [589 nm, 20° C.] | 1.663 |
| CPG-5-F | 5.00% | Δε [1 kHz, 20° C.] | 11.4 |
| CPU-5-F | 10.00% | $\varepsilon_\|$ [1 kHz, 20° C.]: | 15.7 |
| CPU-7-F | 10.00% | | |

-continued

| PGU-3-F | 4.00% |
| PGU-5-F | 7.00% |
| CCGU-3-F | 8.00% |
| CPP-3-2 | 4.00% |
| CGPC-3-3 | 3.00% |
| CGPC-5-3 | 3.00% |
| CGPC-5-5 | 3.00% |
| CPGU-3-OT | 5.00% |
| CP-5-N | 15.00% |
| Σ | 100.00% |

A cholesteric mixture C-2 is prepared by mixing 99.00% of mixture B-2 with 1.00% of chiral dopant R-5011 available from Merck KGaA, Darmstadt, Germany.

Reference Example 3

A liquid-crystal base mixture B-3 is prepared and characterized with respect to its general physical properties, having the composition and properties as indicated in the following table.

| CPP-3-2 | 4.00% | Clearing point: | 104.4° C. |
| CPG-3-F | 9.00% | Δn [589 nm, 20° C.]: | 0.160 |
| CPG-5-F | 9.00% | $n_e$ [589 nm, 20° C.]: | 1.654 |
| CCGU-3-F | 9.00% | Δε [1 kHz, 20° C.]: | 18.8 |
| CC-3-V1 | 8.00% | $\varepsilon_\parallel$ [1 kHz, 20° C.] | 22.9 |
| CC-4-V1 | 6.00% | | |
| CPGU-3-OT | 6.00% | | |
| CPU-7-F | 8.00% | | |
| PGU-3-F | 6.00% | | |
| PGU-5-F | 6.00% | | |
| PGUQU-3-F | 9.00% | | |
| PGUQU-5-F | 8.00% | | |
| PUQU-3-F | 6.00% | | |
| CLP-3-T | 6.00% | | |
| Σ | 100.00% | | |

A cholesteric mixture C-3 is prepared by mixing 99.54% of mixture B-3 with 0.46% of chiral dopant R-5011 available from Merck KGaA, Darmstadt, Germany.

Comparative Example 1

A cholesteric mixture CC-1 is prepared by mixing 91.125% of mixture B-1 as described in Reference Example 1 above with 6.493% of chiral dopant CB15 available from Merck KGaA, Darmstadt, 2.370% of ethylene glycol dimethacrylate, 0.010% of polydimethylsiloxane and 0.002% of 2,6-di-tert-butyl-4-methylphenol.

The mixture CC-1 is filled into an electro-optical cell having glass substrates (0.7 mm alkali-free glass) with ITO electrodes as well as polyimide alignment layers (AL-1054 from Japan Synthetic Rubber, planar, TN-rubbed), wherein the cell gap is 25 μm.

The cell is preheated to 40° C. Subsequently polymerisation is carried out at 40° C. by irradiating the cell with UV light (facial tanner with intensity cut-off below 340 nm, 3 mW/cm² light intensity) for 60 minutes while a voltage (100 V rms) is applied.

The obtained cell has an opaque state with a white appearance and a haze of 96%, where the haze is determined according to ASTM 1003-92 using a spectrophotometer (Lambda 1050, Perkin Elmer) and a 150 mm Ulbricht's sphere. The obtained cell has an optically clear state at 50 V with a haze of 5.2%, having a $\tau_{on}$ of 99 ms and $\tau_{off}$ of 32 ms at 20° C. At 0° C. the cell has a $\tau_{on}$ of 750 ms and $\tau_{off}$ of 134 ms.

Example 1

A dye-doped mixture M-1 is prepared by mixing 99.50% of cholesteric mixture C-2 described in Reference Example 2 above with 0.50% of Irgaphor Black X11 DC (from BASF). A mixture M-1-1 is prepared by mixing 99.225% of mixture M-1 with 0.75% of compound of formula RM-A

RM-A and 0.025% of the photoinitiator Irgacure® 651 (in the following abbreviated as IRG-651).

available from Ciba, Switzerland.

The mixture M-1-1 is filled into an electro-optical cell having glass substrates (0.7 mm alkali-free glass) with ITO electrodes as well as polyimide alignment layers (AL-1054 from Japan Synthetic Rubber, planar, TN-rubbed), wherein the cell gap is 25 μm.

The cell is preheated to 40° C. Subsequently polymerisation is carried out at 40° C. by irradiating the cell with UV light (facial tanner with intensity cut-off below 340 nm, 3 mW/cm² light intensity) for 60 minutes while a voltage (100 V rms) is applied.

The obtained cell in the opaque state has a haze of 67%. The obtained cell has an optically clear state at 100 V with a haze of 2.0%, having a $\tau_{on}$ of 65 ms and $\tau_{off}$ of 2.8 ms at 20° C. At 0° C. the cell has a $\tau_{on}$ of 236 ms and $\tau_{off}$ of 10.0 ms.

Example 2

A dye-doped mixture M-2 is prepared by adding to cholesteric mixture C-2 described in Reference Example 2 above 0.118% of compound of formula DD-1

DD-1
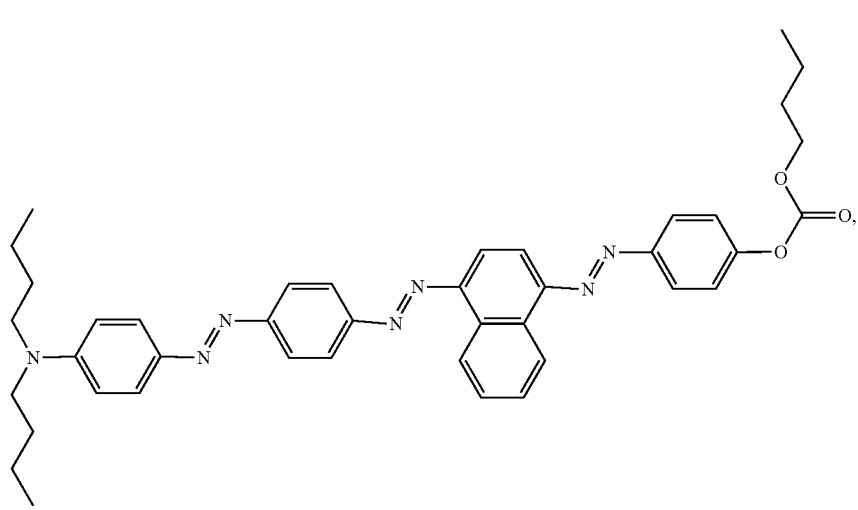
0.142% of compound of formula DD-2
DD-2
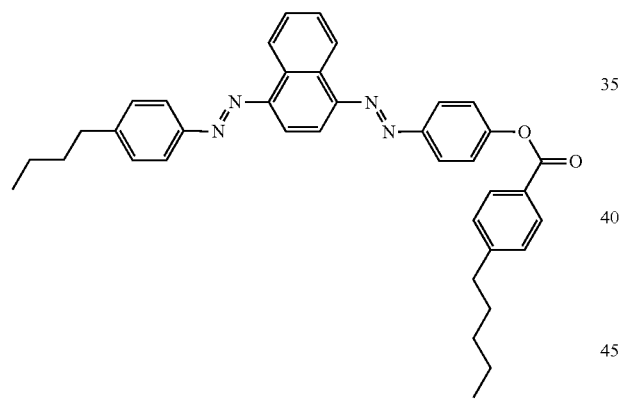
and 0.242% of compound of formula DD-3
DD-3
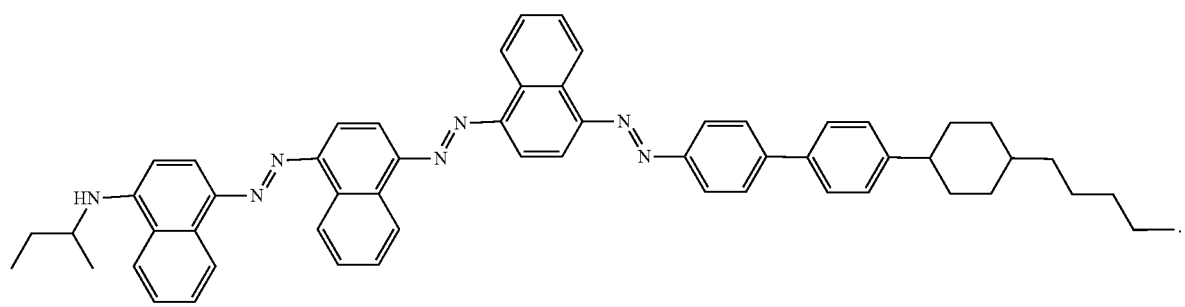

A mixture M-2-1 is prepared by mixing 99.225% of mixture M-2 with 0.750% of compound of formula RM-A as described in Example 1 above and 0.025% of IRG-651 as described in Example 1 above.

The mixture M-2-1 is filled into an electro-optical cell having glass substrates (0.7 mm alkali-free glass) with ITO electrodes as well as polyimide alignment layers (AL-1054 from Japan Synthetic Rubber, planar, TN-rubbed), wherein the cell gap is 25 μm.

The cell is preheated to 40° C. Subsequently polymerisation is carried out at 40° C. by irradiating the cell with UV light (facial tanner with intensity cut-off below 340 nm, 3 mW/cm² light intensity) for 60 minutes while a voltage (100 V rms) is applied.

The obtained cell has an opaque state with black appearance and a haze of 84%. The obtained cell has an optically clear state at 100 V with a haze of 2.5%, having a $\tau_{on}$ of 101 ms and $\tau_{off}$ of 2.8 ms at 20° C. At 0° C. the cell has a $\tau_{on}$ of 368 ms and $\tau_{off}$ of 9.8 ms.

Example 3

A mixture M-3 is prepared by mixing 98.713% of mixture M-2 as prepared in Example 2 above with 0.037% of IRG-651, 0.625% of compound of formula RM-B

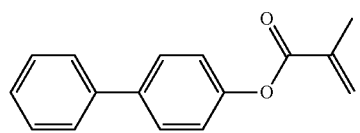

and 0.625% of compound of formula RM-C

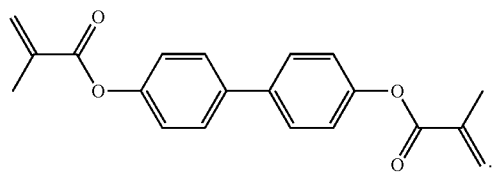

The mixture M-3 is treated and measured as described for mixture M-2-1 in Example 2 above. The obtained cell exhibits a favourable electro-optical performance in the opaque state and the optically transparent state.

Example 4

A mixture M-4 is prepared by adding to cholesteric mixture C-3 described in Reference Example 3 above 0.750% of compound of formula RM-A as described in Example 1 above, 0.025% of IRG-651, 0.109% of compound of formula DD-1 as described in Example 2 above, 0.132% of compound of formula DD-2 as described in Example 2 above and 0.254% of compound of formula DD-3 as described in Example 2 above.

The mixture M-4 is filled into an electro-optical cell having glass substrates (0.7 mm alkali-free glass) with ITO electrodes as well as polyimide alignment layers (AL-1054 from Japan Synthetic Rubber, planar, TN-rubbed), wherein the cell gap is 25 μm.

The cell is preheated to 40° C. Subsequently polymerisation is carried out at 40° C. by irradiating the cell with UV light (facial tanner with intensity cut-off below 340 nm, 3 mW/cm² light intensity) for 60 minutes while a voltage (100 V rms) is applied.

The obtained cell has an opaque state with black appearance and a haze of 93%. The obtained cell has an optically clear state at 50 V with a haze of 5.0%, having a $\tau_{on}$ of 68 ms and $\tau_{off}$ of 2.8 ms at 20° C. At 0° C. the cell has a $\tau_{on}$ of 126 ms and $\tau_{off}$ of 9.0 ms.

Example 5

A mixture M-5 is prepared by mixing 98.298% of mixture B-3 described in Reference Example 3 above with 0.458% of chiral dopant R-5011, 0.750% of compound of formula RM-A as described in Example 1 above, 0.109% of compound of formula DD-1 as described in Example 2 above, 0.132% of compound of formula DD-2 as described in Example 2 above and 0.253% of compound of formula DD-3 as described in Example 2 above.

The mixture M-5 is filled into an electro-optical cell having glass substrates (0.7 mm alkali-free glass) with ITO electrodes as well as polyimide alignment layers (AL-1054 from Japan Synthetic Rubber, planar, TN-rubbed), wherein the cell gap is 25 μm.

The cell is preheated to 40° C. Subsequently polymerisation is carried out at 40° C. by irradiating the cell with UV light (facial tanner with intensity cut-off below 340 nm, 3 mW/cm² light intensity) for 60 minutes while a voltage (100 V rms) is applied.

The obtained cell has an opaque state with black appearance and a haze of 83%. The obtained cell has an optically clear state at 50 V with a haze of 1.5%, having a $\tau_{on}$ of 56 ms and $\tau_{off}$ of 7.7 ms at 20° C. At 0° C. the cell has a $\tau_{on}$ of 116 ms and $\tau_{off}$ of 25 ms.

Example 6

A mixture M-6 is prepared by adding to mixture B-3 described in Reference Example 3 above 0.458% of chiral dopant R-5011, 0.750% of compound of formula RM-A as described in Example 1 above, 0.025% of IRG-651, 0.123% of compound of formula DD-4

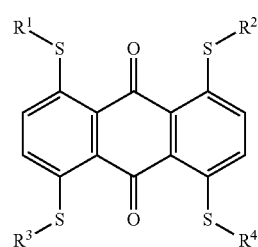

wherein $R^1$, $R^2$, $R^3$ and $R^4$ denote, independently of one another,

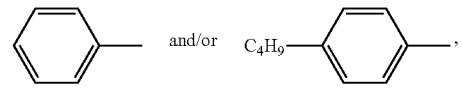

0.337% of a mixture of compounds of formulae DD-5 and DD-6

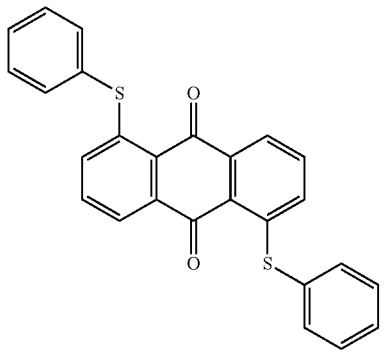

DD-5

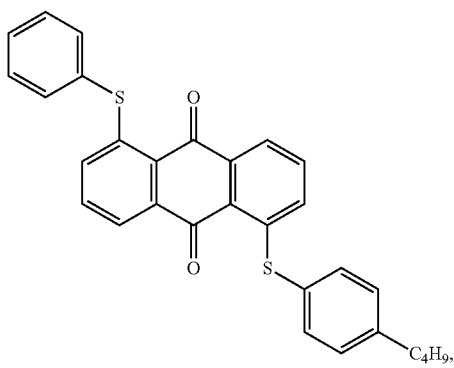

DD-6

0.117% of compound of formula DD-7

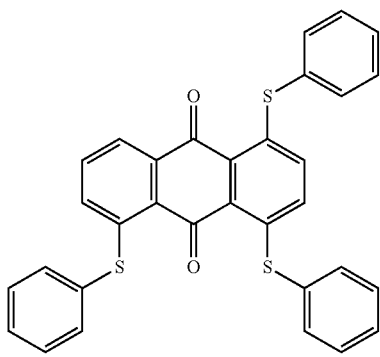

DD-7 and 0.173% of compound of formula DD-8

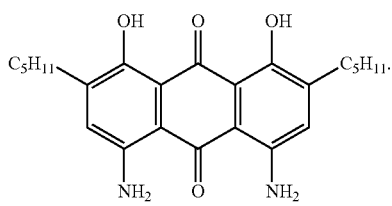

DD-8

The mixture M-6 is filled into an electro-optical cell having glass substrates (0.7 mm alkali-free glass) with ITO electrodes as well as polyimide alignment layers (AL-1054 from Japan Synthetic Rubber, planar, TN-rubbed), wherein the cell gap is 25 µm.

The cell is preheated to 40° C. Subsequently polymerisation is carried out at 40° C. by irradiating the cell with UV light (facial tanner with intensity cut-off below 340 nm, 3 mW/cm$^2$ light intensity) for 60 minutes while a voltage (100 V rms) is applied.

The obtained cell has an opaque state with black appearance and a haze of 94%. The obtained cell has an optically clear state at 100 V with a haze of 7.6%, having a $\tau_{on}$ of 15 ms and $\tau_{off}$ of 3.3 ms at 20° C. At 0° C. the cell has a $\tau_{on}$ of 42 ms and $\tau_{off}$ of 9.8 ms.

Example 7

A mixture M-7 is prepared by adding to mixture C-3 as described in Reference Example 3 above 0.037% of IRG-651, 0.625% of compound of formula RM-B as described in Example 3 above, 0.625% of compound of formula RM-C as described in Example 3 above, 0.109% of compound of formula DD-1 as described in Example 2 above, 0.132% of compound of formula DD-2 as described in Example 2 above and 0.254% of compound of formula DD-3 as described in Example 2 above.

The mixture M-7 is treated and measured as described for mixture M-2-1 in Example 2 above. The obtained cell exhibits a favourable electro-optical performance in the opaque state and the optically transparent state.

The invention claimed is:
1. A method for the preparation of a mobile or portable device having a light valve which is operable in and electrically switchable between an optically transparent state and an opaque state, comprising the steps of:
   (i) providing a liquid-crystalline medium which comprises one or more mesogenic compounds, one or more chiral compounds, at least three different dichroic dyes, one or more di- or multireactive polymerisable mesogenic compounds, and no photoinitiators as a layer interposed between two opposing transparent substrates which are each provided with an electrode, wherein the liquid-crystalline medium has a clearing point of 70° C. or more, and wherein the one or more di- or multireactive polymerisable mesogenic compounds are contained in the medium in an amount, based on the overall contents of the medium, of 2% by weight or less; and
   (ii) polymerising the one or more di- or multireactive polymerisable mesogenic compounds in the layer by photopolymerization with light in the spectral range from 340 nm to 420 nm.
2. The method according to claim 1, wherein the photopolymerisation of the one or more polymerisable mesogenic compounds is carried out in the presence of an electric field in the layer.
3. The method according to claim 1, wherein the one or more polymerisable mesogenic compounds comprise one, two or more acrylate and/or methacrylate groups.
4. The method according to claim 1, wherein the photopolymerisation is carried out for a period of from 1 minute to 240 minutes using the light having an intensity in the range of from 0.1 mW/cm$^2$ to 100 mW/cm$^2$.
5. A mobile or a portable device comprising a light valve that is operable in and electrically switchable between an optically transparent state and an opaque state, wherein the light valve is obtained or obtainable from carrying out the method according to claim 1.

6. A mobile or a portable device comprising a light valve that is operable in and electrically switchable between an optically transparent state and an opaque state and that comprises a switching layer containing a material that comprises
- a liquid-crystalline medium comprising one or more mesogenic compounds, one or more chiral compounds at least three different dichroic dyes, and no photoinitiators, wherein the liquid-crystalline medium has a clearing point of 70° C. or more, and
- a polymeric component comprising one or more polymeric structures obtained or obtainable from polymerisation of one or more di- or multireactive polymerisable mesogenic compounds, wherein the polymeric component is contained in the material in an amount, based on the overall contents of the material, of 2% by weight or less,
- wherein the light valve in the optically transparent state has a haze of less than 5% and a degree of light transmission of more than 45% and in the opaque state has a haze of more than 65% and a degree of light transmission of less than 35%.

7. The mobile or portable device according to claim 6, wherein the liquid-crystalline medium exhibits a pitch of 0.55 μm or more in the opaque state.

8. A liquid-crystalline medium for use in the method according to claim 1, comprising:
- one or more di- or multireactive polymerisable mesogenic compounds in an amount, based on the overall contents of the medium, of 2% by weight or less;
- one or more mesogenic compounds;
- one or more chiral compounds;
- the at least three different dichroic dyes;
- no photoinitiators;
- wherein the one or more mesogenic compounds are selected from the compounds of formulae I and II

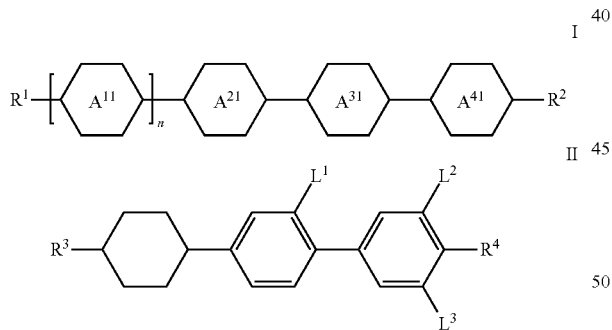

wherein
$R^1$ and $R^2$ denote, independently of one another, a group selected from F, Cl, $CF_3$, $OCF_3$, and straight-chain alkyl or alkoxy having 1 to 15 carbon atoms or branched alkyl or alkoxy having 3 to 15 carbon atoms or straight-chain alkenyl having 2 to 15 carbon atoms or branched alkenyl having 3 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, $A^{11}$ denotes

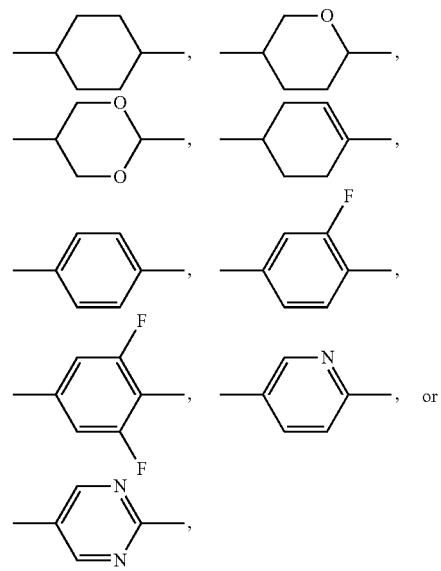

n denotes 0 or 1, and
$A^{21}$, $A^{31}$ and $A^{41}$ denote, independently of one another,

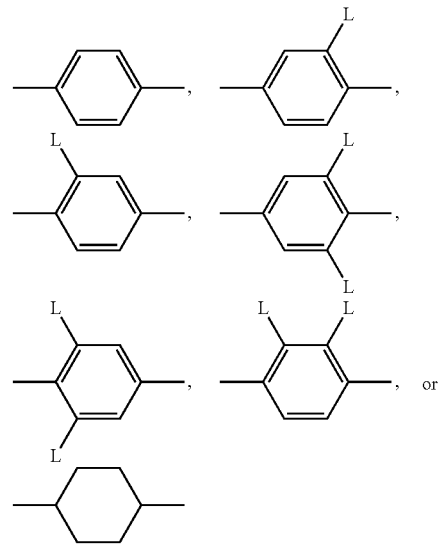

wherein L is on each occurrence, identically or differently, halogen selected from F, Cl and Br, and
$R^3$ and $R^4$ denote, independently of one another, a group selected from F, $CF_3$, $OCF_3$, CN, and straight-chain alkyl or alkoxy having 1 to 15 carbon atoms or branched alkyl or alkoxy having 3 to 15 carbon atoms or straight-chain alkenyl having 2 to 15 carbon atoms or branched alkenyl having 3 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, and $L^1$, $L^2$ and $L^3$ denote, independently of one another, H or F; and wherein the one or more mesogenic compounds are selected from the compounds of formulae III, IV and V

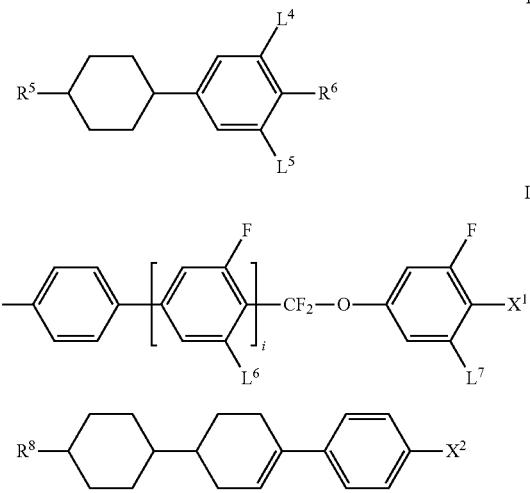

wherein $R^5$ and $R^6$ denote, independently of one another, a group selected from F, $CF_3$, $OCF_3$, CN, and straight-chain alkyl or alkoxy having 1 to 15 carbon atoms or branched alkyl or alkoxy having 3 to 15 carbon atoms or straight-chain alkenyl having 2 to 15 carbon atoms or branched alkenyl having 3 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, and $L^4$, $L^5$, $L^6$ and $L^7$ denote, independently of one another, H or F, $R^7$ and $R^8$ denote, independently of one another, straight-chain alkyl or alkoxy having 1 to 15 carbon atoms or branched alkyl or alkoxy having 3 to 15 carbon atoms or straight-chain alkenyl having 2 to 15 carbon atoms or branched alkenyl having 3 to 15 carbon atoms which is unsubstituted, monosubstituted by CN or $CF_3$ or mono- or polysubstituted by halogen and wherein one or more $CH_2$ groups may be, in each case independently of one another, replaced by —O—, —S—, —CO—, —COO—, —OCO—, —OCOO— or —C≡C— in such a manner that oxygen atoms are not linked directly to one another, i is 0, 1 or 2, and X1 and X2 denote, independently of one another, F, $CF_3$, $OCF_3$ or CN.

9. The liquid-crystalline medium according to claim 8, wherein the liquid-crystalline medium exhibits a positive dielectric anisotropy Δε and an optical anisotropy Δn, determined at 20° C. and 589 nm, of 0.13 or more, and wherein the one or more chiral compounds contained in the liquid-crystalline medium have an absolute value of the helical twisting power of 5 μm$^{-1}$ or more.

10. The method according to claim 2, wherein the electric field comprises an alternating current electric field, the layer has a thickness of from 2 μm to 50 μm, and the applied electric field induces a homeotropic alignment in the layer comprising the liquid-crystalline medium.

11. The method according to claim 10, wherein the layer has a thickness of from 5 μm to 25 μm.

12. The mobile or portable device according to claim 6, wherein the haze is determined according to ASTM D 1003, and wherein the degree of light transmission is determined in accordance with DIN EN410.

13. The mobile or portable device according to claim 5, wherein the liquid-crystalline medium exhibits a pitch of 0.55 μm or more in the opaque state.

14. The liquid-crystalline medium according to claim 8, comprising 3% by weight or less of the dichroic dyes, based on the overall contents of the medium.

* * * * *

UNITED STATES PATENT AND TRADEMARK OFFICE
CERTIFICATE OF CORRECTION

PATENT NO. : 12,134,725 B2  
APPLICATION NO. : 17/619971  
DATED : November 5, 2024  
INVENTOR(S) : Christian Schoenefeld et al.

Page 1 of 1

It is certified that error appears in the above-identified patent and that said Letters Patent is hereby corrected as shown below:

In the Claims

Column 163, Line 66, Claim 8, delete "—C=C—" and insert -- —C≡C— --.

Column 164, Line 65, Claim 8, delete "—C=C—" and insert -- —C≡C— --.

Column 165, Line 40, Claim 8, delete "—C=C—" and insert -- —C≡C— --.

Column 166, Line 13, Claim 8, delete "—C=C—" and insert -- —C≡C— --.

Column 166, Line 15, Claim 8, delete "X1 and X2" and insert -- $X^1$ and $X^2$ --.

Signed and Sealed this  
Sixth Day of May, 2025

Coke Morgan Stewart  
*Acting Director of the United States Patent and Trademark Office*